US007603309B2

(12) United States Patent
Griffin et al.

(10) Patent No.: US 7,603,309 B2
(45) Date of Patent: Oct. 13, 2009

(54) COMPUTER IMPLEMENTED AND/OR ASSISTED METHODS AND SYSTEMS FOR PROVIDING GUARANTEED, SPECIFIED AND/OR PREDETERMINED EXECUTION PRICES IN A GUARANTEED, SPECIFIED AND/OR PREDETERMINED TIMEFRAME ON THE PURCHASE OR SALE OF, FOR EXAMPLE, LISTED OPTIONS

(75) Inventors: Kenneth C. Griffin, Chicago, IL (US); Matthew Andresen, Chicago, IL (US)

(73) Assignee: Citadel Investment Group, L.L.C., Chicago, IL (US)

( * ) Notice: Subject to any disclaimer, the term of this patent is extended or adjusted under 35 U.S.C. 154(b) by 616 days.

(21) Appl. No.: 11/236,106

(22) Filed: Sep. 26, 2005

(65) Prior Publication Data

US 2006/0069636 A1   Mar. 30, 2006

Related U.S. Application Data

(60) Provisional application No. 60/613,793, filed on Sep. 27, 2004.

(51) Int. Cl.
*G06Q 40/00* (2006.01)
(52) U.S. Cl. .................. 705/36 R; 705/35
(58) Field of Classification Search ......... 705/35–36 R
See application file for complete search history.

(56) References Cited

U.S. PATENT DOCUMENTS

| 5,835,896 | A | | 11/1998 | Fisher et al. |
| 5,873,071 | A | * | 2/1999 | Ferstenberg et al. ...... 705/36 R |
| 5,905,974 | A | | 5/1999 | Fraser et al. |
| 5,905,975 | A | | 5/1999 | Ausubel |
| 5,940,809 | A | | 8/1999 | Musmanno et al. |
| 6,016,483 | A | | 1/2000 | Rickard et al. |
| 6,021,398 | A | | 2/2000 | Ausubel |
| 6,112,189 | A | | 8/2000 | Rickard et al. |
| 6,173,270 | B1 | | 1/2001 | Cristofich et al. |

(Continued)

FOREIGN PATENT DOCUMENTS

WO    WO-02/09008 A1    1/2002

(Continued)

OTHER PUBLICATIONS

Battalio et al., "Toward a National Market System for U.S. Exchange-listed Equity Options" The Journal of Finance, vol. 59, No. 2, pp. 933-962 (2004).

(Continued)

*Primary Examiner*—Thu Thao Havan
(74) *Attorney, Agent, or Firm*—Irah H. Donner; Wilmer Cutler Pickering Hale and Dorr LLP

(57) ABSTRACT

Methods and systems are provided which enable options broker-dealers to guarantee execution of an option trade order within a specified time window. By providing means to quantify and mitigate the effects of several factors which contribute to options market inefficiency (e.g., market structure, regulatory constraints, and "market misbehavior"), these methods and systems eliminate or at least reduce the level of broker-dealer risk inherent in offering an execution speed guarantee, while optionally simultaneously providing better execution quality for investors.

54 Claims, 37 Drawing Sheets

U.S. PATENT DOCUMENTS

| | | |
|---|---|---|
| 6,243,691 B1 | 6/2001 | Fisher et al. |
| 6,377,940 B2 | 4/2002 | Tilfors et al. |
| 6,618,707 B1 | 9/2003 | Gary |
| 2001/0044767 A1 | 11/2001 | Madoff et al. |
| 2002/0019795 A1 | 2/2002 | Madoff et al. |
| 2002/0035534 A1 | 3/2002 | Buist et al. |
| 2002/0055901 A1 | 5/2002 | Gianakouros et al. |
| 2002/0087456 A1 | 7/2002 | Abeshouse et al. |
| 2002/0091606 A1 | 7/2002 | Shapiro |
| 2002/0095369 A1 | 7/2002 | Kaplan et al. |
| 2002/0156716 A1 | 10/2002 | Adatia |
| 2002/0161687 A1 | 10/2002 | Serkin et al. |
| 2002/0194105 A1 | 12/2002 | Klein |
| 2003/0004858 A1 | 1/2003 | Schmitz et al. |
| 2003/0014354 A1 | 1/2003 | Madoff et al. |
| 2003/0061148 A1 | 3/2003 | Alavian |
| 2003/0088501 A1 | 5/2003 | Gilbert et al. |
| 2003/0177082 A1 | 9/2003 | Buckwalter |
| 2003/0177085 A1 | 9/2003 | Buckwalter et al. |
| 2004/0002913 A1 | 1/2004 | Breen et al. |
| 2004/0024689 A1 | 2/2004 | Zhou et al. |
| 2004/0030630 A1 | 2/2004 | Tilfors et al. |
| 2005/0021445 A1 | 1/2005 | Caro |

FOREIGN PATENT DOCUMENTS

| | | | |
|---|---|---|---|
| WO | WO-2004/042514 A2 | 5/2004 | |

OTHER PUBLICATIONS

"Competitive Developments in the Options Market; Proposed Rule." Federal Register, vol. 69, No. 26. (Feb. 9, 2004).

Feb. 16, 2007. International Search Report and Written Opinion for PCT Application No. PCT/US2005/036608.

Forsyth "The Electronic Investor: What Need for Speed? As Online Brokers Tout Fast Executions, SEC Data Show Most Trades Take Only Two Seconds" Barrons(Jul. 5, 2004).

Glosten et al., "Bid, Ask and Transaction Prices in a Specialist Market with Heterogeneously Informed Traders" Journal of Financial Economics, vol. 14, pp. 71-100 (1985).

Nov. 13, 2006. International Search Report and Written Opinion for PCT Application No. PCT/US2005/034538.

Nov. 8, 2006. PCT International Search Report and Written Opinion for PCT Application No. PCT/US2005/035792.

"Payment for Order Flow and Internalization in the Options Market." SEC Special Study, Office of Compliance and Examination/Office of Economic Analysis. (Dec. 2000).

"Self-Regulatory Organizations; Notice of Filing of Proposed Rule Change and Amendment No. 1 Thereto by the International Securities Exchange, Inc. to Establish Rules Implementing a Price Improvement Mechanism." Federal Register, vol. 69, No. 42. (Mar. 3, 2004).

Simon, "Brokerags Battle for Active Traders—Fidelity, Schwab, Others Cut Commissions for Best Customers: The One-Second Execution" The Wall Street Journal, (Jun. 22, 2004).

Tunick, "Playing the Wires: ATD's Trading Technology is Ahead of the Curve, But Can It reel in Retail Brokerages" Investment Dealers Digest, (Nov. 10, 2003).

U.S. Secruirities and Exchange Commission "Special Study: Payment for Order Flow and Internalization in the Options Markets" pp. 1-48 (Dec. 2000).

* cited by examiner

300

| Contract Symbol | Broker-Dealer | Bid | Offer |
|---|---|---|---|
| XYZ | Exchange 1 | (40) | (41) |
|  | Exchange 2 | 39 | 43 |
|  | Exchange 3 | 38 | 42 |
|  | Exchange 4 | 38 | 42 |
| PDQ | Exchange 1 | (17) | 20 |
|  | Exchange 2 | 16 | (18) |
|  | Exchange 3 | 16 | 19 |
|  | Exchange 4 | 16 | 20 |

FIG. 3

COMPUTER IMPLEMENTED AND/OR ASSISTED METHODS AND SYSTEMS FOR PROVIDING GUARANTEED, SPECIFIED AND/OR PREDETERMINED EXECUTION PRICES IN A GUARANTEED, SPECIFIED AND/OR PREDETERMINED TIMEFRAME ON THE PURCHASE OR SALE OF, FOR EXAMPLE, LISTED OPTIONS

CROSS-REFERENCE TO RELATED APPLICATION

This application claims priority to U.S. Provisional Patent Application No. 60/613,793, filed Sep. 27, 2004, which is hereby incorporated by reference herein in its entirety.

FIELD OF THE INVENTION

The present invention relates to computer implemented and/or assisted methods and systems for the trading of securities, such as listed options contracts. More particularly, this invention relates to computer implemented methods and systems for providing guaranteed, specified and/or predetermined execution prices and/or guaranteed, specified and/or predetermined timeframes on purchases and/or sales of a variety of securities, such as listed options contracts.

BACKGROUND OF THE INVENTION

There are several important players in the U.S. securities market, including investors, full-service broker-dealers, retail broker-dealers that do not execute their own orders but rather route their order flow to other broker-dealers for execution (also referred to herein as order flow providers, or OFPs), broker-dealers that consolidate order flow from multiple OFPs (also referred to herein as wholesalers, or consolidating broker-dealers), and market-makers. It will be understood that, as used herein, the term "broker-dealer" refers to any entity that, when acting as a broker, executes orders on behalf of his client, and that executes trades for his firm's own account when acting as a dealer.

Generally speaking, investors drive the market by entering orders to buy or sell one or more securities. An investor may be, for example, an individual or an institution, such as a mutual fund or a corporation. The OFPs in the market aggregate investor buy/sell orders, and deliver these orders to one or more consolidating broker-dealers (acting as wholesalers) or to market making firms.

In order to provide liquidity in the market, one or more dealers agree to maintain firm bid and ask prices in one or more specific securities. These dealers, which are commonly referred to as "market-makers," display bid and offer prices for these specific securities, and if these prices are met, will immediately buy for or sell from their own accounts. For example, almost every market (e.g., exchange, whether physical or virtual) where securities are traded has some form of market-maker that enters continuous two-sided quotations.

It is common for one or more market-makers on a given market to be provided significant responsibilities, including overseeing the opening, providing continuous quotations in all of their assigned securities, and handling customer orders that are not automatically executed in connection with that exchange. In the case of the U.S. equities and options exchanges, these market-makers, which are responsible for maintaining fair and orderly markets, are generally termed "specialists." Depending on the particular exchange, the "specialist" may be referred to as, for example, a designated primary market-maker (DPM), lead market-maker (LMM), or primary market-maker (PMM), etc. Other market-makers in the crowd on an exchange floor, if any, are referred to as "floor market-makers." As also known in the art, for U.S. listed equities (e.g., stocks listed on the American Stock Exchange (AMEX) or the New York Stock Exchange (NYSE)), there are also firms that make markets off the exchange floor, and these firms are known as "over-the-counter" (OTC) market-makers or third market-makers.

Over the last half-century, the U.S. equities market has evolved into the widely accessible, efficient market we know today. This transformation has been driven, in part, by the demands of both retail and institutional investors for high quality and efficient trade execution.

Moreover, pricing efficiency in the U.S. equities market has benefited from various regulations that have been set forth by the Securities and Exchange Commission (SEC), the various securities exchanges, and the National Association of Securities Dealers (NASD), which is a self-regulatory organization (SRO) responsible for the operation and regulation of NASDAQ and over-the-counter markets. For example, a broker-dealer or market-maker must seek to obtain "best execution" (with order pricing being a significant factor) when handling a customer's equities order. In addition, there is a prohibition (subject to exceptions) in the listed equities markets against the practice of "trading-through," in which a customer's order for an exchange listed equity is executed at a price inferior to the best available bid or offer. This trade-through prohibition does not apply, however, to NASDAQ listed equities. Moreover, under the SEC's "firm quote" rule, which is also subject to exceptions, a broker-dealer or market-maker is required to execute any equities order presented to it to buy or sell a security at a price at least as favorable to the buyer or seller as its published bid or offer, up to its published quotation size. These and other requirements help to ensure a relatively transparent equities market.

Existing SEC rules require all equity market centers (e.g., exchanges and broker-dealers acting as market-makers) to report data regarding the execution quality (e.g., speed, effective spread, trade-throughs) of their trades. These rules allow investors and broker-dealers to identify and avoid those market centers with a record of poor execution quality, in favor of those with better execution quality histories. In some circumstances, the broker-dealer community as a whole may seek to at least partially reduce (or completely eliminate) its exposure to a particular exchange, trading system, or market-maker in response to consistent execution of low quality (e.g., slow or mis-priced) equities trades by that market center. In such cases, even at times when that market center has a quote representing the "national-best-bid-or-offer" (NBBO), the other broker-dealers in the community may choose to internalize their trades (see below), if possible, or to route their orders to another venue.

FIG. 1 is a simplified illustration of one example of an order flow in the U.S. equities market. In general, as shown, investor 110 submits an order to buy or sell an equity (or equities) to his OFP 120, which submits that order to wholesaler, or consolidating broker-dealer 130. In turn, consolidating broker-dealer 130 either internalizes the order (as explained below) or takes the order to an appropriate exchange of equities market 140 for execution. Equities market 140 shown in FIG. 1 may include, for example, the AMEX, the NYSE, NASDAQ (formerly referred to as the National Association of Securities Dealers Automated Quotation system), one or more electronic communications networks (ECNs), and one or more third market-makers. In equities market 140, publicly traded equities listed on one exchange can be traded, for example, on one or more regional stock exchanges (not shown), certain ECNs, and NASDAQ's SuperMontage system. It should also be noted that, with regard to NASDAQ (which is a competing dealer system and is currently not considered an "exchange"), consolidating broker-dealers can route orders in NASDAQ securities to NASDAQ's SuperMontage system, the NASD's Alternative Display Facility, ECNs, or specific NASDAQ market making firms.

In terms of fees associated with the order flow shown in FIG. 1, investor 110 pays OFP 120 a commission for executing his trade, while consolidating broker-dealer 130 pays OFP 120 for providing a given volume of order flow. The profit for consolidating broker-dealer 130, when internalizing the trade (as explained below), is made at the level of the trade execution, and is based on the spread between bid and offer prices for the equity (or equities) being bought or sold by investor 110. If consolidating broker-dealer 130 routes the order (e.g., to an exchange) for execution by another entity, however, consolidating broker-dealer 130 may receive some form of payment for the order flow (e.g., depending on the exchange that the order was routed to). When consolidating broker-dealer 130 is a full-service broker-dealer, for example, orders from investor 110 may be sent directly to consolidating broker-dealer 130 (which may then internalize the order or take the order to an appropriate exchange of equities market 140 for execution).

The concept of "trade execution quality" has emerged as a benchmark for investors to compare and contrast brokerage service providers along several dimensions, such as transaction costs, quote certainty, execution speed, price improvement, and market liquidity. In general, the growth of the investor community has placed continual pressure on service providers to improve execution quality along each of these dimensions.

The speed with which investor orders are filled in the U.S. equities market has benefited from the fact that broker-dealers who are OTC market-makers in listed equities and/or NASDAQ market-makers have the ability to "internalize" trades, in which they fill an order received from an OFP out of their own inventory in that equity. FIG. 2 is a simplified illustration of one example of an order flow in the U.S. equities market in which an order placed by investor 110 is internalized by consolidating broker-dealer 130. The ability of consolidating broker-dealer 130 to internalize a trade in the equities market affords it an opportunity to offer investors (such as investor 110) improved order execution speed. In addition, internalized orders have been known to receive some level of price improvement over the NBBO, with broker-dealers sometimes offering better fill prices to OFPs in exchange for a guaranteed level of trading volume.

Overall, the competitive landscape in the equities markets, along with the rapid expansion of internalization, have combined to provide investors with better execution quality along the price improvement and execution speed dimensions. For example, the equities market has progressed extremely rapidly over the last several years from ten-second trade execution guarantees to more recent guarantees of one-second executions, and at increasingly narrow bid/offer spreads.

As with equities, there is a very large market in the U.S. for the trading of options, which are financial instruments that are designed to provide the right, but not the obligation, to buy (for a call option) or sell (for a put option), for example, a specific amount of a given stock, commodity, currency, index, or debt, at a specified price (the strike price) during a specified period of time. Currently, listed options contracts can be traded on one or more of six national securities exchanges registered with the SEC. These exchanges are the AMEX, the Boston Options Exchange (BOX), the Chicago Board Options Exchange (CBOE), the International Securities Exchange (ISE), which is now the largest market for the trading of equity options, the Pacific Exchange (PCX), and the Philadelphia Stock Exchange (PHLX). The first four of these exchanges to come into existence, the AMEX, the CBOE, the PCX, and the PHLX, have traditionally used physical trading floors on which specialists and/or floor market-makers provide liquidity in assigned options classes, subject to certain affirmative and negative obligations. The ISE and the BOX, on the other hand, are both fully electronic options exchanges that began operating in the past few years largely following a demand for increased automation.

The U.S. options market also operates under SEC and exchange regulations regarding best execution and firm quotes, and is subject to rules designed to prevent trade-throughs generally, filling an order at a price inferior to the NBBO). In order to determine the NBBO for an option contract, which may be trading on more than one exchange, it is necessary to gather information from potentially multiple exchanges. This is accomplished in the following manner. The Option Price Reporting Authority ("OPRA") transmits quotations and trade reports from the options market to vendors for dissemination to the public. OPRA streams an NBBO data feed for the options market by aggregating the highest priced bid and lowest priced offer quoted at the time on all of the registered options exchanges. If two exchanges are quoting at the same price which would set the NBBO, the exchange quoting the larger number of contracts will be designated the NBBO. If the quotes have the same number of contracts as well, the first exchange to post the quote will be designated the NBBO.

FIG. 3 is a table 300 showing illustrative bids and offers received from various exchanges in connection with options contracts "XYZ" and "PDQ," which are to be gathered and disseminated through OPRA. It will be understood that, when there is intra-exchange competition, each exchange will generally collect the individual quotes by its specialists and market-makers and send its best-bid-or-offer (BBO) to OPRA. OPRA then uses the various exchange BBOs to calculate the NBBO. With regard to options contract "XYZ," it can be seen from table 300 that Exchange 1 provides the best (i.e., highest) bid of "40," and also provides the best (i.e., lowest) offer of "41." Accordingly, the best bid for "XYZ" is 40, and the best offer for "XYZ" is "41". For options contract "PDQ," meanwhile, it can be seen from table 300 that the best bid for "PDQ" is "17," and the best offer for "PDQ" is "18." To facilitate the reading of table 300, the best bids and offers (NBBO) for both "XYZ" and "PDQ" have been circled. It will be understood that the bids and offers provided in table 300, as well as the number of exchanges shown for each type of contract, are for illustrative purposes only.

The options intermarket "linkage" system provides specialists and floor market-makers with the ability to reach superior prices in other exchanges, and is designed to encourage efficient pricing and best execution for customer orders. FIG. 4 is a simplified illustration of the linkage system used to connect various exchanges in the U.S. options market. As shown in FIG. 4 (and mentioned above), the U.S. options market 440 includes the following exchanges: AMEX 442, BOX 443, CBOE 444, ISE 445, PCX 446, and PHLX 447. The NBBO is determined with regards to these options exchanges 442-447 as described above. The linkage system 450 provides certain participants in one market (exchange) with an automated means of obtaining access to better prices displayed in another market (exchange). When an order is routed to an exchange that is not displaying the NBBO, as explained in greater detail below, that exchange generally must either match the NBBO or transmit the order to the market that is quoting the superior price. An exchange that receives an incoming linkage order that represents an underlying customer order generally has fifteen seconds to either execute the order in whole, or execute the order in part (e.g., when the incoming linkage order is larger than the "Firm Customer Quote Size"), cancel the rest, and move its displayed quotation to an inferior price. As also shown in FIG. 4, linkage system 450 uses telecommunication links 461-466. It will be understood that these links may operate using any of a number of known electronic data exchange mechanisms, including local and wide area networks, optical cable connections, dial-up telephone connections, the Internet, etc., and may be wire or wireless based.

The linkage system requires exchanges to avoid executing trades at prices inferior to the best available prices (e.g., "trade-throughs"), as represented by the NBBO disseminated by OPRA. For example, if an exchange that receives an investor's order through an automatic execution system, or electronic order routing system, is at the NBBO, the order will generally be automatically executed at the NBBO (assuming the order is for a number of contracts less than a threshold quantity), with the specialist receiving a certain share of the order based on the exchange rules. However, if the investor's order is routed to an exchange that is not at the NBBO (e.g., because the exchange receiving the order is faster or offers greater certainty of execution than other markets), generally speaking, that exchange must either "step up" and at least match the NBBO or route the order away to another exchange that is displaying the NBBO. Assuming the order is not routed away, it is possible for the specialist (or other type of market-maker, if the exchange permits) to "step up" and fill up to 100% of the order at the NBBO.

It should be noted, however, that the linkage system does not prohibit trade-throughs in all cases, but requires that market participants avoid initiating trade-throughs unless one of a list of SEC-approved exceptions applies (e.g., in the case of "fast" or otherwise unusually volatile market conditions). In fact, the wide-spread invocation of such exceptions to the firm quote and trade-through rules has created a difficult environment for market participants seeking to provide better execution quality for customers.

FIG. 5 is a simplified illustration of one example of an order flow in the options market. As shown, investor 510 submits an order to buy or sell one or more options contracts to OFP 520, which submits that order to a wholesaler, or consolidating broker-dealer 530. In turn, consolidating broker-dealer 530 checks the NBBO (which is determined, for example, as described above), as well as the exchange(s) on which the order may potentially be executed. Based on its duty to seek to obtain best execution for investor 510, broker-dealer 530 takes the order to an appropriate exchange of options market 540 (which includes, for example, the exchanges associated with options market 440 shown in FIG. 4 and described above) for execution. If the order is routed to a floor-based exchange, and, for example, it is not eligible for automatic execution or is represented by a floor broker, it will generally be exposed to a physical auction on the exchange floor. In this case, the order will finally be filled by the specialist and floor market-makers based upon exchange-specific priority rules. However, this process may take, for example, between ten to fifteen seconds, and even up to several minutes, to complete. Alternatively, if the order is routed to a purely electronic exchange, a more rapid electronic auction and filling process occurs. However, the requirements of linkage can introduce delay to this process as well, as some orders may be required to be routed to floor-based exchanges in order to avoid a trade-through (execution at a price inferior to the NBBO).

In terms of fees associated with the order flow shown in FIG. 5, investor 510 pays OFP 520 a commission for executing his trade, while consolidating broker-dealer 530 pays OFP 520 for providing a given volume of order flow. When consolidating broker-dealer 530 simply takes the order from OFP 520 and routes it to an exchange, it generally receives some form of payment from the exchange. If a market-maker (e.g., specialist) that is associated with consolidating broker-dealer 530 handles the order on the exchange, however, the profit for consolidating broker-dealer 530 may be at least partially based on the spread between bid and offer prices for the option contract. It is possible for OFP 520 to be bypassed by investor 510, and, for example, for the order to be provided directly to a full-service broker-dealer for execution.

There are important differences between the U.S. options and equities markets which have the potential to reduce the execution quality available to investors in listed options contracts. For example, U.S. options broker-dealers cannot internalize trades (fill orders received from their own inventory of options contracts) in the same way that equity broker-dealers can. In particular, the rules of the Options Clearing Corporation (which is the issuer of all listed options contracts in the U.S. options market) require that all transactions in listed options take place through the facilities of an exchange. Accordingly, it is not possible for an options broker-dealer to perform, for example, an "upstairs" or "over-the-counter" transaction in a listed options contract. Rather, options broker-dealers can internalize a trade only after certain conditions have been met. For example, in the case of a "facilitation cross," a broker-dealer may execute a customer order as principal only after the order has been exposed to the market via an auction process. This auction allows members of the crowd on that exchange to participate in the trade at the proposed or an improved price. The broker-dealer is only entitled to trade with the customer (by crossing the customer's order and the order for the firm's own account) after other better-priced quotes and public orders have been filled. In the equity markets, no such market exposure need take place. Rather, unlike in the options market, "upstairs" block trading by a broker-dealer, for example, is permissible in the equities market. According to the invention, another and new form of internalization in the U.S. options market (referred to as "pseudo-internalization") is described below.

Another significant difference between the U.S. options market and the equities market relates to the manner in which market participants deal with market "misbehavior." As explained above, SEC rules require equity market centers (e.g., exchanges and broker-dealers acting as market-makers) to report data regarding the execution quality of their trades. However, in the options markets, there are no universally accepted metrics for reporting execution quality, and as a result, there are no regulations requiring that such data be reported. This makes it very difficult for investors or broker-dealers to discourage certain behaviors of, for example, an offending specialist on an exchange (e.g., by taking their business to an exchange that has a record of better execution quality).

Another problem associated with the U.S. options market relates to the possibility of "stale quotes." An example of the potential ramifications of stale quotes is now provided. Referring again to FIG. 5, assume that consolidating broker-dealer 530 is associated with (e.g., part of the same legal entity as) a specialist in XYZ option contracts on the ISE (in this case, the specialist is referred to as a PMM). Moreover, assume that the bid price on XYZ call options is falling rapidly in real time due to recently released news about the company, and that the NBBO bid of "40" for XYZ (as shown in table 300 of FIG. 3) is actually a stale bid displayed by one of the manual options exchanges (with the theoretical fair value of the option having dropped to "38"). This stale bid situation may arise, for example, when an exchange specialist claims exceptions from his firm quote obligations (in order to delay trade execution until conditions are more favorable or to not fill the order at all), and the exchange is slow to update its quotes to reflect market developments. If the PMM associated with consolidating broker-dealer 530 is bound by a rapid execution guarantee and has agreed to always "step up" to the NBBO, a knowledgeable trader would see this quote-value discrepancy and be able to exploit the rapid execution guarantee by forcing the PMM associated with consolidating broker-dealer 530 to buy at "40" (to match the NBBO) even though the PMM was bidding at a lower price and, in fact, thinks the contract is only worth "38." The trader is thus able to earn a potentially sizable profit, while consolidating broker-dealer 530 and/or its associated PMM is forced to absorb the loss due to the stale quote. The stale quote problem has created significant barriers for broker-dealers seeking to improve the level of execution quality which they offer to options investors.

Several innovations have been introduced in the past by options market participants to try to improve execution quality. One such development has been the expansion of automated trading systems onto the original floor-based exchanges. A specific example of this is the growing prevalence of automatic execution ("auto-ex") systems for executing relatively small orders quickly and efficiently. Under such systems, orders routed to an exchange involving fewer than a threshold number of contracts may be tagged as "auto-ex" eligible, and will be executed at the prevailing bid/offer (the exchange's disseminated price) without exposure to auction on the exchange floor. The disseminated price on most floor-based exchanges is typically a specialist's "auto-quote," which is updated based on characteristics of the option (e.g., volatility, interest rate, dividend). The auto-ex systems offer the potential of improved execution speed; however, the size limitations and its potential limitation to retail customer orders (not professional orders) make them only a partial solution for option trade execution quality problems.

On another front, floor-based exchanges are also developing hybrid electronic trading systems to improve execution quality along the pricing dimension by encouraging quote competition. This is an effort to move closer to the electronic exchange model, in which multiple parties (e.g., specialists and market-makers) compete to set an exchange's BBO level. For example, the CBOE Hybrid Trading Platform, which was introduced in 2003, allows specialists (referred to on that exchange as DPMs) and market-makers to electronically submit quotes for certain (but not all) designated options classes. These quotes, taken together with electronically submitted floor broker bids submitted on behalf of customers, are aggregated to determine the CBOE's BBO. This provides a similar competitive quotation result to the all-electronic ISE. The PCX Hybrid Trading Platform, also introduced in 2003, is very similar. While these efforts have yielded some level of improved pricing, in the form of narrower spreads, they have had a limited impact on overall execution quality as they are limited to only certain designated option classes. For option classes not designated for trading using such hybrid systems, the specialist auto-quote remains the disseminated quote.

On the electronic exchange front, there have also been efforts to improve execution quality. The Boston Options Exchange (BOX) has implemented an electronic trading mechanism referred to as the Price Improvement Period (PIP) which is described in WO/2004/042514 to Peterffy, published May 21, 2004, and is hereby incorporated by reference herein in its entirety. Moreover, the ISE recently proposed to implement an electronic trading mechanism referred to as the Price Improvement Mechanism (PIM). A description of the ISE's proposed PIM is available at http://www.sec.gov/rules/sro/ise/34-49323.pdf, which is also incorporated herein by reference in its entirety. Both systems attempt to improve execution quality along the pricing dimension, although they still involve relatively time-consuming electronic auctions prior to order execution.

Thus, while progress has been made on improving execution quality along the pricing dimension, there remains a need for systems and methods which increase the speed and certainty of option trade execution for both retail and professional orders. Moreover, systems and methods are needed which do so consistent with best-execution regulatory requirements, while simultaneously minimizing the executing broker-dealer's stale quote risk. In light of the above, it would be desirable to enable a process that would allow a broker-dealer to provide a rapid execution guarantee in the options market, while simultaneously minimizing exposure to the negative consequences associated with stale quotes and other peculiarities of the options market structure and regulation. The ability to offer guaranteed, specified and/or predetermined execution prices in a guaranteed, specified and/or predetermined timeframe for investors would result in greater price certainty, better overall execution quality, increased investor confidence and a shift toward true efficiency in the options market.

SUMMARY OF THE INVENTION

Computer-implemented and/or assisted methods and systems are provided which enable options broker-dealers to guarantee execution of an options order at a guaranteed, specified and/or predetermined execution price and/or within a guaranteed, specified and/or predetermined timeframe. By providing means, devices and/or processes to quantify and mitigate the effects of several factors which contribute to options market inefficiency (e.g., market structure, regulatory constraints, and "market misbehavior"), these methods and systems eliminate or at least partially reduce the level of broker-dealer risk inherent in offering a rapid order execution (e.g., speed) guarantee, while simultaneously providing better execution quality for investors.

In one embodiment of the invention, a method of executing an order for a listed options contract at a guaranteed order execution price and/or a guaranteed order execution timeframe includes the sequential, sequence independent and/or non-sequential steps of receiving the order by a first broker-dealer, processing the order by a first routing system to determine a presence of a first affiliate market-maker of the first broker-dealer with step-up capability for the listed options contract on a first options exchange, and, when the first affiliate market-maker is present, sending the order from by the first broker-dealer to the first options exchange for execution in accordance with at least one of a first guaranteed order execution price and a first guaranteed order execution timeframe. If it is determined that the first affiliate market-maker is not present, the method includes sending the order to a second broker-dealer for execution in accordance with at least one of a second guaranteed order execution price and a second guaranteed order execution timeframe upon a determination by at least one of the first routing system and a second routing system that there is a second affiliate market-maker of the second broker-dealer with step-up capability for the listed options contract on at least one of the first options exchange and a second options exchange.

In alternative embodiments, the method includes the first affiliate market-maker executing the order when the order is not automatically executed by the first options exchange.

In alternative embodiments, the method includes the second affiliate market-maker executing the order when the order is not automatically executed by the second options exchange In alternative embodiments, the method includes using an electronic system with an automatic step-up feature of the first affiliate market-maker.

In alternative embodiments, the method includes sending the order by the second broker-dealer to one of the first and second options exchanges when the order is sent to the second broker-dealer for execution.

In alternative embodiments, the first affiliate market-maker is a specialist of the listed options contract on the first options exchange.

In alternative embodiments, the second affiliate market— is a specialist of the listed options contract on at least one of the first and second options exchanges.

In alternative embodiments, the order is received from an order flow provider, which sends the order to the first broker-dealer.

In alternative embodiments, the order is placed by either an investor or an order flow provider.

In alternative embodiments, the order is rejected if it is determined to be ineligible for execution in accordance with at least one of the first guaranteed order execution price and the first guaranteed order execution timeframe or ineligible for execution in accordance with at least one of the second guaranteed order execution price and the second guaranteed order execution timeframe.

In alternative embodiments, the method includes executing a modified version of the order in accordance with one of the first and second guaranteed, specified and/or predetermined execution prices and timeframes.

In alternative embodiments, the method includes executing the order using at least one of an automatic execution system of the exchange to which the order is sent and an electronic system with an automatic step-up feature that is associated with the first or second affiliate market-maker.

In alternative embodiments, the first broker-dealer, the second broker-dealer, and at least one of the first and second affiliate market-makers are part of a rapid execution consortium. In alternative embodiments, the rapid execution consortium includes one or more additional broker-dealers.

In alternative embodiments, the method includes analyzing the order to determine its eligibility for execution in accordance with the first or second guaranteed order execution price and/or timeframe. In alternative embodiments, the method includes rejecting the order based on the eligibility determination. In alternative embodiments, the method includes executing a modified version of the order in accordance with one of the first and second guaranteed order execution prices and/or timeframes based on the eligibility determination.

In alternative embodiments, analyzing the order to determine its eligibility includes determining whether the parameters of the order fall within a rapid option order execution envelope. In alternative embodiments, analyzing the order to determine its eligibility includes reviewing one or more parameters of the order relating the theoretical value of the options contract, the frequency of order submission, the NBBO market source, the NBBO size, the liquidity of the options contract in the market, the liquidity of the underlying equity or equities, the implied spread (NBBO), one or more of the price sensitivity measures associated with the options contract, the implied option contract price volatility, the size of the order, the identity of the options contract, and/or the class of the options contract. In alternative embodiments, the order is subject to execution according to the first or second guaranteed order execution price and/or timeframe only after it is determined to be eligible.

In alternative embodiments, the method includes determining conformance of the order with a rule-set. In alternative embodiments, the order is subject to execution according to the first or second guaranteed order execution price and/or timeframe only after it is determined to be in conformance with the rule-set. In alternative embodiments, the order is executed without being subject to either of the first and second guaranteed order execution prices and/or timeframes based on the conformance determination. In alternative embodiments, the order is rejected based on the conformance determination. In alternative embodiments, a modified version of the order is executed in accordance with the first or second guaranteed order execution price and/or timeframe based on the conformance determination.

In another embodiment of the invention, a method of executing an order for a listed options contract at a guaranteed, specified and/or predetermined execution price and within a guaranteed, specified and/or predetermined timeframe includes the sequential, sequence independent and/or non-sequential steps of processing the order by a routing system to determine which of a plurality of market-makers has step-up capability for the listed options contract on at least one options exchange, and sending the order to an options exchange on which a market-maker with step-up capability for the listed options contract operates for execution in accordance with a first guaranteed, specified and/or predetermined execution price and timeframe.

In another embodiment, a method executes an order for a listed options contract at a guaranteed, specified and/or predetermined execution price and within a guaranteed, specified and/or predetermined timeframe, and includes the sequential, sequence independent and/or non-sequential steps of forming a rapid execution consortium that includes a plurality of options market-makers, wherein the members of the rapid execution consortium collectively have step-up capability for a substantial portion of all listed options classes, and sending the order to an options exchange for execution in accordance with a first guaranteed, specified and/or predetermined execution price and timeframe based at least in part on the presence of a market-maker with step-up capability for the listed options contract on the exchange.

In yet another embodiment of the invention, a method of executing an order for a listed options contract at a guaranteed, specified and/or predetermined execution price and within a guaranteed, specified and/or predetermined timeframe includes the sequential, sequence independent and/or non-sequential steps of processing the order by a first routing system to determine which of a plurality of option broker-dealers of a rapid execution consortium has an affiliate market-maker with step-up capability for the listed options contract on at least one options exchange, providing the order to one of the option broker-dealers of the rapid execution consortium that is determined to have an affiliate that is a market-maker with step-up capability for the listed options contract on at least one options exchange, and sending the order to an exchange on which at least one affiliate market-maker with step-up capability for the listed options contract operates for execution in accordance with a guaranteed, specified and/or predetermined execution price and timeframe.

In another alternative embodiment, a method executes an order for a listed options contract at a guaranteed, specified and/or predetermined execution price and/or within a guaranteed, specified and/or predetermined timeframe using a computer includes the sequential, sequence independent and/or non-sequential steps of receiving the order by a first broker-dealer, processing the order by a first routing system to determine a presence of a first affiliate market-maker of the first broker-dealer with step-up capability for the listed options contract on a first options exchange, and, when the first affiliate market-maker is present, sending the order by the first broker-dealer to the first options exchange for execution in accordance with at least one of a first guaranteed, specified and predetermined execution price and/or within at least one of a first guaranteed, specified and predetermined timeframe. If it is determined that the first affiliate market-maker is not present, the method includes sending the order to a second broker-dealer for execution in accordance with at least one of a second guaranteed, specified and predetermined execution price and/or within at least one of a second guaranteed, specified and predetermined timeframe upon a determination by at least one of the first routing system and a second routing system that there is a second affiliate market-maker of the second broker-dealer with step-up capability for the listed options contract on at least one of the first options exchange and a second options exchange.

In alternative embodiments, the invention includes a computer system and/or tangible medium for implementing one or more of the methods.

In one embodiment, a computer system for executing an order for a listed options contract includes means for receiving the order by a first broker-dealer, means for processing the order by a first routing system to determine a presence of a first affiliate market-maker of the first broker-dealer with step-up capability for the listed options contract on a first options exchange, and means for sending the order by the first broker-dealer, if it is determined that the first affiliate market-maker is present, to the first options exchange for execution in accordance with at least one of a first guaranteed, specified and predetermined execution price and/or within at least one of a first guaranteed, specified and predetermined timeframe. According to various embodiments, the computer system also includes means for sending the order to a second broker-dealer, if it is determined that the first affiliate market-maker is not present, for execution in accordance with at least one of a second guaranteed, specified and predetermined execution price and/or within at least one of a second guaranteed, specified and predetermined timeframe upon a determination by at least one of the first routing system and a second routing system that there is a second affiliate market-maker of the second broker-dealer with step-up capability for the listed options contract on at least one of the first options exchange and a second options exchange.

In another embodiment, a computer system for executing an order for a listed options contract includes an input device receiving the order by a first broker-dealer, a first processor determining a presence of a first affiliate market-maker of the first broker-dealer with step-up capability for the listed options contract on a first options exchange, and an order transmitter for sending the order by the first broker-dealer, if it is determined that the first affiliate market-maker is present, to the first options exchange for execution in accordance with at least one of a first guaranteed, specified and predetermined execution price and/or within at least one of a first guaranteed, specified and predetermined timeframe. According to various embodiments, if it is determined that the first affiliate market-maker is not present, the order transmitter sends the order to a second broker-dealer for execution in accordance with at least one of a second guaranteed, specified and predetermined execution price and/or within at least one of a second guaranteed, specified and predetermined timeframe upon a determination by at least one of the first processor and a second processor that there is a second affiliate market-maker of the second broker-dealer with step-up capability for the listed options contract on at least one of the first options exchange and a second options exchange.

In alternative embodiments, the invention executes orders for other types of securities.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which:

FIG. 3 is a table showing illustrative bid and offers received from various market-makers in connection with two separate options contracts;

DETAILED DESCRIPTION OF THE INVENTION

Figure 1:
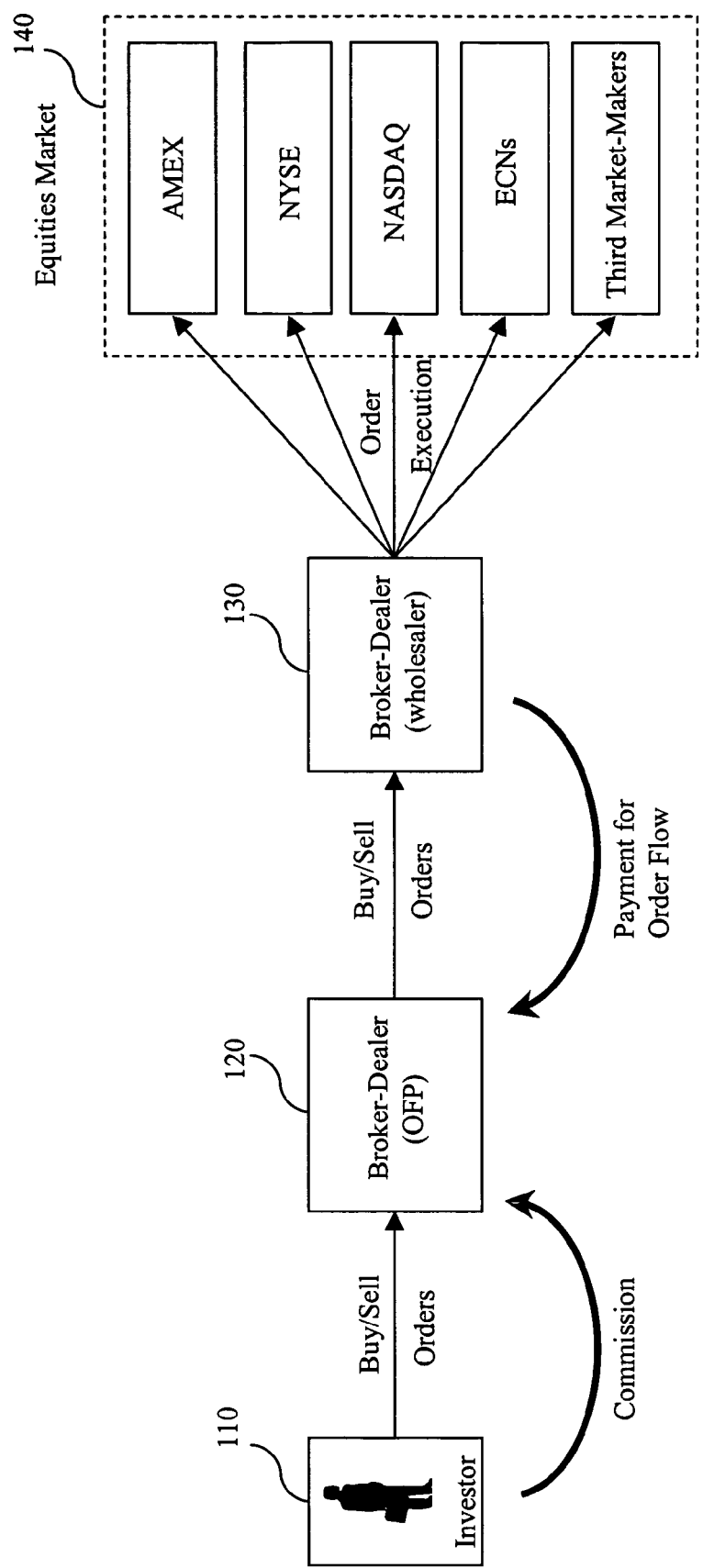
FIG. 1 is a simplified illustration of one example of an order flow in the U.S. equities market.
Figure 2:
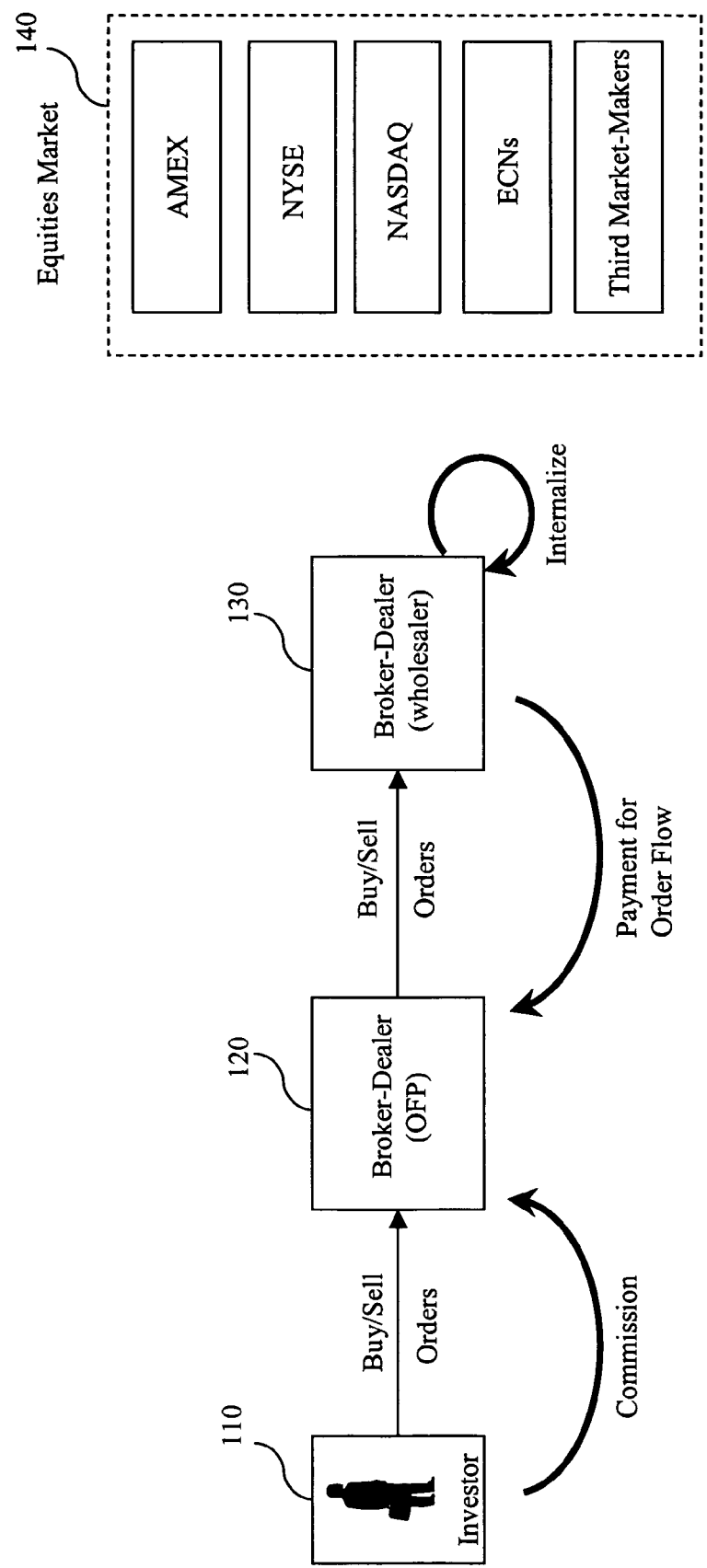
FIG. 2 is a simplified illustration of another example of an order flow in the U.S. equities market, in which an order placed by an investor is internalized by a broker-dealer.
Figure 4:
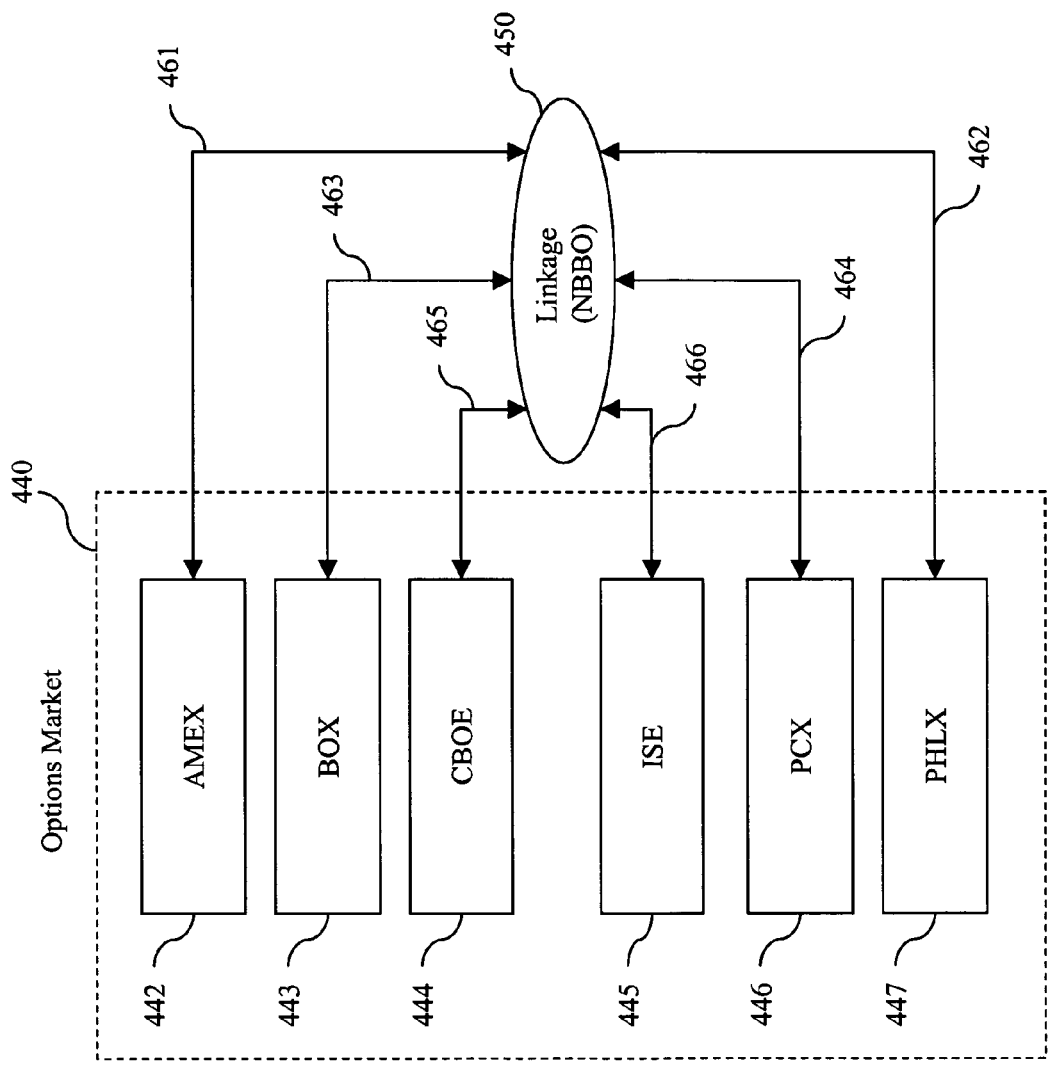
FIG. 4 is a simplified illustration of the linkage system used to connect various exchanges in the U.S. options market.

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

Computer implemented and/or assisted methods and systems are described for providing guaranteed, specified and/or predetermined execution prices, and/or guaranteed, specified and/or predetermined timeframes on purchases and/or sales of securities, such as listed options contracts. In accordance with at least one embodiment of the present invention, rapid order execution (e.g., speed) guarantees are provided for options orders using the concept of "pseudo-internalization." As explained above, options broker-dealers such as consolidating broker-dealer 530 cannot internalize trades for listed options in the same way that equity broker-dealers can, due to the rules set forth by the Options Clearing Corporation. However, in instances where consolidating options broker-dealer 530 is affiliated with a market-making firm that has a specialist or other market-maker with step-up capability on at least one exchange, for example, it can "pseudo-internalize" an order (as described below). It will be understood that, as used herein, a market-maker or market-making firm is said to be an affiliate of, or affiliated with, consolidating broker-dealer 530 when it is either directly or indirectly under certain obligations (or is willing to perform in a certain manner) with regard to certain orders sent by consolidating broker-dealer 530 to an exchange on which it operates (in the case of a market-maker), or on which one or more of its market-makers operates (in the case of a market-making firm). For example, the market-maker or market-making firm may have some form of obligation (whether contractual or otherwise), and/or there may be some form of agreement in place, according to which either it (in the case of a market-maker) or one or more of its market-makers (in the case of a market-making firm) will step up and fill certain orders sent to an exchange on which that capability exists, assuming that the order is not automatically executed by the exchange. It should be noted that, although frequent reference to an affiliated market-making firm is made herein, the individual market-makers of the market-making firm may also be considered to be affiliated with consolidating broker-dealer 530 in these cases. It should also be noted that, in the case of an affiliated market-making firm, the firm may be a part of the same legal entity as consolidating broker-dealer 530. In this case, the market-making firm and consolidating broker-dealer will generally be separated by a "Chinese wall." Moreover, an affiliated market-making firm may at least partially control or be controlled by consolidating broker-dealer 530, and/or may be under common control with consolidating broker-dealer 530. The invention is not limited in this manner.

An example of pseudo-internalization according to the invention is now provided. Assume that consolidating broker-dealer 530 is affiliated with an options market-making firm that has a PMM (or the only PMM) on the ISE. Moreover, assume that the PMM is thus obligated (and/or willing) to match the NBBO corresponding to a requested trade (either because of the PMMs direct relationship, or relationship though the market-making firm, with consolidating broker-dealer 530). In this case, for example, consolidating broker-dealer 530 is able to assure investor 510 of an execution at the NBBO or better via either automatic execution by the exchange or a step-up by the PMM within a certain guaranteed time frame. It will be understood that a step-up by a market-maker (e.g., specialist) as described herein may be manual, or, according to various embodiments of the invention, may be automated. For example, a market-maker could use an electronic system (e.g., a standard or commercially available electronic system, or a proprietary electronic system) with an automatic step-up feature to electronically step-up and fill an order when permissible (e.g., by communicating directly with an electronic exchange, such as the ISE, or with a hybrid trading system of a floor-based exchange). It will be understood, however, that the invention is not limited in this manner, and that any suitable system that allows a market-maker to step up and fill an order (e.g., at or better than the NBBO price) when permitted by the exchange may be used. Thus, when consolidating broker-dealer 530 is affiliated with an options market-making firm having one or more specialists or other market-makers with step-up capability for certain listed options classes, consolidating broker-dealer 530 may extend a guarantee of rapid execution for those options classes.

The above approach, however, represents a solution in only certain embodiments of the invention for OFPs and investors, as a given options market-making firm generally has one or more specialists and/or other market-makers for only some (e.g., up to 60%) of all available options classes. One alternate approach to implementing full or at least partial coverage of all options classes (covering, e.g., 30%, 50%, 75%, or 90% of all listed options classes), that may be independent and/or used in combination with the above described pseudo-internalization approach, is to assemble a "Rapid Execution Consortium" (REC). According to one embodiment of the invention, this REC includes a network of options market-making firms (each of which includes one or more specialists or other market-makers on at least one options exchange) representing up to 100% coverage of the full options market, where these firms and/or their specialists or other market-makers are, for example, contractually bound to immediately execute all orders routed to the relevant exchange or exchanges (both at the NBBO and within the guaranteed time window) when the orders are not automatically executed by the exchange system(s). As explained in greater detail below, these options market-making firms may or may not be a part of the same legal entity as the broker-dealer(s) that rely on their obligation (or willingness) to step-up and fill certain orders. In other embodiments, the REC may simply include individual market-makers (e.g., specialists), without including any market-making firms.

Figure 5:
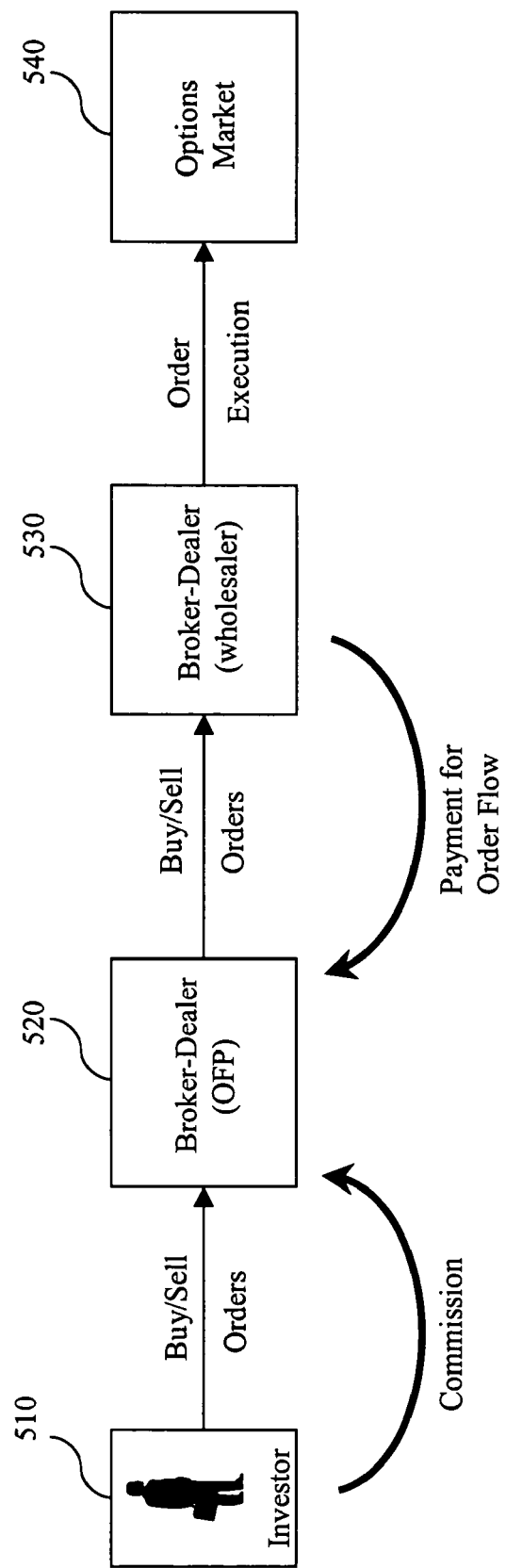
FIG. 5 is a simplified illustration of one example of an order flow in the options market.
Figure 6:
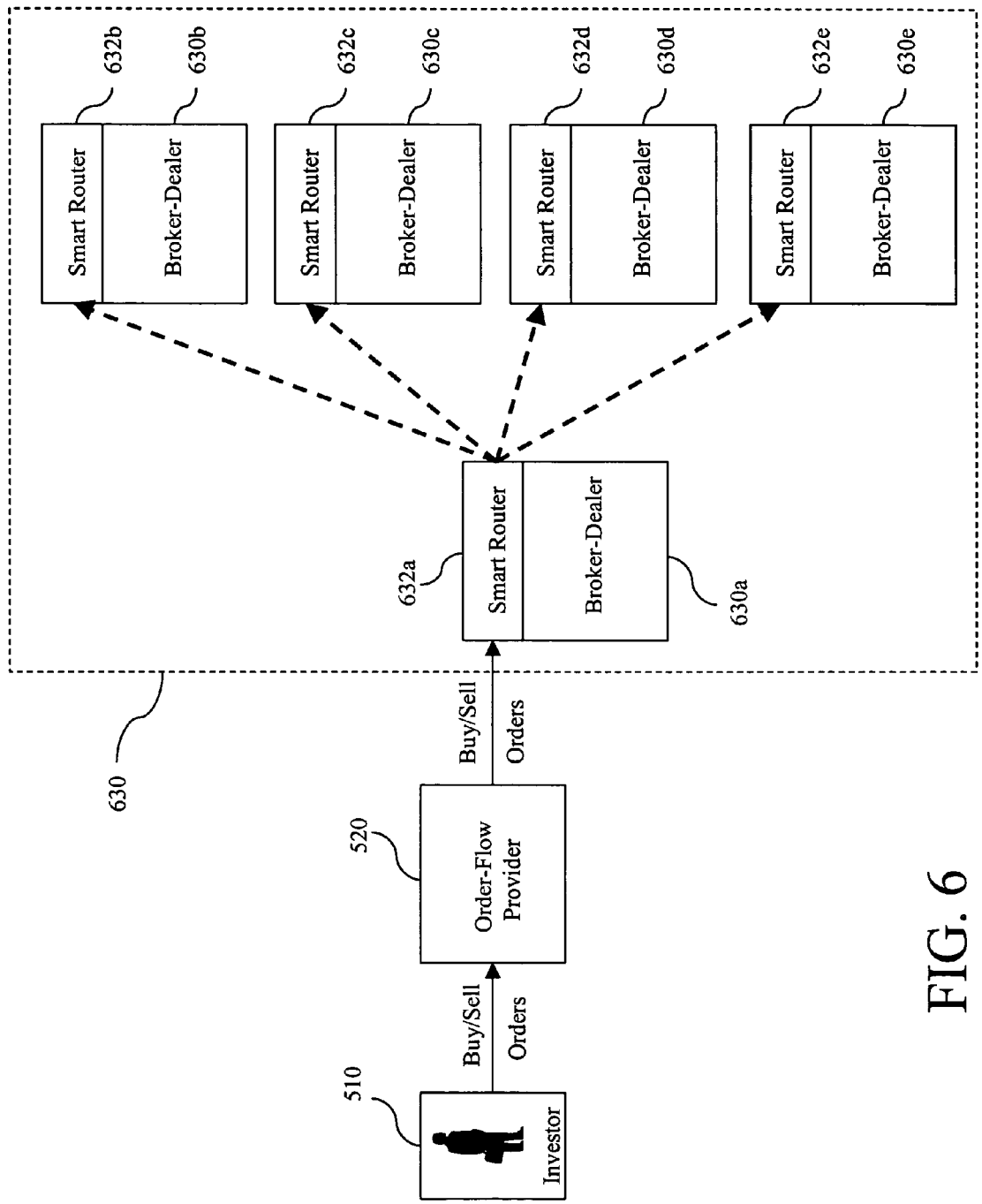
FIG. 6 shows an illustrative pseudo-internalization order flow in the options market, in which smart routers are associated with broker-dealers according to the principles of the present invention.

FIG. 6 shows an illustrative pseudo-internalization order flow according to the principles of at least one embodiment of the present invention. As shown, orders are placed by investor 510 to OFP 520, as was the case in the order flow shown in FIG. 5 and described above. The order flow of FIG. 6 includes REC 630 that is made up of wholesalers, or consolidating broker-dealers 630a-e and respective routing systems or "smart routers" 632a-e. For example, smart-router 632a (which is associated with, or a part of, broker-dealer 630a) receives an order that was sent to consolidating broker-dealer 630a from OFP 520. The order from OFP 520 (which originated from investor 510) is then analyzed (processed) by smart router 632a (e.g., by querying a database) to determine whether consolidating broker-dealer 630a is eligible to pseudo-internalize the order (e.g., to determine whether an affiliated market-making firm of consolidating broker-dealer 630a has a specialist or other type of market-maker that is able to step up and fill orders that are not automatically executed, for the option in at least one exchange). If not, smart-router 632a sends the order to the REC member (e.g., another one of consolidating broker-dealers 630b-e, as determined, e.g., by querying a database that includes information on all of the broker-dealers of REC 630) that does have such an affiliated market-making firm. In this manner, the present invention provides for the pseudo-internalization of orders of various (or all) types of options classes, and thus enables rapid execution of received orders.

It will be understood that, although REC 630 shows five consolidating broker-dealers 630a-e, the invention is not limited in this manner and any number of broker-dealers may optionally be used as part of an REC according to the invention. For example, according to various embodiments, the market-making firms affiliated with broker-dealers 630a-e, as mentioned above, may be part of REC 630. Alternatively, for example, one or more market-makers not part of a firm, one or more market-making firms not associated with any of broker-dealers 630a-e, or one or more additional broker-dealers not having an affiliated market-making firm with specialists or other market-makers with step-up capability for one or more options in at least one exchange, may be part of REC 630. Moreover, although options market 540 is not shown in FIG. 6, it will be understood that orders being executed by any of consolidating broker-dealers 630a-e will be sent to an options exchange for either automatic execution, or when the order is not eligible for automatic execution, for execution by a specialist or other market-maker with step-up capability (e.g., using a standard or proprietary electronic system with an automatic step-up feature) that is either a part of REC 630, or affiliated with a broker-dealer 630a-e that is a part of REC 630. In this manner, a rapid order guarantee may be provided according to the invention.

Figure 7:
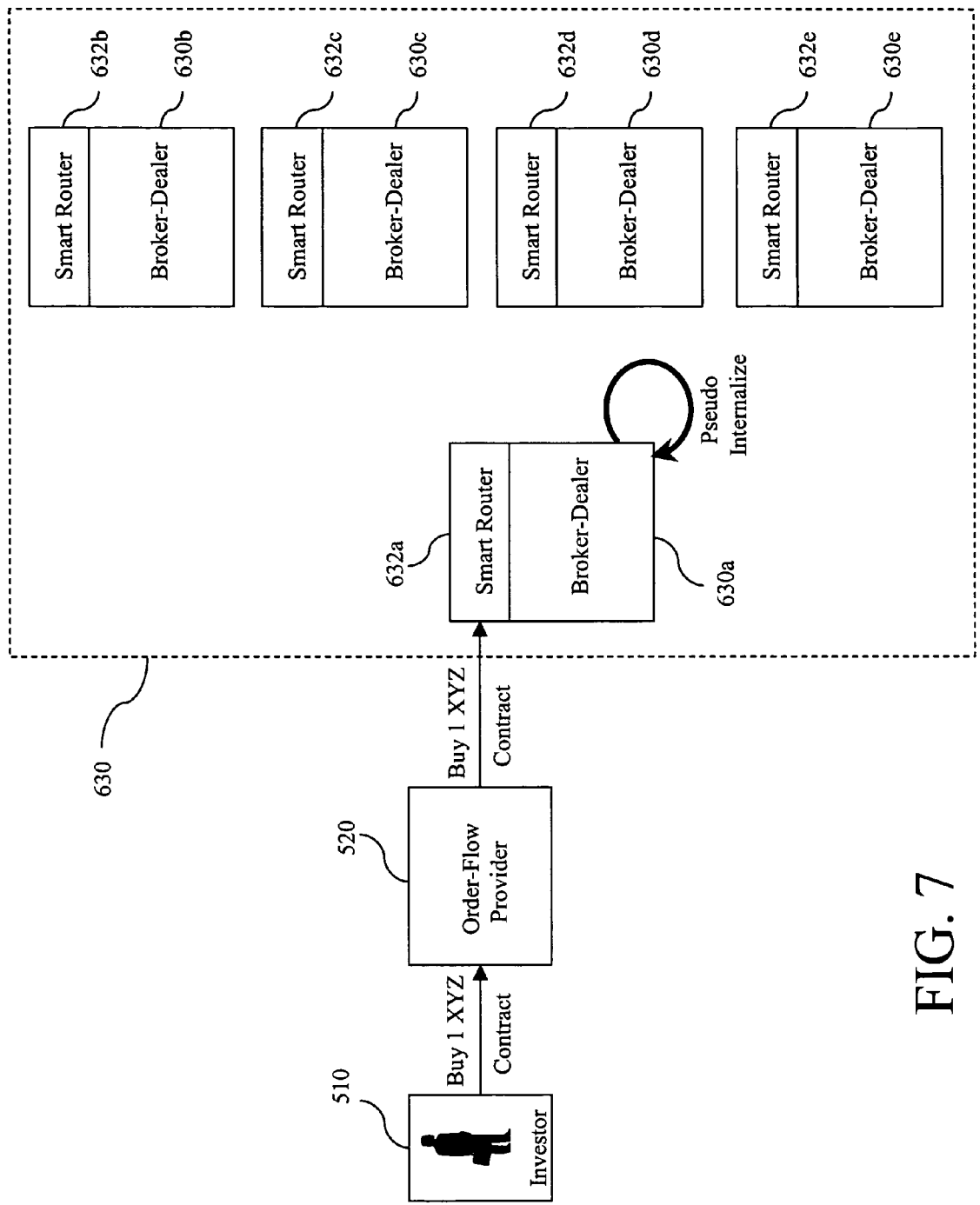
FIG. 7 shows an example of a pseudo-internalized transaction in the order flow of FIG. 6 according to the principles of the present invention.

FIG. 7 shows an example of a pseudo-internalized transaction according to the invention, which is based on the order flow shown in FIG. 6. As shown, investor 510 submits an order to buy one XYZ contract to his OFP 520. OFP 520 then sends the order to broker-dealer 630a. Smart router 632a determines that consolidating broker-dealer 630a has an affiliated specialist in XYZ option contracts on an options exchange (e.g., a PMM on the ISE), and thus sends the order of investor 510 to buy one XYZ contract to that exchange. In this example, because consolidating broker-dealer 630a has an affiliated specialist in XYZ option contracts, it is not necessary to rely on any of the other broker-dealers 630b-e of REC 630 to fulfill the rapid execution guarantee. It should be reiterated that, although much of the description provided herein refers to the sending of orders by a broker-dealer to an options exchange on which an affiliated specialist in the particular option is located, the invention is not limited in this manner. For example, if the ISE rules permit a maker-maker that is not a specialist (e.g., a competitive market-maker (CMM)) to step up and fill orders at the NBBO when they are not automatically executed, then the affiliate on the ISE need not be a specialist (e.g., a PMM on the ISE) in order for a broker-dealer to send appropriate orders to that exchange according to the invention. Rather, in this case, the affiliate may also be a CMM. Additional variations of the above processes are also possible.

Figure 8:
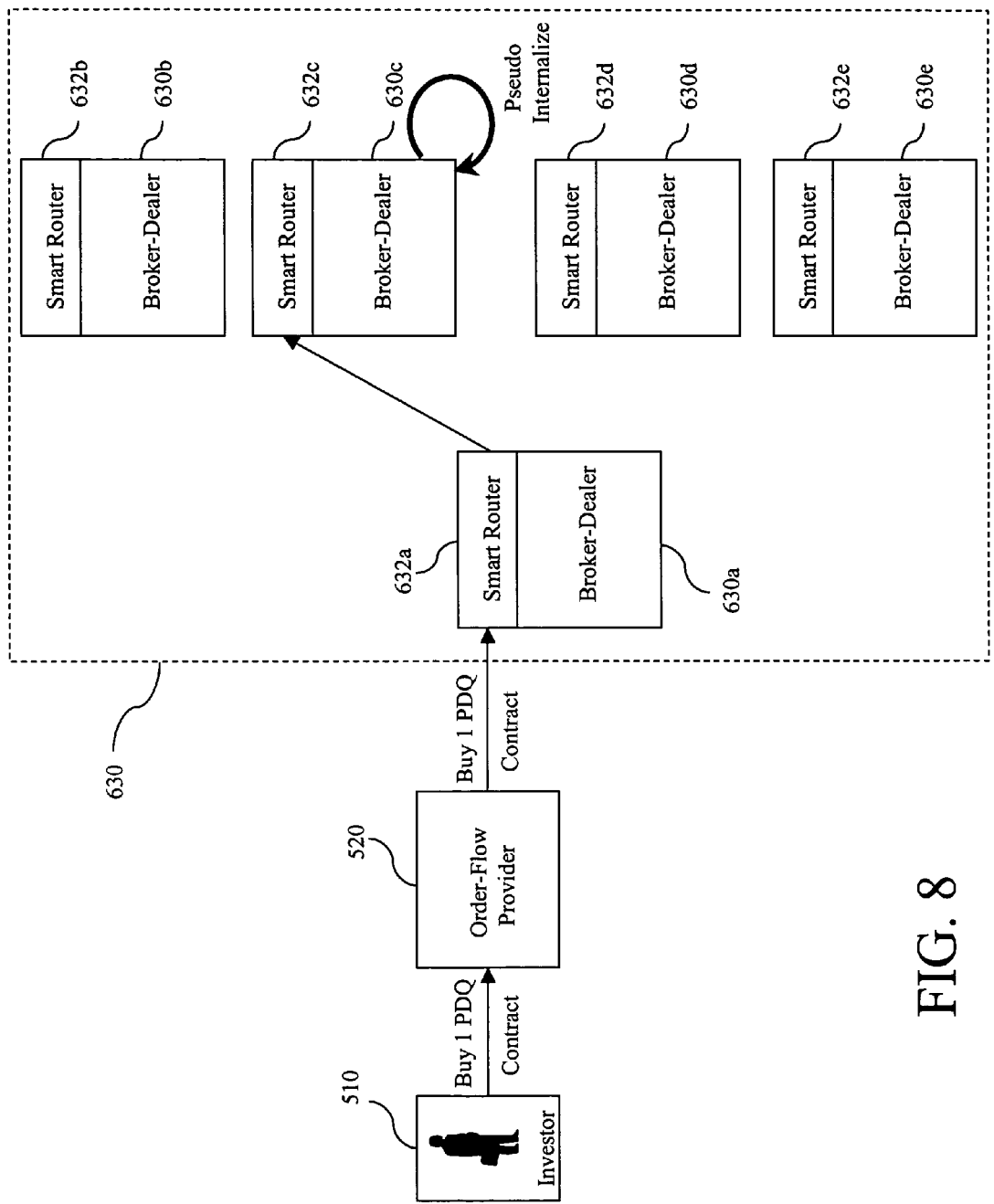
FIG. 8 shows another example of a pseudo-internalized transaction in the order flow of FIG. 6 according to the principles of the present invention.

FIG. 8 shows another example of a pseudo-internalized transaction according to the invention, which is also based on the order flow shown in FIG. 6. As shown, investor 510 submits an order to sell one PDQ contract to his OFP 520. OFP 520 then sends the order to consolidating broker-dealer 630a. At this time, smart router 632a determines that consolidating broker-dealer 630a does not have an affiliated specialist in PDQ option contracts, and directs the order to consolidating broker-dealer 630c which does have such an affiliated specialist. Upon receipt of the PDQ options order, smart router 632c recognizes that consolidating broker-dealer 630c has an affiliated specialist (or other market-maker with step-up capability) in PDQ option contracts, and instructs consolidating broker-dealer 630c to send the order to the appropriate exchange (e.g., the exchange on which its affiliated specialist in PDQ options is located).

Figure 9:
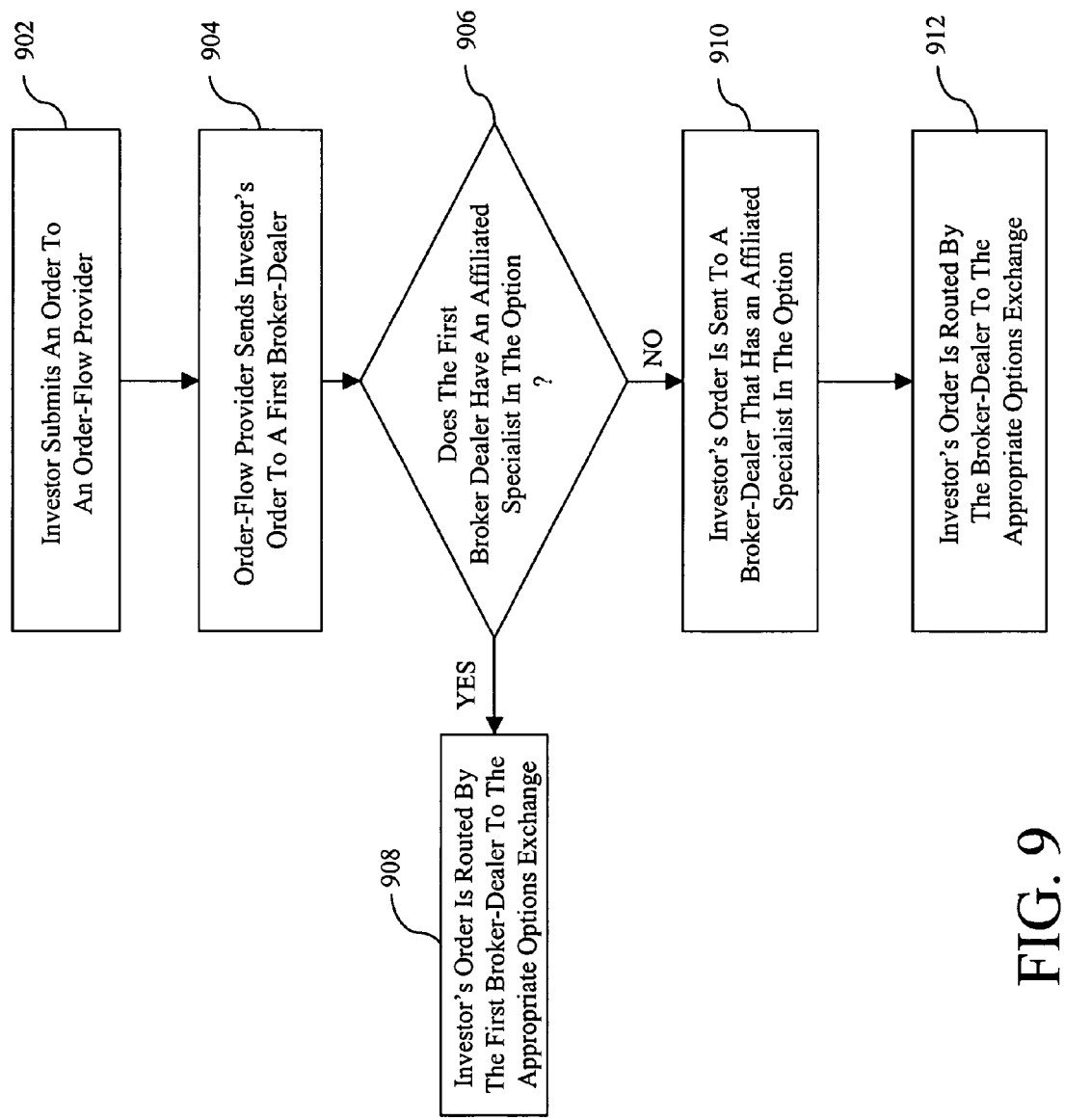
FIG. 9 is a simplified flow chart illustrating the steps performed in the execution of an investor's options order according to one embodiment of the present invention.

FIG. 9 is a simplified flow chart illustrating the steps performed in the execution of an investor's options order according to one embodiment of the present invention. In step 902, investor 510 submits an order (e.g., to buy or sell one or more options contracts) to order-flow provider 520. Next, in step 904, order-flow provider sends the options order submitted by investor 510 to consolidating broker-dealer 630a. At step 906, it is determined whether consolidating broker-dealer 630a has an affiliated specialist (or other market-maker with step-up capability) in the option. If consolidating broker-dealer 630a does have such an affiliated specialist, at step 908, the order submitted by investor 510 is sent by consolidating broker-dealer 630a to the appropriate exchange for either automatic execution or filling by the affiliated specialist (e.g., using a standard or proprietary electronic system with an automatic step-up feature). If consolidating broker-dealer 630a does not have such an affiliated specialist (or other market-maker with step-up capability), at step 910, the order is sent to one of consolidating broker-dealers 630b-e (depending on which has an affiliated specialist in the option), and the order of investor 510 is thereafter routed to the appropriate exchange.

As shown in FIGS. 6-8, a separate smart router may be a part of, or associated with, each consolidating broker-dealer (as described above). Alternatively, although not shown, one or more smart routers according to the invention may be associated with, or a part of, OFP 520. In this case, for example, the smart router may be used to send orders immediately to the appropriate one of consolidating broker-dealers 630a-e.

Figure 10:
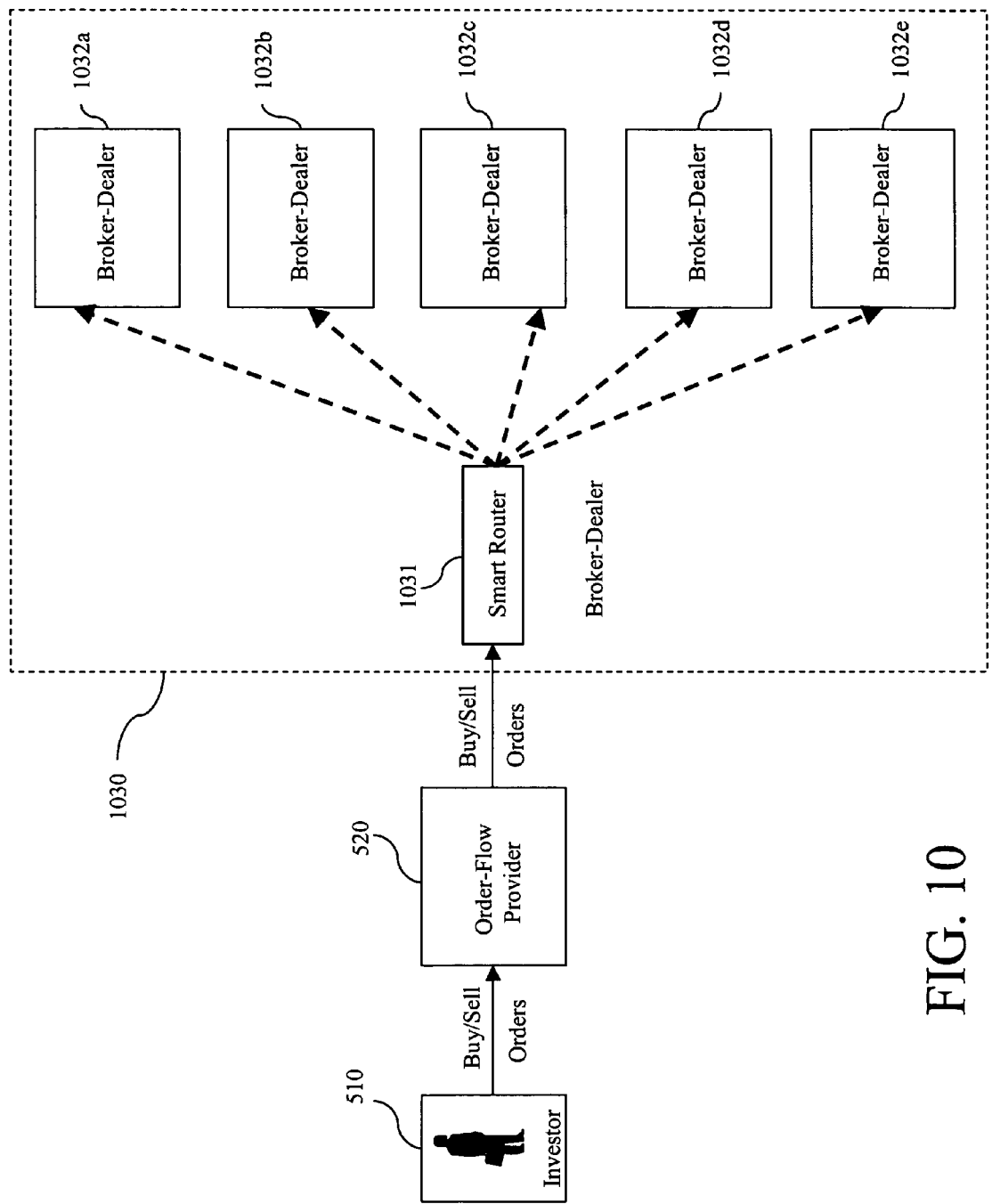
FIG. 10 shows an illustrative pseudo-internalization order flow in the options market, in which a single smart router is used in connection with a plurality of broker-dealers according to the principles of the present invention.

According to other embodiments of the present invention, a single smart router 1031 (either associated with, or separate from, a consolidating broker-dealer) may be used to route the order from OFP 520 to the appropriate one of consolidating broker-dealers 1032a-e of REC 1030, as shown in FIG. 10. In this case, smart router 1031 receives an order from OFP 520, and sends the order to the consolidating broker-dealer that has an affiliated specialist (or other market-maker with step-up capability) in the option. The consolidating broker-dealer that receives the order may then send the order to the exchange on which its affiliated specialist is located. When there are a plurality of consolidating broker-dealers that have such an affiliated specialist, smart router 1031 selects one of these consolidating broker-dealers to route the order to based on any suitable criteria. In alternate embodiments, any number of smart routers may be used. It will be understood that, even when a single smart router 1031 is used as shown in FIG. 10, oversight of smart router 1031 may be desirable. For example, according to various embodiments of the invention, an OFP (e.g., OFP 520) and/or one or more broker-dealers (e.g., one of consolidating broker-dealers 630a-e) may be responsible under the securities laws for regularly and rigorously reviewing execution quality of orders being routed by smart router 1031 to determine that orders are ultimately being routed to the exchange that provides best execution.

In the embodiments of the invention described above with regard to FIGS. 6-10, multiple consolidating broker-dealers, each having one or more affiliated specialists for one or more options, make up the REC. According to other embodiments of the present invention, the REC may include a single consolidating broker-dealer and multiple specialists (which may or may not each be affiliated with the consolidating broker-dealer).

Figure 11:
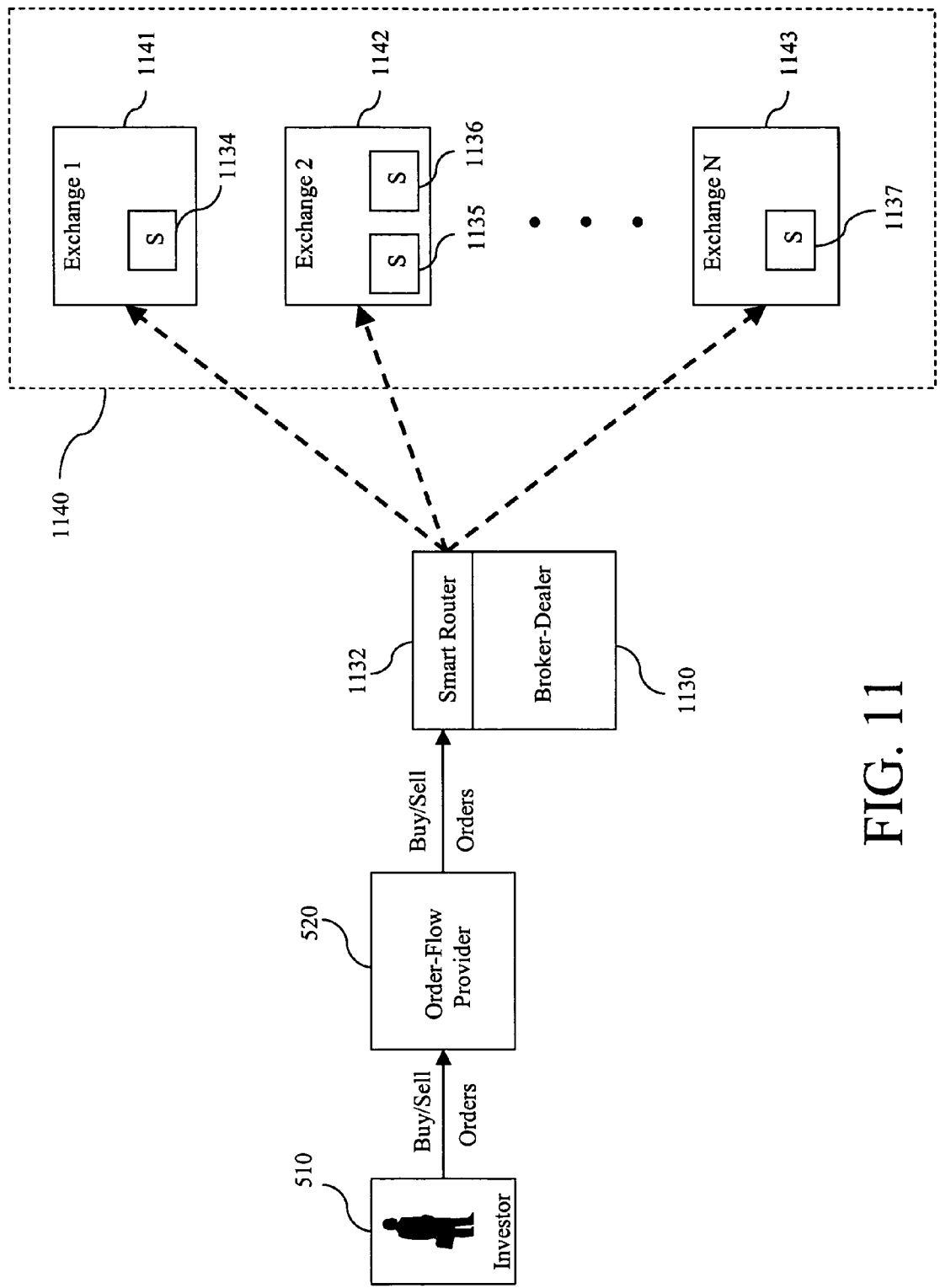
FIG. 11 shows an illustrative pseudo-internalization order flow in the options market, in which a single smart router that is associated with a broker-dealer is used according to the principles of the present invention.

For example, FIG. 11 shows an illustrative pseudo-internalization order flow according to the principles of the present invention in which the REC includes consolidating broker-dealer 1130 (which employs smart router 1132) and options specialists 1134-1137 (and potentially the market-making firms of specialists 1134-1137) which are associated with various exchanges in options market 1140. As shown in FIG. 11, specialist 1134 is associated with exchange 1141, specialists 1135-1136 are associated with exchange 1142, and specialist 1137 is associated with exchange 1143. According to the invention, specialists 1134-1137 serve as specialists (on at least one exchange) for a large percentage (e.g., 30%, 50% or 75%) of the available options, and preferably 100% of the available options. In the latter case, regardless of the type of option contract requested by investor 510, consolidating broker-dealer 1130 will be able to send the order to an exchange (e.g., exchange 1141, 1142, or 1143) for rapid execution, given that the exchange will either automatically execute the order, or the appropriate specialist 1134, 1135, 1136, or 1137 will fill the order for a guaranteed price and/or within a guaranteed period of time.

Figure 12:
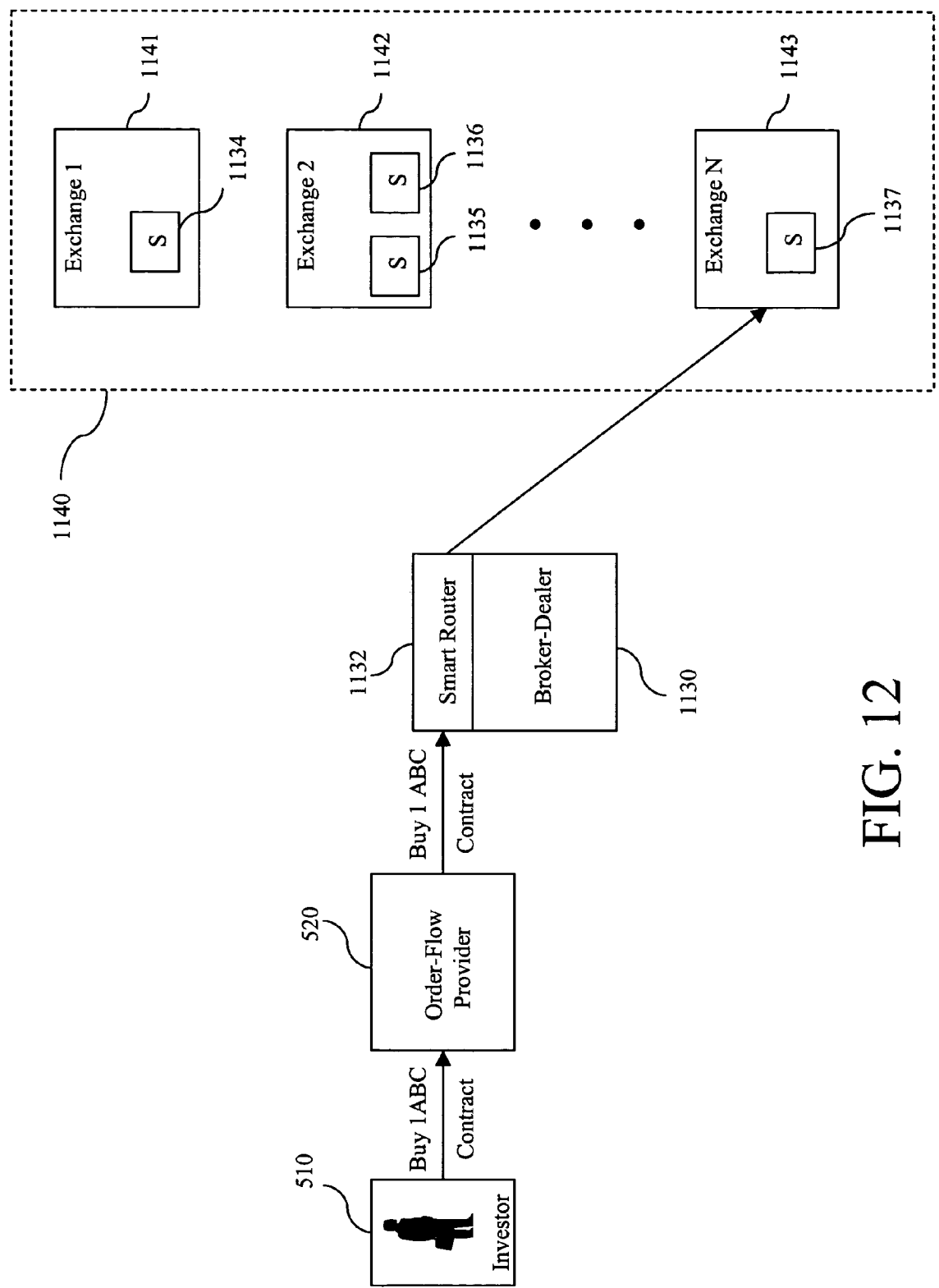
FIG. 12 shows an example of a pseudo-internalized transaction in the order flow of FIG. 11 according to the principles of the present invention.

FIG. 12 shows an example of a pseudo-internalized transaction according to the invention, which is based on the order flow shown in FIG. 11. As shown, investor 510 submits an order to buy one ABC contract to his OFP 520. OFP 520 then sends the order to broker-dealer 1130. At this time, smart router 1132 determines that specialist 1137 on exchange 1143 is a specialist for ABC options. Accordingly, the order is sent to exchange 1143, where the order is either automatically executed, or specialist 1137 fills the order for a guaranteed price and/or within a guaranteed period of time according to its contractual obligations per its membership in the REC.

While the above methods address the issue of poor execution quality by certain market-makers, a consolidating broker-dealer offering execution speed guarantees based on the above-described "pseudo-internalization" approach may still be exposed to risk for providing guaranteed execution prices and/or in a guaranteed time frame. For example, as explained above, market participants may seek to take advantage of the system by monitoring for instances in which the NBBO reflects a "stale" quotation (e.g., a quotation that has not been updated to reflect current market conditions). In such instances, for example, market participants may selectively send orders to obtain a guaranteed execution at a price that would not otherwise be readily available.

Therefore, additional optional controls are described below in detail to prevent significant additional potential losses according to additional alternative embodiments of the present invention. For example, the invention recognizes that trades intended to exploit a stale quote situation likely have a set of common characteristics at the order level which can provide the consolidating broker-dealer or OFP with some level of predictive capability. By measuring this set of characteristics over time and correlating them with the outcome of trades, e.g., stale quote trades yielding a loss compared with normal profitable trades, the broker-dealer can define a range for each parameter which minimizes the probability of executing a losing trade while still offering a rapid execution guarantee. The envelope defined by this range of parameters is termed the "Rapid Option Order Execution Envelope" (ROOEE). By determining whether an incoming order falls within this envelope, the broker-dealer can determine whether the order should be extended the rapid order execution guarantee.

In determining whether an order falls within the ROOEE, various distinct characteristics relating to the order may be analyzed according to one or more embodiments of the invention. For example, to determine whether an order should be deemed eligible for rapid execution, the following characteristics of the order may be examined: the theoretical value of the options contract(s), the frequency of order submission, the NBBO market source, the NBBO size, the liquidity of the options contract(s) in the market, the liquidity of the underlying equity or equities, the implied spread (NBBO), sensitivity measures (e.g., the "greeks"—delta, gamma, lambda, rho, theta, and vega) associated with the options contract(s), the implied price volatility of the options contract(s), the size of the order, and the identity of the options contract(s). Additionally, for example, the eligibility of an order for rapid execution may be restricted based on the number of rapid order guarantees that have been provided in a past, predetermined period of time, or based on the option class of the order. The invention is not limited by the particular characteristics that are examined in this regard and any other distinct characteristic may be used alone and/or in combination with the present invention.

According to various alternate embodiments of the present invention, the option order flow systems described above are improved with the presence of an "order analyzer" between the OFP and REC (or, when an OFP is not being used, between the investor and REC). Using an order analyzer, the system processes and optionally tracks, for example, transactions by each order flow provider. In this manner, the system is able to determine the extent to which it appears that the rapid order execution (e.g., one second) guarantee is being used by customers of that order flow provider to take advantage of stale quotes. In this embodiment, the system controls whether, and/or the terms on which, an order flow provider or investor will be offered any time and/or price guarantees in the future in accordance with one or more embodiments of the present invention. For example, in at least one embodiment, orders are analyzed to determine whether the characteristics and/or parameters fall within the ROOEE, and are thus eligible for guaranteed rapid execution. If an order is determined eligible, it will generally be offered a rapid order execution guarantee and will thus be executed within the guaranteed time and/or for the guaranteed price. If not, for example, the order may be canceled or rejected, or the customer may be notified of the order ineligibility and given the choice to either cancel the order and/or to agree to its execution without a time and/or price guarantee or with a modified guarantee.

Figure 13:
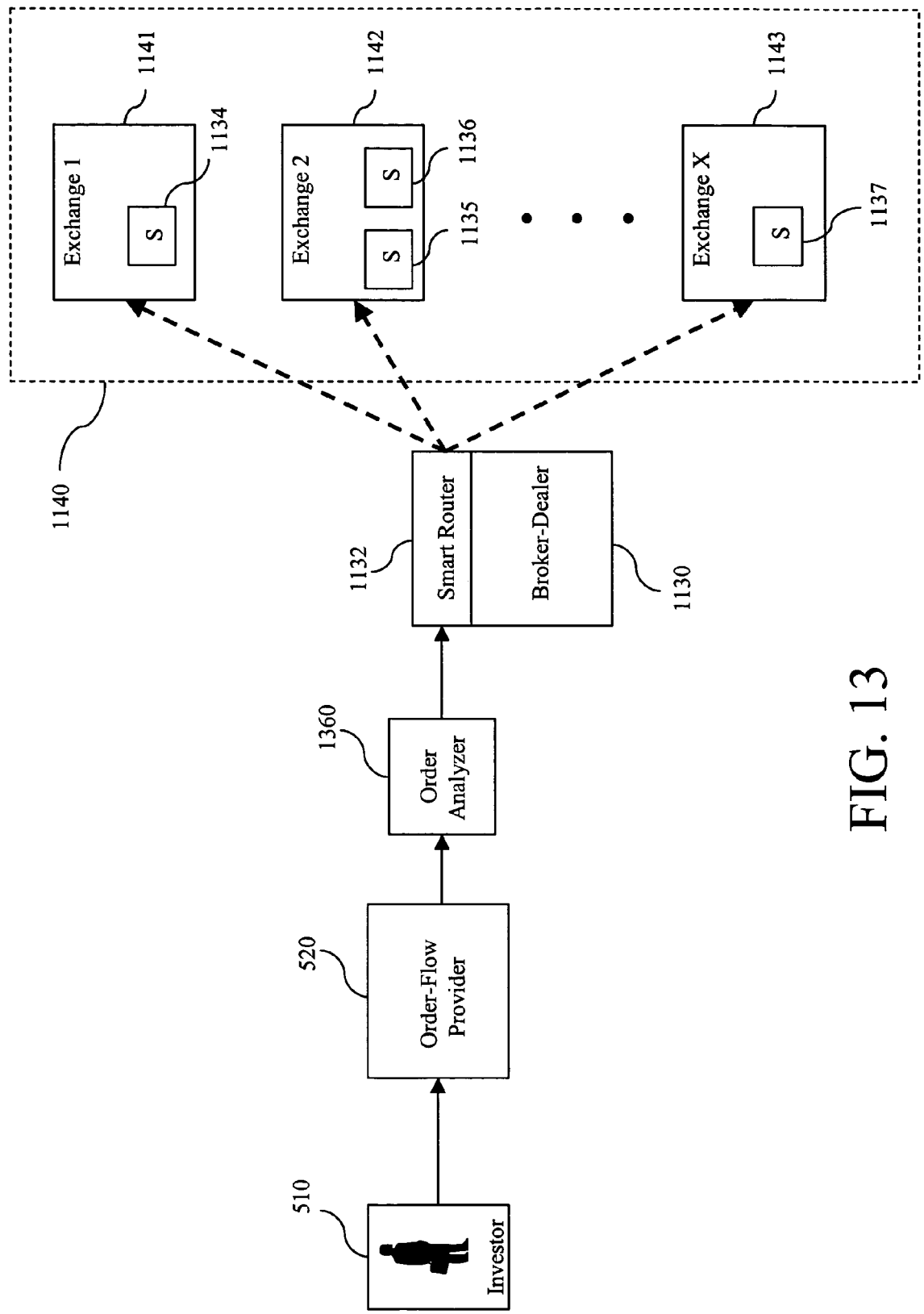
FIG. 13 shows an illustrative pseudo-internalization order flow in the options market, similar to the order flow of FIG. 1, in which an order analyzer is used according to the principles of the present invention.

It will be understood that, without an order analyzer in place, rapid execution of both eligible and ineligible orders may flow through the standard options market order flow chain. Upon execution of eligible orders, the broker-dealer (and/or the affiliated market-making firm(s) filling the orders, for example) will generally be capable of recording a trading profit. However, upon execution of ineligible orders, the broker-dealer (and/or market-making firms) may risk recording a trading loss. Using order analyzer 1360 as shown in FIG. 13, all and/or certain selected orders arriving from OFP 520 are analyzed by order analyzer 1360 to determine, for example, whether their parameters fall within the ROOEE, in which case the orders may be eligible to receive rapid order execution guarantees (and may thus be executed according to a guaranteed, specified and/or predetermined time and/or price). If not, the customer will be notified of the order ineligibility, and will be given a choice to either cancel the order or agree to its execution without a time and/or price guarantee or with a modified guarantee.

Figure 14:
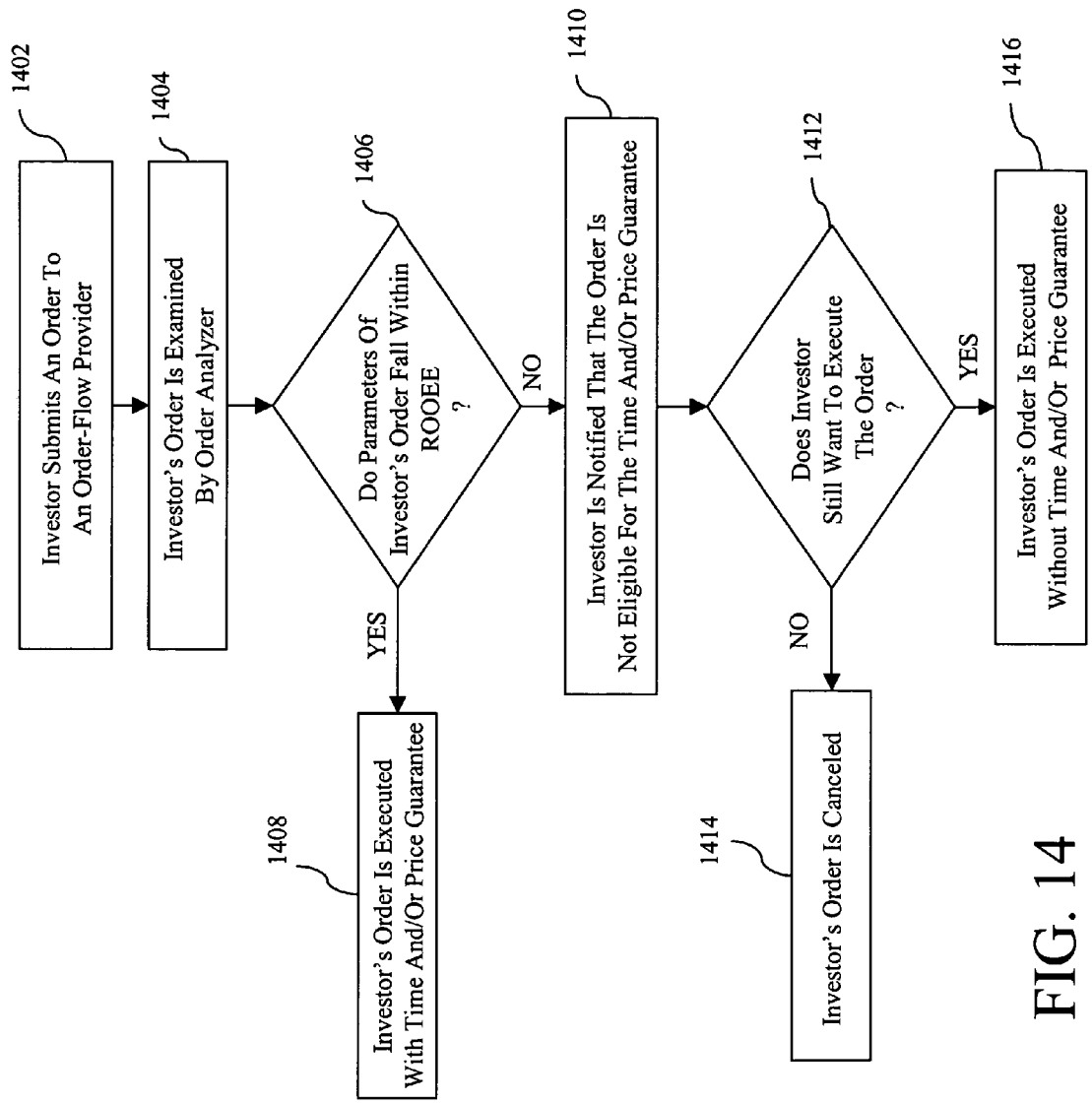
FIG. 14 is a simplified flow chart illustrating the steps performed in the execution of an investor's options order according to another embodiment of the present invention.

FIG. 14 is a simplified flow chart illustrating the steps performed in the execution of an investor's options order according to the embodiment of the present invention shown in FIG. 13. In step 1402, investor 510 submits an order (e.g., to buy or sell one or more options contracts) to order-flow provider 520. Next, in step 1404, the order sent by investor 510 is examined by order analyzer 1360. If it is determined at step 1406 that the parameters of the investor's order, for example, fall within the ROOEE, the investor's order is offered a rapid order execution guarantee and is thus executed with a time and/or price guarantee (step 1408). Otherwise, at step 1410, it is determined whether the investor still desires to execute the trade. If not, at step 1414, the order is canceled or rejected. Otherwise, at step 1416, the order is executed without the time guarantee and/or price guarantee, or with a modified guarantee.

Figure 15:
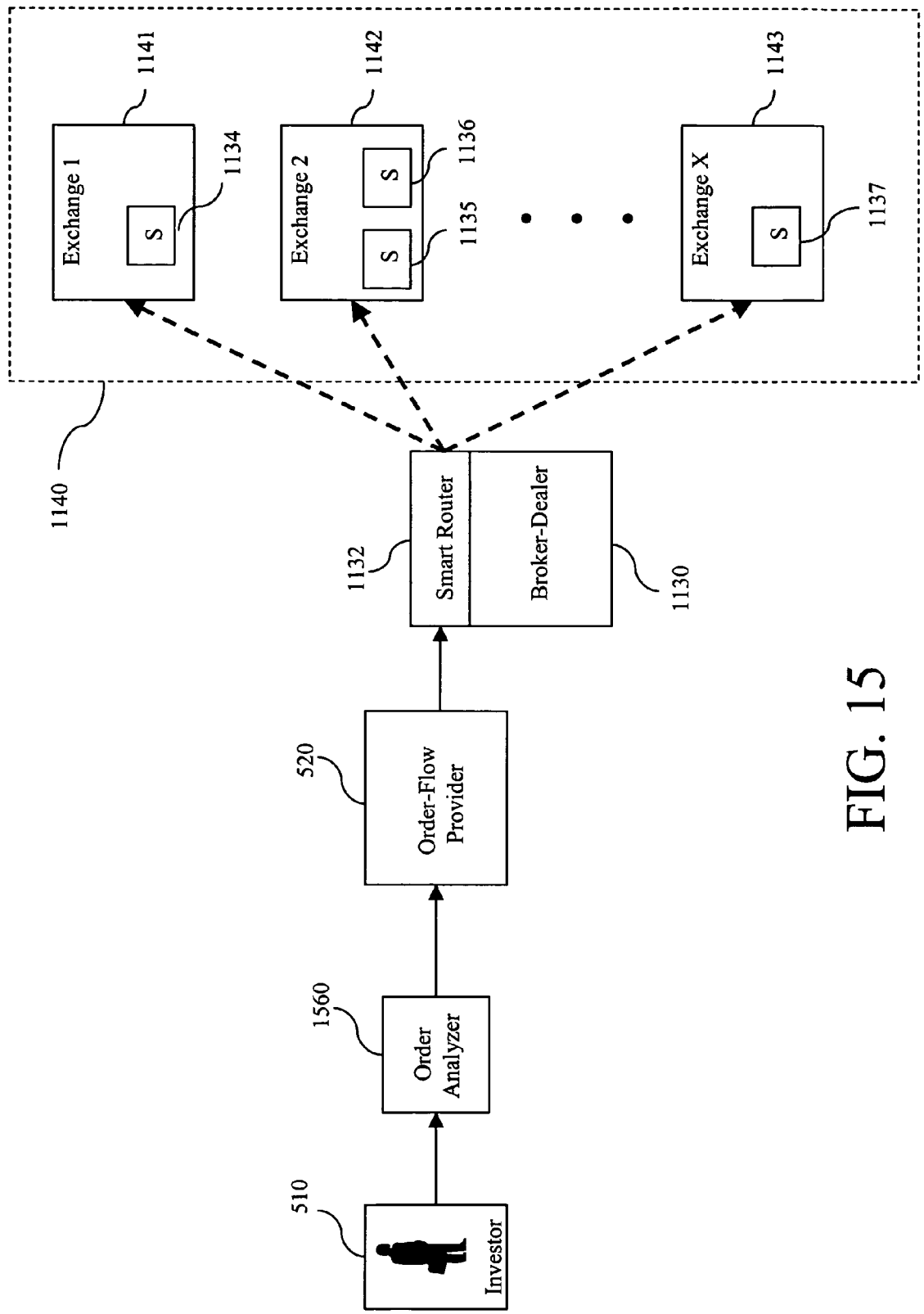
FIG. 15 shows another illustrative pseudo-internalization order flow in the options market, similar to the order flow in FIG. 11, in which an order analyzer is used according to the principles of the present invention.

As shown in FIG. 15, according to another embodiment of the invention, an order analyzer 1560 may be situated between investor 510 and OFP 520. In this manner, by using order analyzer 1560 to screen some or all orders being sent to OFP 520, it is possible to ensure that OFP 520 only extends a rapid option order execution guarantee, e.g., in terms of price and/or time period, to those orders whose parameters fall within the ROOEE. For example, upon identification of an ineligible trade, investor 510 may be notified that the order is not eligible to receive the rapid order execution guarantee, or is eligible for execution only with a modified guarantee. It will be understood that, although order analyzer 1360 of FIG. 13 and order analyzer 1560 of FIG. 15 are shown as being used with the order flow described above in connection with FIG. 11, the invention is not limited in this manner. Rather, an order analyzer according to the invention may also be used with, for example, the order flow shown in FIG. 6 (described above) or the order flow shown in FIGS. 18-19 (described below). In addition, while order analyzers 1360 and 1560 are shown as stand-alone entities, it will be understood that they may be a part of, for example, broker-dealer 1130 (or smart router 1132), or OFP 520, respectively. Moreover, it will also be understood that an order analyzer according to the invention may be used in an order flow without an REC as described above.

According to various alternate embodiments of the invention, a set of rules ("rule-set") may be used in conjunction with, or in place of, one or more order analyzers such as the ones shown in FIGS. 13 and 15. For example, as shown in the illustrative pseudo-internalization order flow of FIG. 16, it is determined by system 1670 for all and/or predetermined orders arriving from OFP 520 whether the order conforms to the rule-set (e.g., the size of the order is below a threshold level, the account by which an order is being submitted is one of a pre-approved list of accounts, etc.). If the order conforms to the rule-set, then the order may be offered a rapid order execution guarantee (for example, without requiring any additional analysis of the order) and thus executed according to the guaranteed, specified and/or predetermined time and/or price. Otherwise, when the order as originally placed does not conform to the rule-set, it will not be provided a rapid order execution guarantee. For example, pursuant to a previous agreement with investor 510, the order in this case may simply be canceled, with or without feedback to investor 510 (such as a notification of cancellation). In other embodiments, for example, investor 510 may be given an opportunity to modify the order such that it conforms to the rule-set, or the opportunity to accept a modified order that conforms to the rule-set. In yet other embodiments, also pursuant to a prior agreement with investor 510, for example, the order placed by investor 510 may be automatically modified (e.g., by reducing the order size) so that it conforms to the rule-set and then executed within the guaranteed and/or predetermined time and/or price. In this case, investor 510 may be notified of the modification to the original order (and/or provided other information) before or after execution of the modified order.

Figure 16:
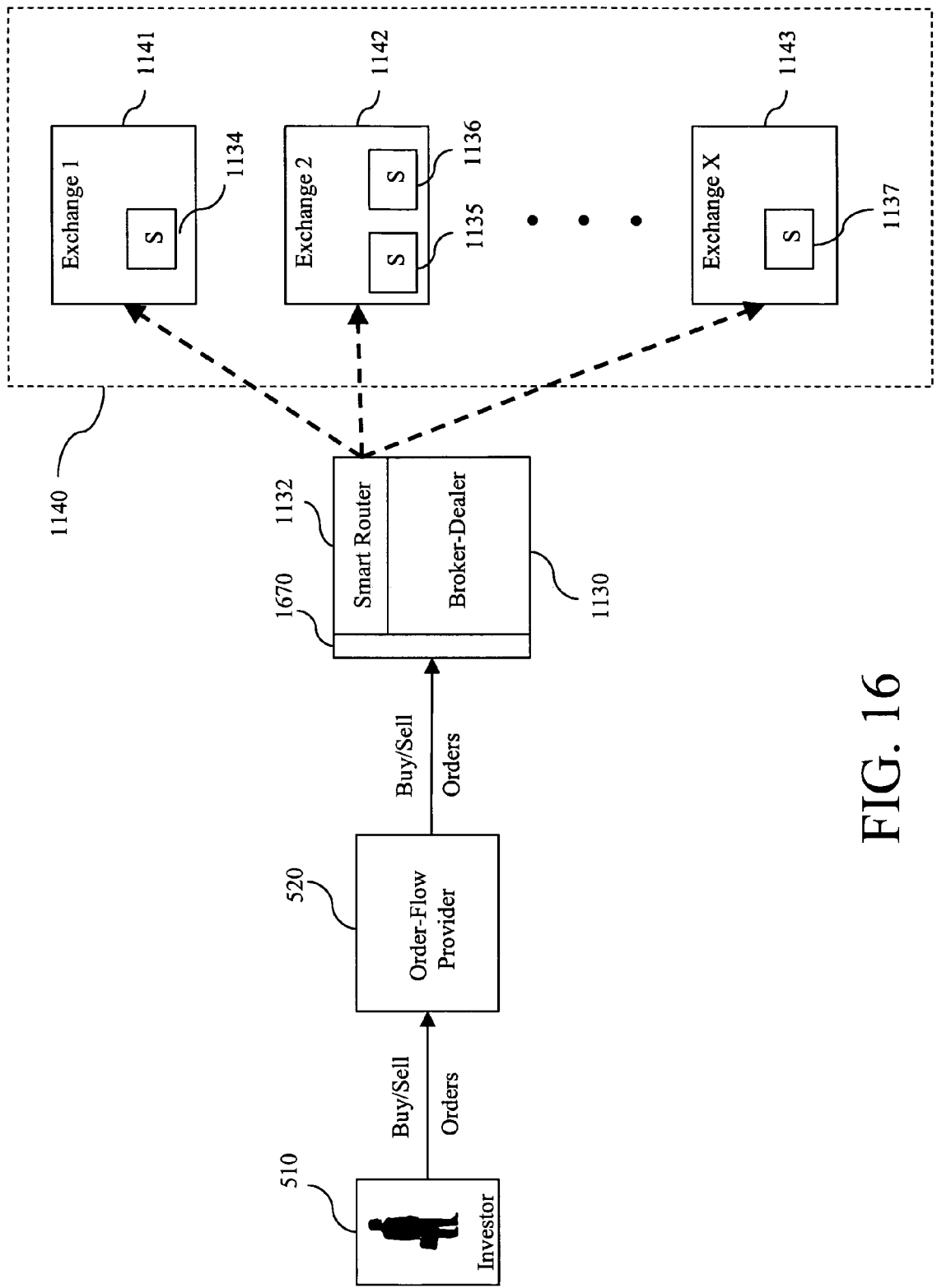
FIG. 16 shows another illustrative pseudo-internalization order flow in the options market, similar to the order flow in FIG. 11, in which a system for determining whether an order conforms to a rule-set is used according to the principles of the present invention.

System 1670 shown in FIG. 16 may be, for example, a computer implemented system that analyzes various characteristics of orders originating from investor 510 to determine whether the order conforms to the rule-set. Moreover, as shown in FIG. 16, system 1670 may be a part of, or associated with, consolidating broker-dealer 1130 and/or smart router 1132. The invention is not limited in these manners.

Figure 17:
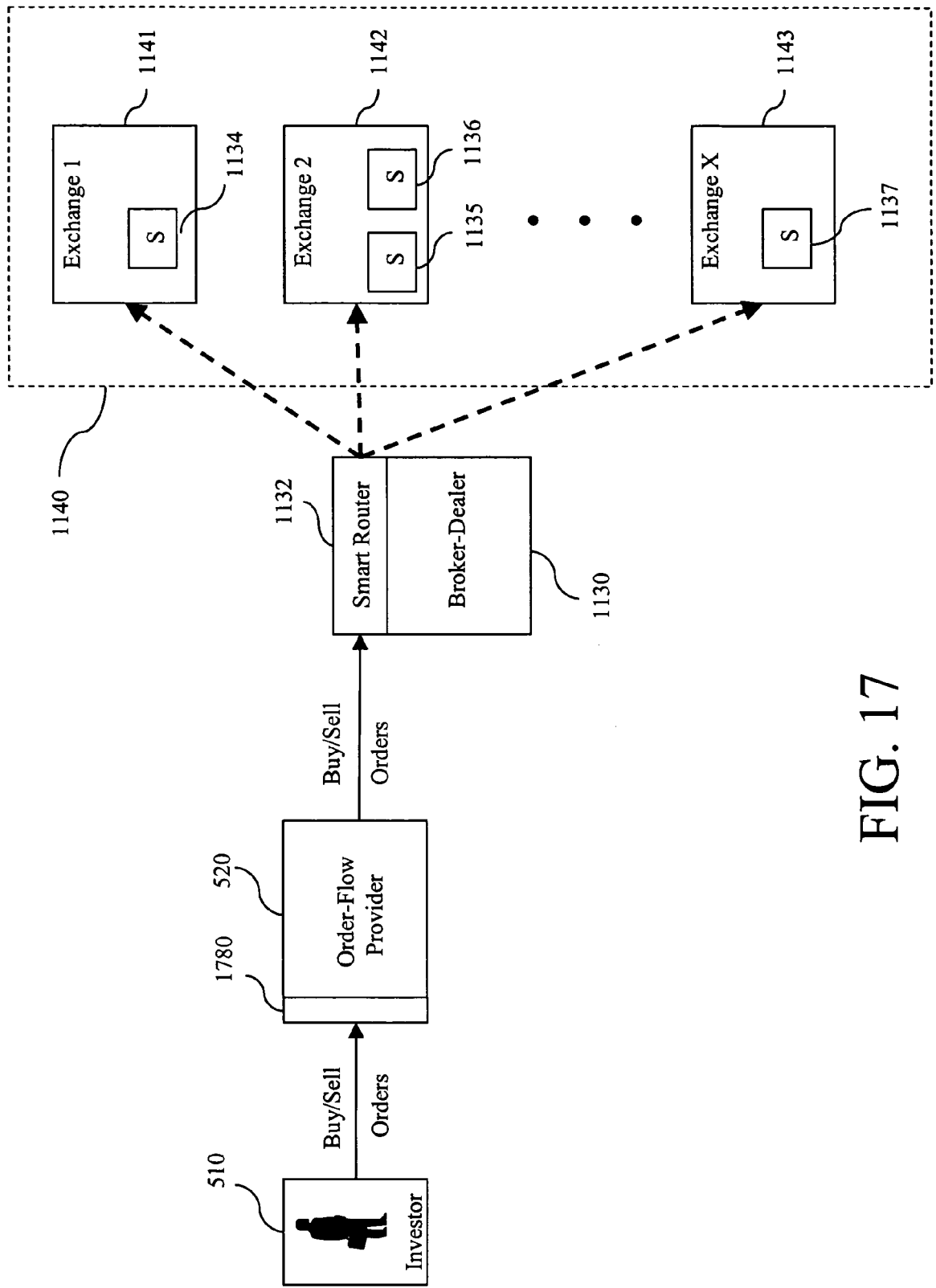
FIG. 17 shows yet another illustrative pseudo-internalization order flow in the options market, similar to the order flow of FIG. 11, in which a system for determining whether an order conforms to a rule-set is used according to the principles of the present invention.

According to another embodiment of the invention, a system 1780 as shown in FIG. 17 may be used in place of system 1670 shown in FIG. 16 and described above. Similar to system 1670, system 1780 shown in FIG. 17 may be used to determine for all and/or predetermined orders arriving from investor 510 whether the order conforms to the rule-set. If the order conforms to the rule-set, then it may be executed within the guaranteed, specified, predetermined time and/or price, or simply canceled with or without notification of the cancellation to investor 510 (e.g., pursuant to a prior agreement with investor 510). In other embodiments, for example, investor 510 may be given an opportunity to modify the order, or to accept a modified order that conforms to the rule-set. Alternatively, also pursuant to a prior agreement with investor 510, for example, the order may be automatically modified (e.g., by reducing the order size) so that it conforms to the rule-set, and may then be automatically executed within the guaranteed, specified, predetermined time and/or price (with or without notification of the modification to investor 510, as pursuant to the prior agreement).

System 1780 shown in FIG. 17 may be, for example, a computer implemented system that analyzes various characteristics of orders originating from investor 510 to determine whether the order conforms to the rule-set. Moreover, as shown in FIG. 17, system 1780 may be a part of, or associated with, OFP 520. The invention is not limited in these manners.

It will be understood that, while the REC of each of FIGS. 11-13 and 15-17 described above includes four specialists from three separate exchanges, the invention is not limited in this manner. For example, more or less than four specialists may be included in the REC, and these specialists may be associated with more or less than three exchanges. According to various embodiments of the present invention, each of the specialists of the REC may be associated with the same exchange. For example, in the embodiment shown in FIG. 18, all of the specialists of the REC may be associated with an exchange 1841. In this case, all orders received by consolidating broker-dealer 1130 will be sent to exchange 1841 to be filled either via automatic execution or by one or more of specialists 1851, 1852, 1853, 1854, and 1855 (using, e.g., respective electronic systems with automatic step-up features), depending on the option(s) involved in the order. It will be appreciated that, in this embodiment, smart router 1132 may be used to route any (or all) received orders to exchange 1841, or this routing may be done without the use of smart router 1132 without departing from the scope of the present invention. Moreover, it will be appreciated that any or all of specialists 1851, 1852, 1853, 1854, and 1855 may be affiliated with (e.g., part of the same legal entity as) consolidating broker-dealer 1130.

Figure 18:
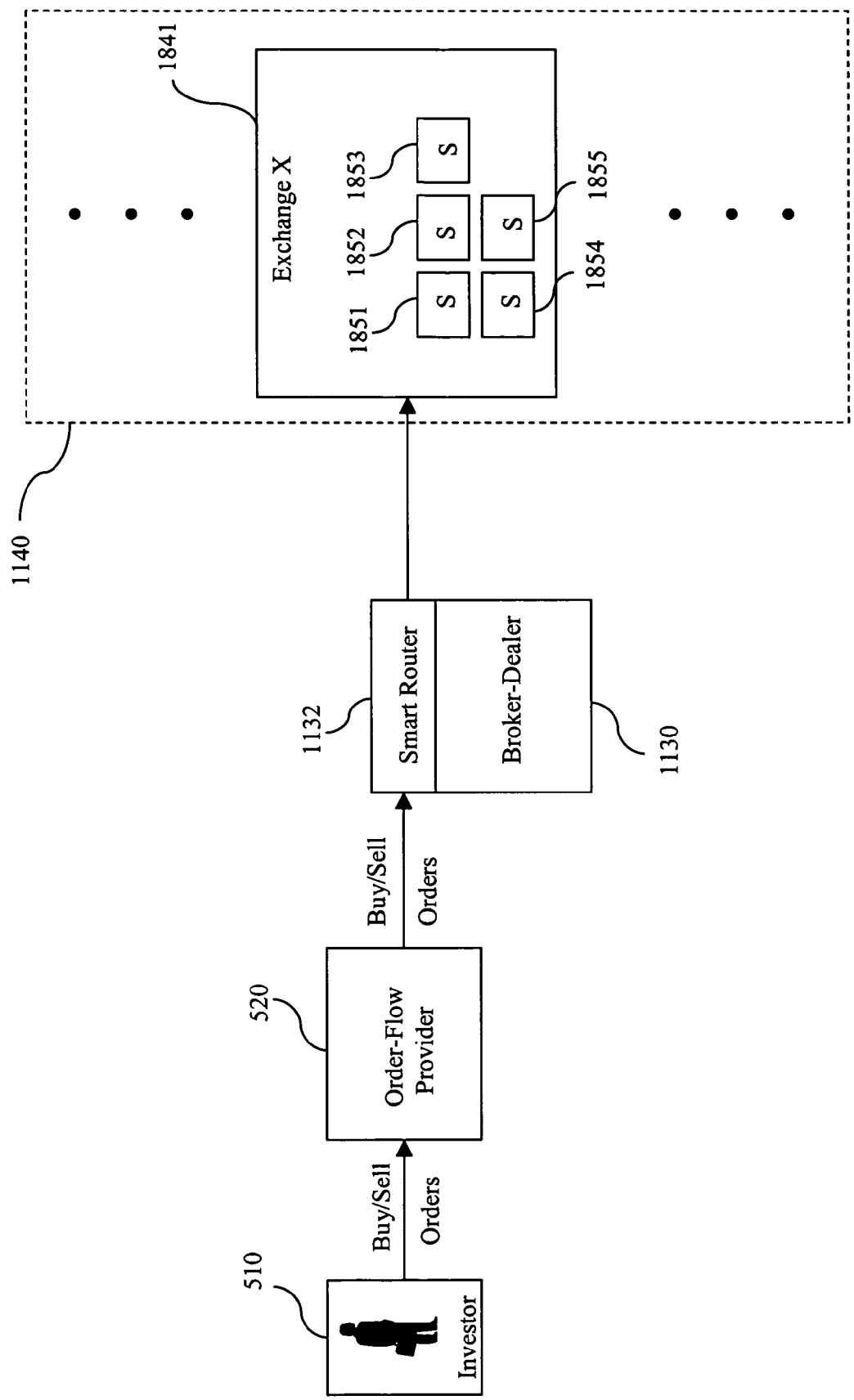
FIG. 18 shows another illustrative pseudo-internalization order flow in the options market, in which a single smart router that is associated with a broker-dealer is used according to the principles of the present invention.
Figure 19:
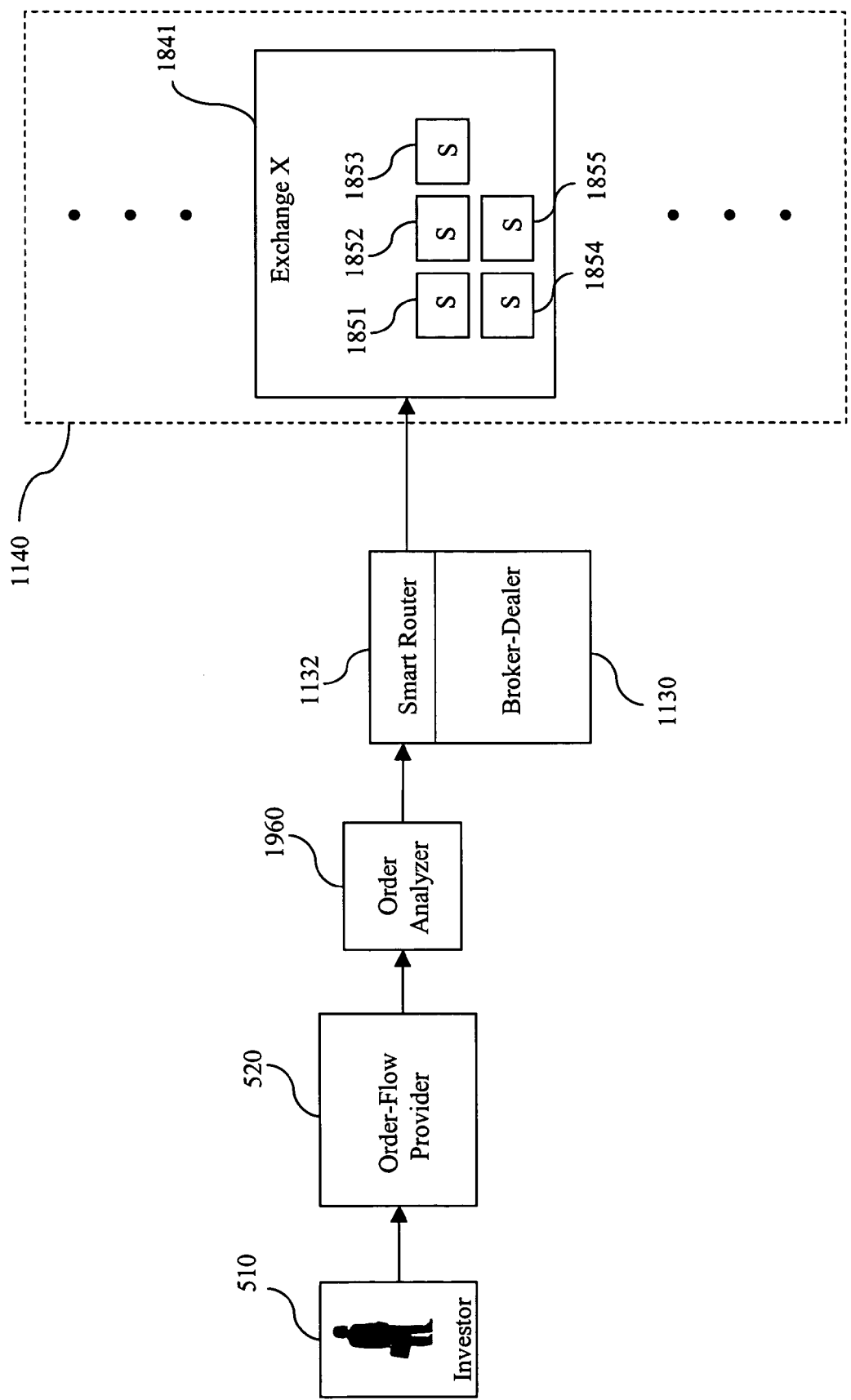
FIG. 19 shows an illustrative pseudo-internalization order flow in the options market, similar to the order flow of FIG. 18, in which an order analyzer is used according to the principles of the present invention.
Figure 20:
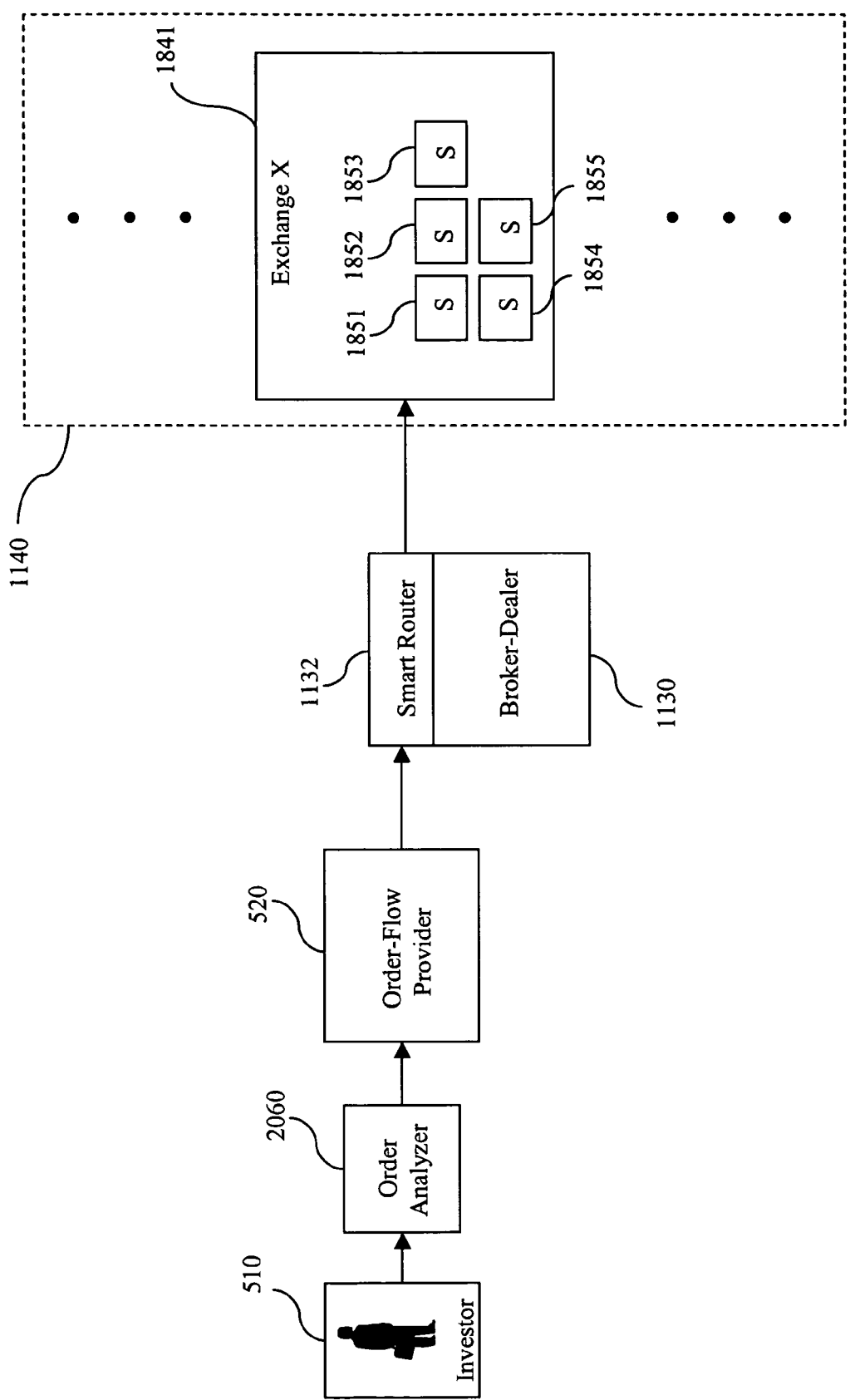
FIG. 20 shows another illustrative pseudo-internalization order flow in the options market, similar to the order flow of FIG. 18, in which an order analyzer is used according to the principles of the present invention.

The order flow shown in FIG. 18 may also be modified to include an order analyzer such as described above. For example, as shown in FIG. 19, all and/or certain selected orders arriving from OFP 520 may be analyzed by an order analyzer 1960 to determine whether they are eligible for rapid order execution. Order analyzer 1960 may function substantially similarly to order analyzer 1360 described above in connection with FIG. 13. For example, order analyzer 1960 can be used to determine whether the parameters of orders being analyzed fall within the ROOEE, thus rendering them eligible for rapid order execution. According to another embodiment of the invention, as shown in FIG. 20, an order analyzer 2060 may be situated between investor 510 and OFP 520. In this manner, by using order analyzer 2060 to screen some or all orders being sent to OFP 520, it is possible to ensure that OFP 520 only extends a rapid option order execution guarantee, e.g., in terms of price and/or time period, to certain orders (e.g., those orders whose parameters fall within the ROOEE). Upon identification of an ineligible trade, for example, investor 510 may be notified that the order is, either in part or in its entirety, canceled or rejected (e.g., pursuant to a prior agreement), or offered execution of the order without a guarantee or with a modified guarantee. In addition, while order analyzers 1960 and 2060 are shown as stand-alone entities in FIGS. 19 and 20, respectively, it will be understood that they may be a part of, for example, broker-dealer 1130 (or smart router 1132), or OFP 520, respectively.

Figure 21:
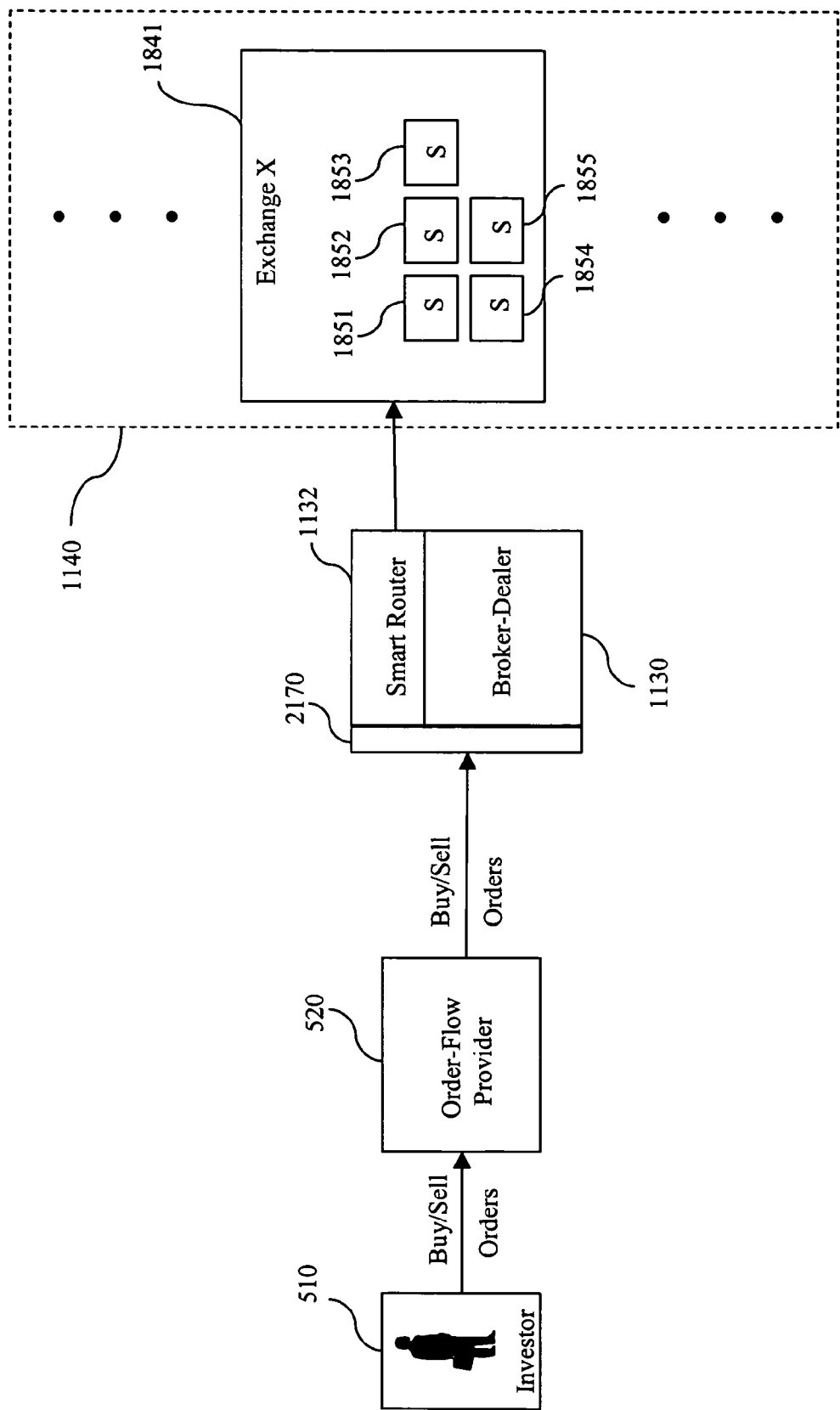
FIG. 21 shows an illustrative pseudo-internalization order flow in the options market, similar to the order flow of FIG. 18, in which a system for determining whether an order conforms to a rule-set is used according to the principles of the present invention.

According to various embodiments, the order flow shown in FIG. 18 may also be modified to include a system, such as those described above, for determining conformance with a rule set. For example, as shown in FIG. 21, consolidating broker-dealer 1130 may use system 2170 for determining whether an order placed by investor 510 conforms to a rule-set, as described above in connection with systems 1670 and 1780 of FIGS. 16 and 17, respectively. If an order received by consolidating broker-dealer 1130 conforms to the rule-set, as determined by system 2170, then the order may be executed within the guaranteed, specified and/or predetermined time and/or price. Otherwise, as described above, the order may be canceled by OFP 520 or consolidating broker-dealer 1130 (e.g., pursuant to a prior agreement with investor 510), with or without feedback to investor 510 (such as a notification of cancellation). In other embodiments, for example, investor 510 may be given an opportunity to accept the order with an increased fee (commission) for the current or future trades, to modify the order such that it conforms to the rule-set, or to accept a modified order that conforms to the rule-set. In yet other embodiments, also pursuant to a prior agreement with investor 510, for example, the order placed by investor 510 may be automatically modified (e.g., by reducing the order size) so that it conforms to the rule-set and then executed within the guaranteed and/or predetermined time and/or price. In this case, investor 510 may be notified of the modification to the original order (and/or provided other information) before or after execution of the modified order. As with systems 1670 and 1780 described above, system 2170 shown in FIG. 21 may be, for example, a computer implemented system that analyzes various characteristics of orders originating from investor 510 to determine whether the orders conform to the rule-set. Moreover, system 2170 may be, for example, either a part of, or associated with, consolidating broker-dealer 1130. The invention is not limited in this manner.

Figure 22:
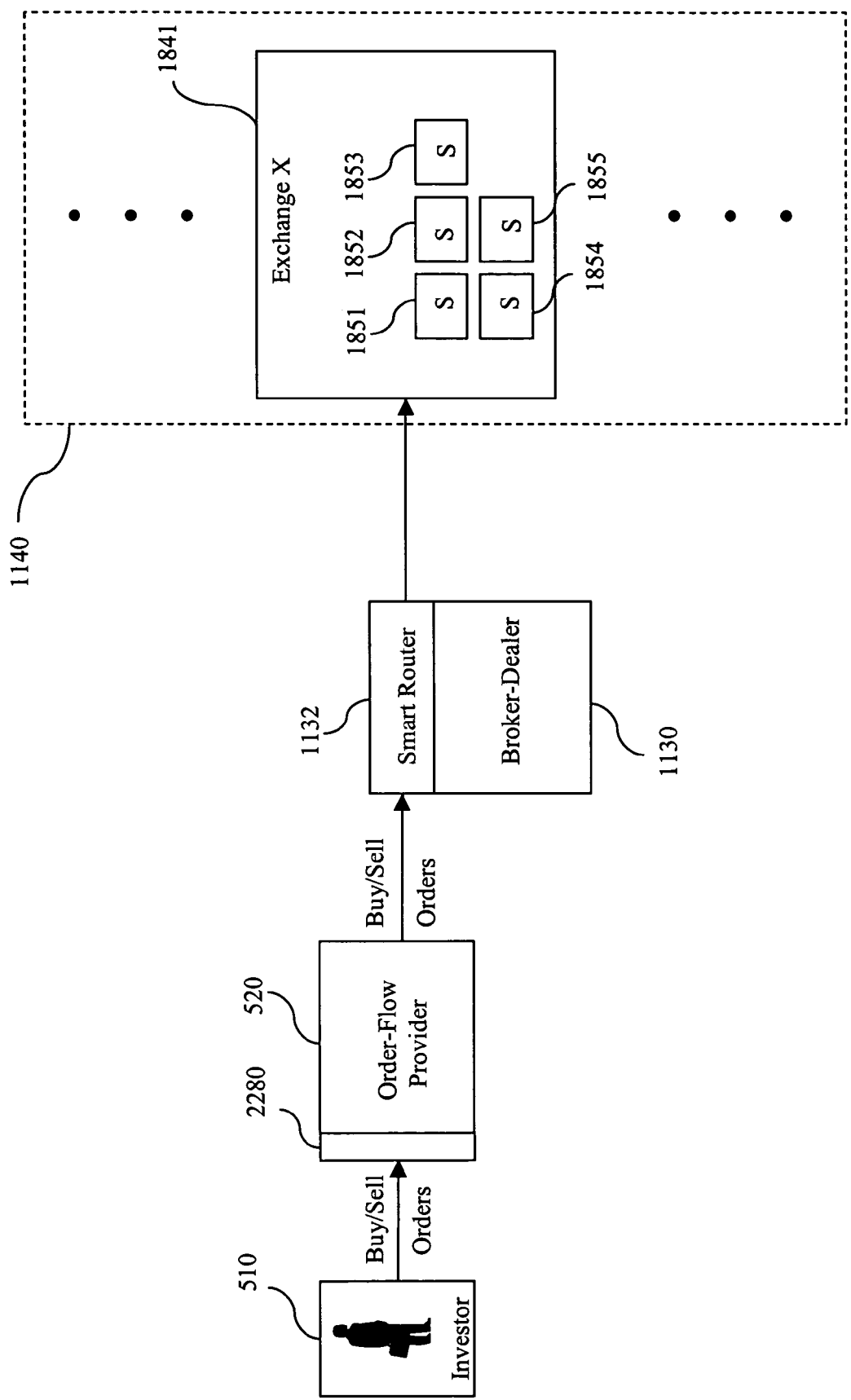
FIG. 22 shows another illustrative pseudo-internalization order flow in the options market, similar to the order flow of FIG. 18, in which a system for determining whether an order conforms to a rule-set is used according to the principles of the present invention.

According to another embodiment of the invention, a system 2280 as shown in FIG. 22 may be used in place of (or in addition to) system 2170 shown in FIG. 21 and described above. Similar to system 2170, system 2280 shown in FIG. 22 may be used to determine for all and/or predetermined orders arriving from investor 510 whether the order conforms to a rule-set. If the order conforms to the rule-set, then it may be executed within the guaranteed, specified, predetermined time and/or price. Otherwise, for example, the order, either in whole or in part, may be canceled or rejected, with or without notification to investor 510 (e.g., pursuant to a prior agreement with investor 510). In other embodiments, for example, investor 510 may be given an opportunity to accept the order with an increased fee (commission) for the current or future orders, modify the order, or accept a modified order that conforms to the rule-set. Alternatively, also pursuant to a prior agreement, for example, the order may be automatically modified (e.g., by reducing the order size) so that it conforms to the rule-set, and may then be automatically executed within the guaranteed, specified, predetermined time and/or price (e.g., with notification of the modification to investor 510). System 2280 shown in FIG. 22 may be, for example, a computer implemented system that analyzes various characteristics of orders originating from investor 510 to determine whether the order conforms to the rule-set. Moreover, as shown in FIG. 22, system 2280 may be a part of, or associated with, OFP 520. The invention is not limited in this manner.

Figure 23:
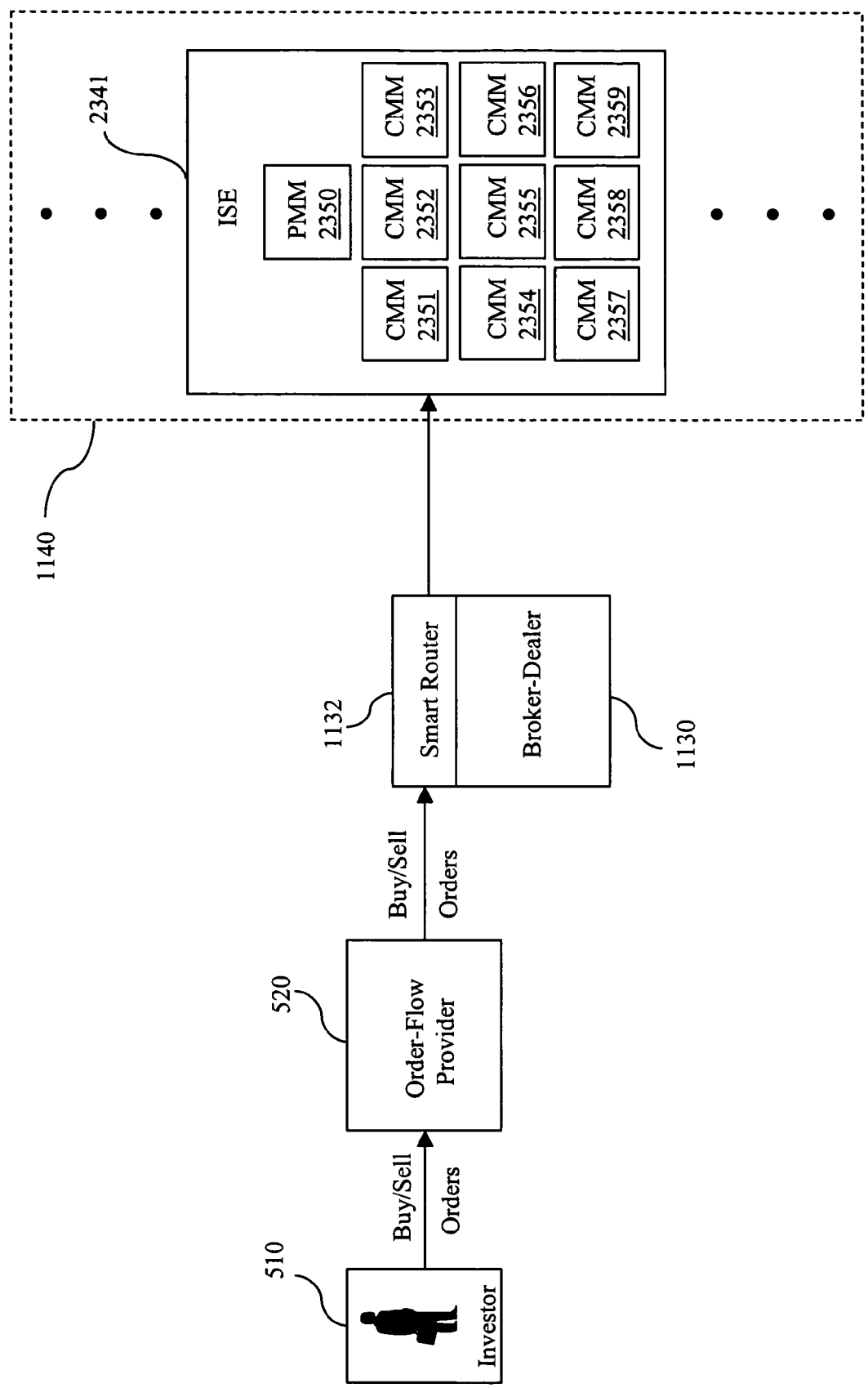
FIG. 23 shows another illustrative pseudo-internalization order flow in the options market, in which a single smart router that is associated with a broker-dealer is used according to the principles of the present invention.

According to various other embodiments of the present invention, rather than simply including multiple specialists such as shown in FIG. 18 and described above, an REC may be formed that includes one or more market-makers that are not specialists, but are still allowed by the exchange(s) where they are located to step up and fill orders at the NBBO in the same way that a specialist can. For example, FIG. 23 illustrates an REC formed in connection with the ISE, when the ISE rules permit a non-specialist (e.g., a CMM) to step up and fill orders at the NBBO. In this case, as shown in FIG. 23, the REC may include a single specialist (PMM) 2350, and nine non-specialists (e.g., CMMs) 2351-2359 which are assigned to respective bins (groups) of ISE options classes. Using an REC such as the one just described, consolidating broker-dealer 1130 is able to offer a rapid order execution guarantee for an order received from investor 510 by sending the order to exchange 2341 (e.g., the ISE), knowing that at least one of the specialists or non-specialists will be able to step up and fill the order if necessary. It should be noted that, because consolidating broker-dealer 1130 is able to send all received orders to exchange 2341 (e.g., the ISE), smart router 1132 may or may not be used.

Although the REC of FIG. 23 may include a separate market-making firm for each specialist and non-specialist, the invention is not limited in this manner. For example, a particular market-making firm, whether or not it is affiliated with (e.g., part of the same legal entity as) consolidating broker-dealer 1130, may have PMMs for two bins of ISE options classes, while also having CMMs for the remainder of the bins. In this example, consolidating broker-dealer 1130 is able to send all incoming orders to the exchange (e.g., the ISE) knowing that at least one specialist or non-specialist of the market-making firm will be able to step up and fill the order (using either a PMM or CMM, depending on the order). It should also be noted that, according to various embodiments of the invention, it is possible for the ten bins of ISE options classes to be covered by more than one, but less than ten, different market-making firms. For example, a first firm may have a PMM on one or two bins, while a second firm has CMMs on three other bins, and a third firm has CMMs for the remaining bins. The invention is not limited in this manner.

Figure 24:
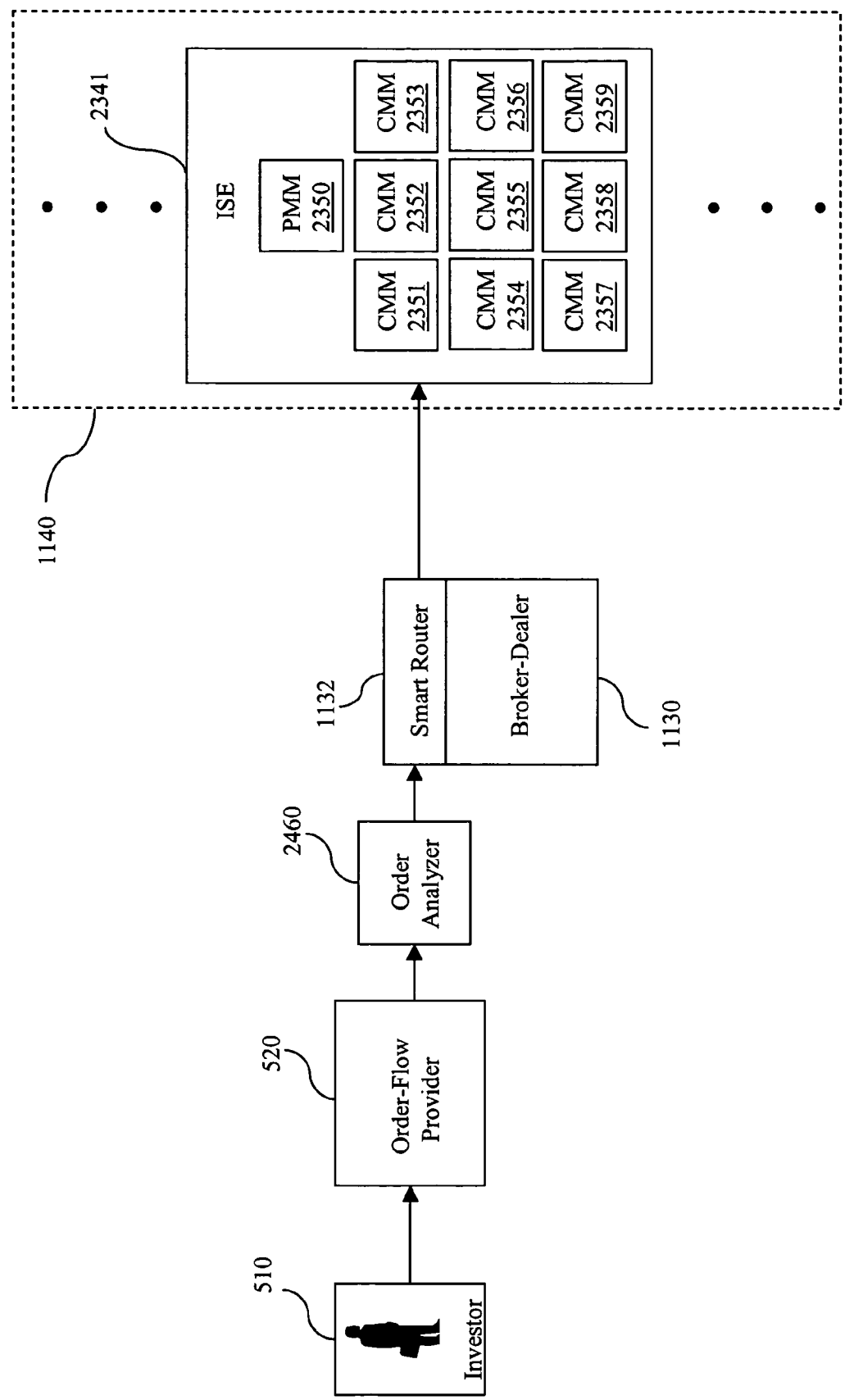
FIG. 24 shows an illustrative pseudo-internalization order flow in the options market, similar to the order flow of FIG. 23, in which an order analyzer is used according to the principles of the present invention.
Figure 25:
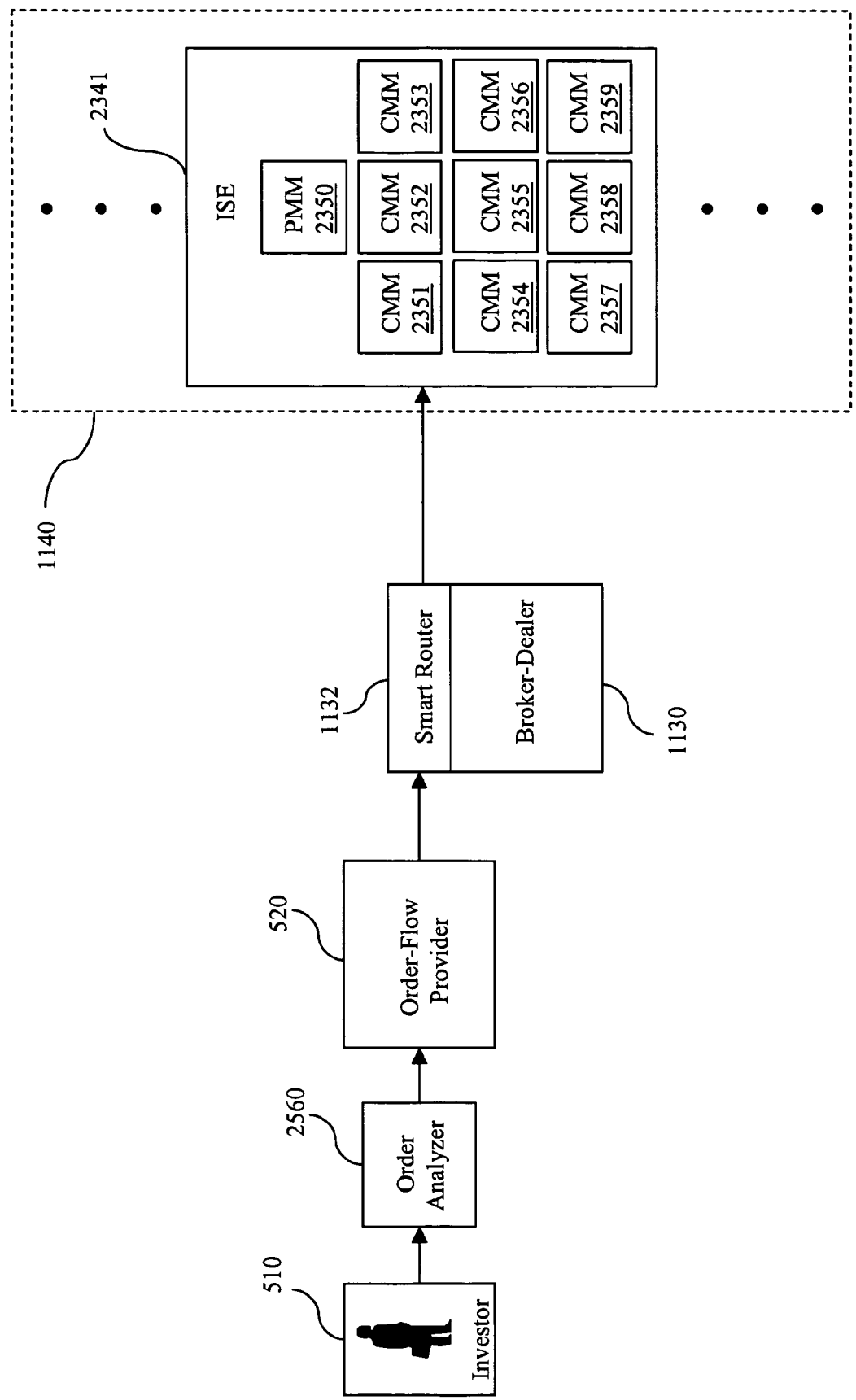
FIG. 25 shows another illustrative pseudo-internalization order flow in the options market, similar to the order flow of FIG. 23, in which an order analyzer is used according to the principles of the present invention.

As with other order flows described above, the order flow of FIG. 23 can also include one or more order analyzers to analyze orders placed by investor 510. For example, as shown in FIG. 24, all and/or certain selected orders arriving from OFP 520 may be analyzed by an order analyzer 2460 to determine whether they are eligible for rapid order execution. Order analyzer 2460 may function substantially similarly to order analyzers 1360 and 1960 described above in connection with FIGS. 13 and 19. For example, order analyzer 2460 can be used to determine whether an order is eligible to receive a rapid order execution guarantee (e.g., if the parameters of the order being analyzed fall within the ROOEE). According to another embodiment of the invention, as shown in FIG. 25, an order analyzer 2560 may be situated between investor 510 and OFP 520. In this manner, by using order analyzer 2560 to screen some or all orders being sent to OFP 520, it is possible to configure OFP 520 to extend a rapid option order execution guarantee, e.g., in terms of price and/or time period, only to certain orders (e.g., those orders whose parameters fall within the ROOEE). Upon identification of an ineligible trade, investor 510 may be notified that the order is canceled or offered execution of the order without a guarantee or with a modified guarantee. In addition, while order analyzers 2460 and 2560 are shown as stand-alone entities in FIGS. 24 and 25, respectively, it will be understood that they may be a part of, for example, broker-dealer 1130 (or smart router 1132), or OFP 520, respectively.

Figure 26:
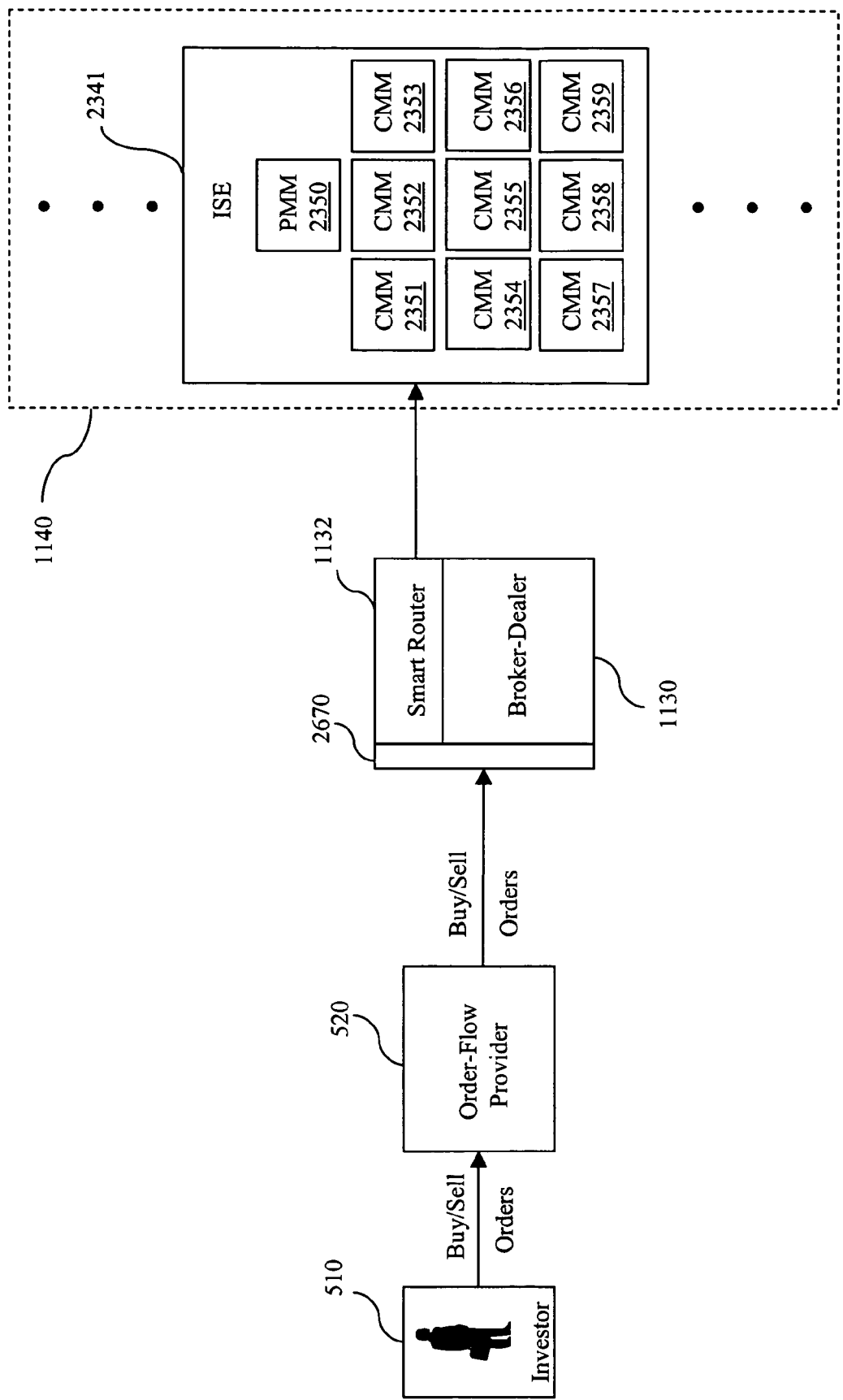
FIG. 26 shows an illustrative pseudo-internalization order flow in the options market, similar to the order flow of FIG. 23, in which a system for determining whether an order conforms to a rule-set is used according to the principles of the present invention.
Figure 27:
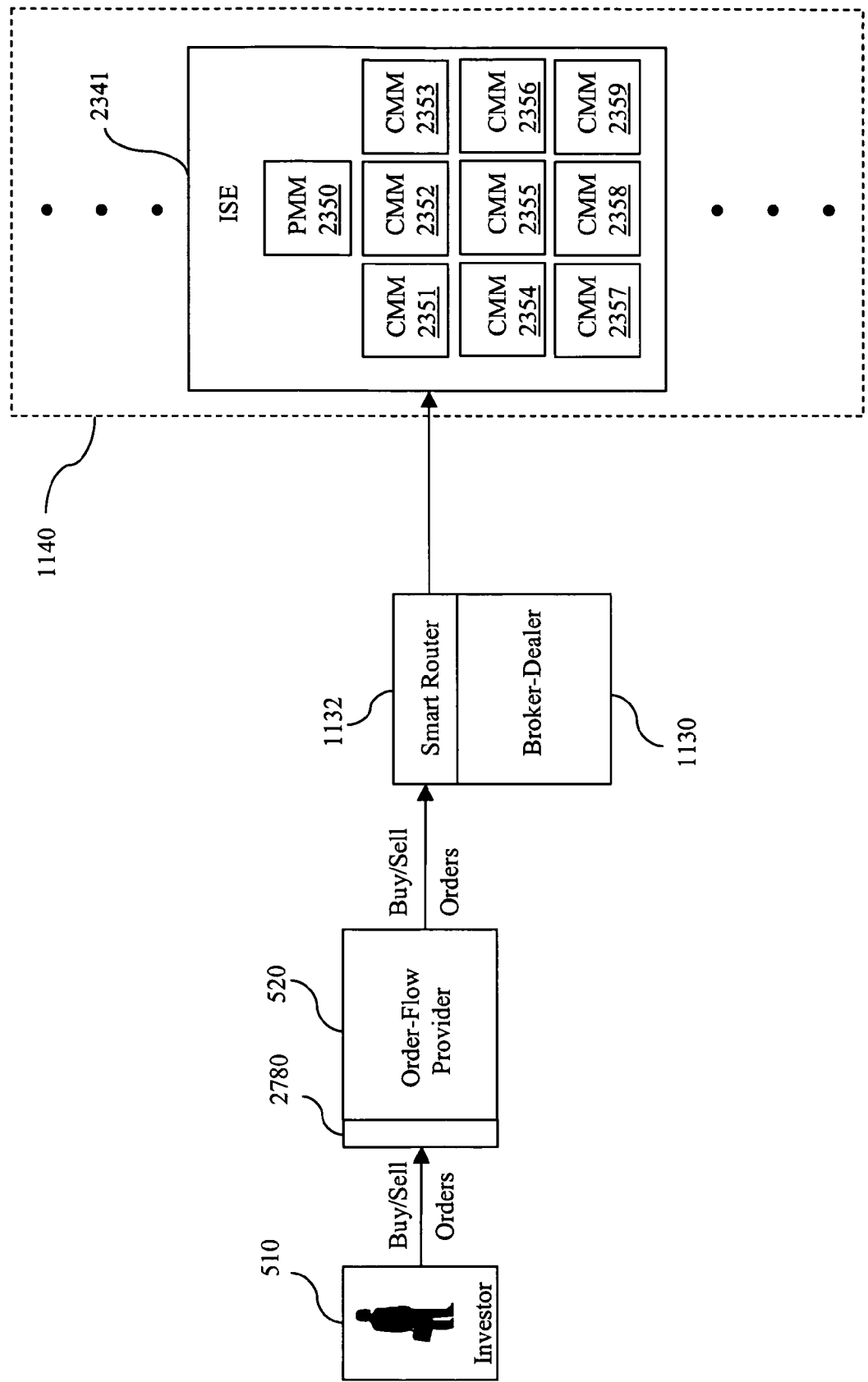
FIG. 27 shows another illustrative pseudo-internalization order flow in the options market, similar to the order flow of FIG. 23, in which a system for determining whether an order conforms to a rule-set is used according to the principles of the present invention.

The order flow of FIG. 23 can also be modified to include one more systems for determining conformance with a rule-set. For example, as shown in FIG. 26, a system 2670 for determining whether an order placed by investor 510 conforms to a rule-set may be used. Moreover, according to another embodiment of the invention, a system 2780 as shown in FIG. 27 may be used in place of system 2670 shown in FIG. 26. Similar to system 2670, system 2780 shown in FIG. 27 may be used to determine for all and/or certain selected orders arriving from investor 510 whether the order should be executed within the guaranteed, specified, predetermined time and/or price, or somehow modified (e.g., pursuant to a prior agreement with investor 510). Systems 2670 and 2780 shown in FIGS. 26 and 27, respectively, may be, for example, computer implemented systems that analyze various characteristics of orders originating from investor 510 to determine whether the order conforms to the rule-set. Moreover, as shown in FIGS. 26 and 27, systems 2670 and 2780 respectively may be a part of, or associated with, consolidating broker-dealer 1130 (or smart router 1132) or OFP 520. The invention is not limited in this manner.

According to the embodiments of the invention described above (e.g., in connection with FIGS. 18 and 23), the REC includes at least one specialist and potentially one or more non-specialists on one or more given exchanges. According to various other embodiments of the invention, however, an REC may be formed in which there are no designated specialists. One example of such an REC is now described with reference to FIG. 28, in which exchange 2841 is, for example, the BOX.

All registered "participants" on exchange 2841 (the BOX) are eligible to serve as BOX market-makers in one or more given options classes. Thus, according to the invention, an REC can be formed that includes one or more affiliated participants that are registered as BOX market-makers, where, for example, the affiliated participants cover all listed options classes. According to one embodiment, the classes are covered by a single affiliated participant. According to various other embodiments, the classes are divided among two or more affiliated participants in some (potentially overlapping) fashion, such as alphabetically by option class symbol.

Figure 28:
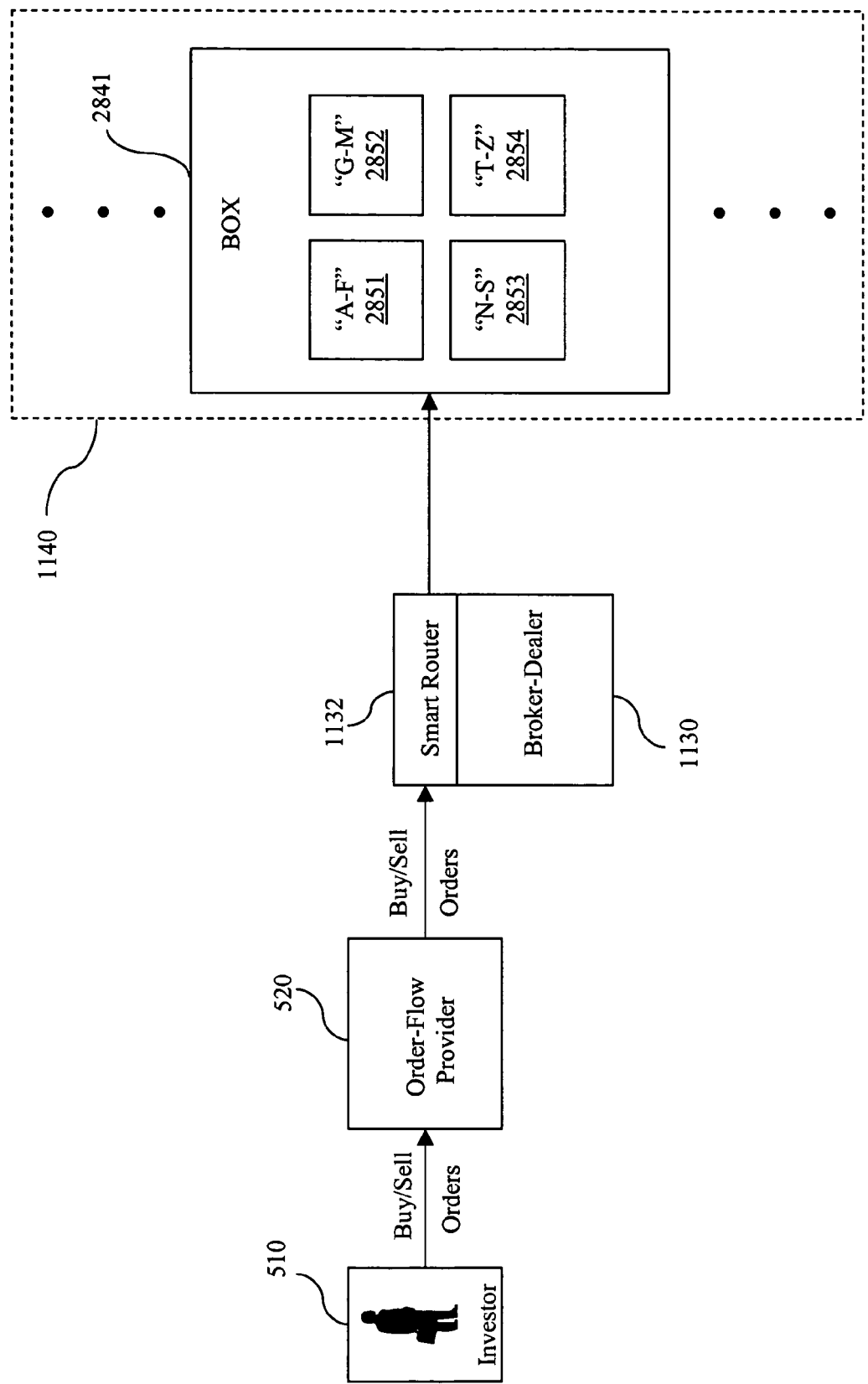
FIG. 28 shows another illustrative pseudo-internalization order flow in the options market, in which a single smart router that is associated with a broker-dealer is used according to the principles of the present invention.

FIG. 28 shows an example of a BOX-specific REC that includes a network of market-makers 2851-2854 covering various alphabetical ranges of option class symbols. As shown, BOX market-maker 2851 covers listed options contracts whose class symbol begins with one of letters "A" through "F." BOX market-maker 2852, on the other hand, covers listed options contracts whose class symbol begins with one of letters "G" through "M." Finally, in the embodiment shown in FIG. 28, BOX market-makers 2853 and 2854 cover listed options contracts whose class symbol begins with one of letters "N" through "S," and one of letters "T" through "Z," respectively. It will be understood that more or fewer than four competing market-makers such as shown in FIG. 28 may be part of the REC. Moreover, it will also be understood that the available options classes on exchange 2841 may be covered by the market-makers of the REC using other arrangements than the ones just described.

Figure 29:
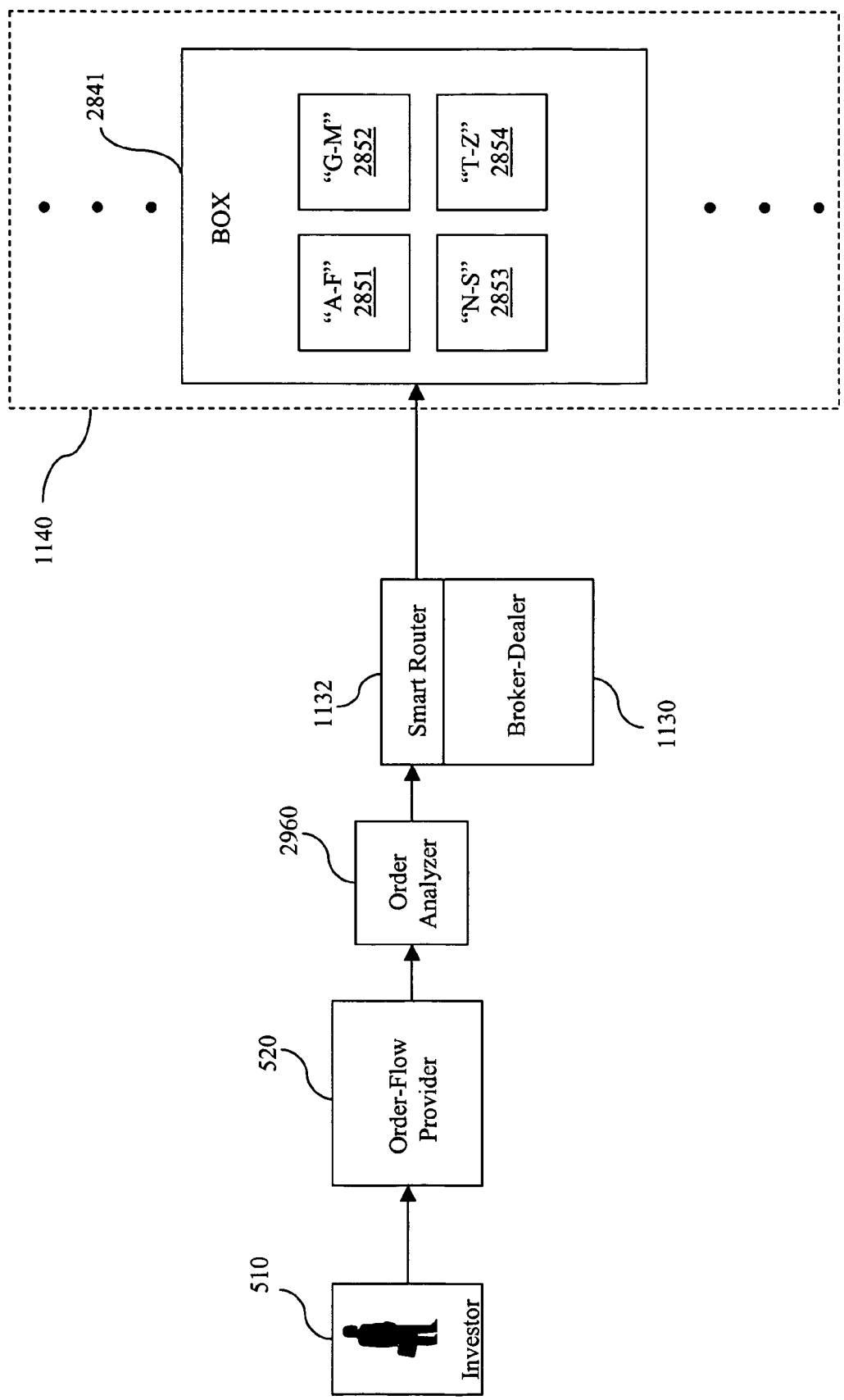
FIG. 29 shows an illustrative pseudo-internalization order flow in the options market, similar to the order flow of FIG. 28, in which an order analyzer is used according to the principles of the present invention.
Figure 30:
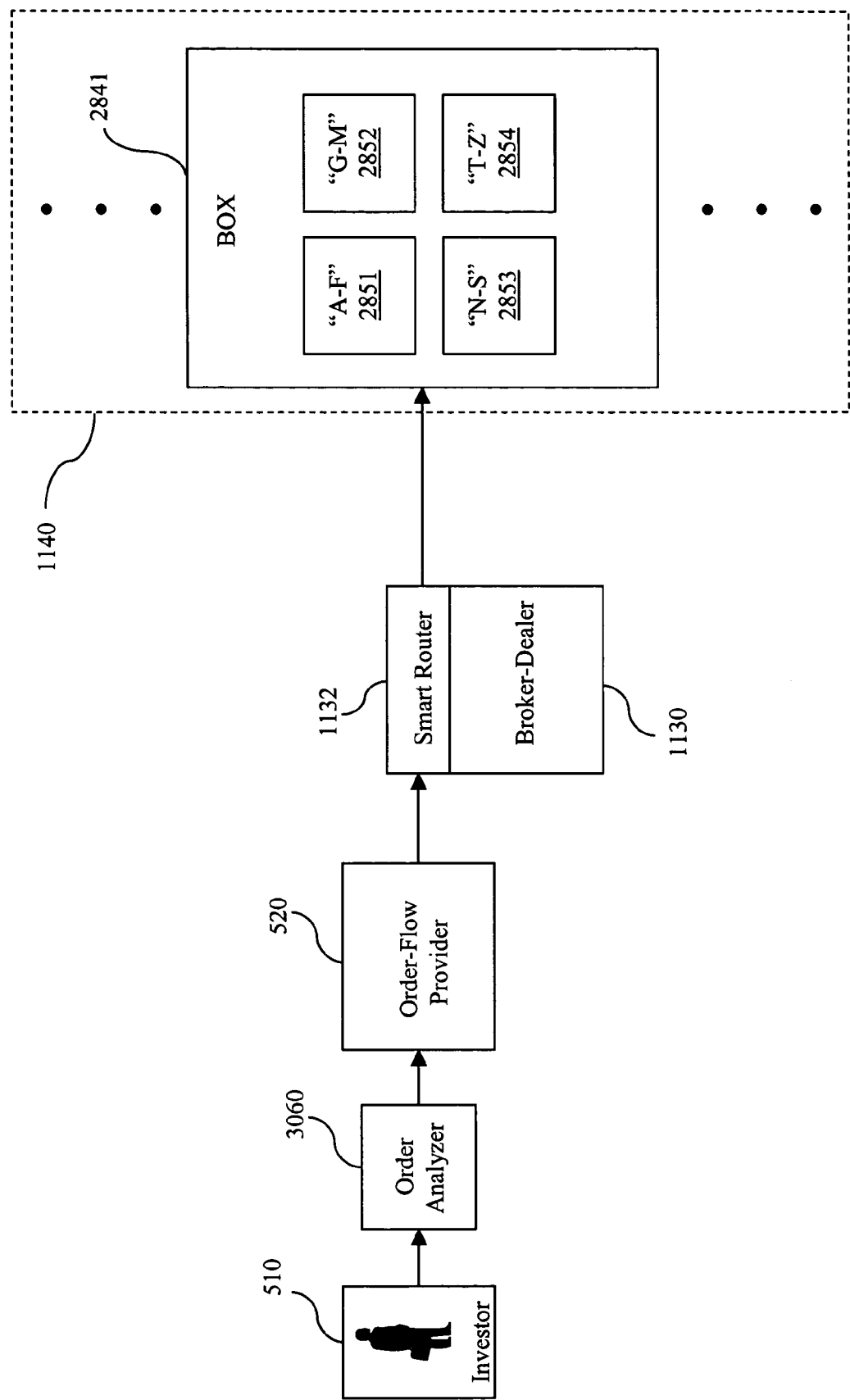
FIG. 30 shows another illustrative pseudo-internalization order flow in the options market, similar to the order flow of FIG. 28, in which an order analyzer is used according to the principles of the present invention.

As with other order flows described above, the order flow of FIG. 28 can also include one or more order analyzers to analyze orders placed by investor 510. For example, as shown in FIG. 29, all and/or certain selected orders arriving from OFP 520 may be analyzed by an order analyzer 2960 to determine whether they are eligible for rapid order execution. It will be understood that order analyzer 2960 can be used, similar to the order analyzers described above, to determine whether the parameters of received orders are eligible for rapid order execution (e.g., because they fall within the ROOEE). According to another embodiment of the invention, as shown in FIG. 30, an order analyzer 3060 may instead be situated between investor 510 and OFP 520. In this manner, order analyzer 3060 can be used to screen some or all orders being sent to OFP 520, such that OFP 520 only extends a rapid option order execution guarantee, e.g., in terms of price and/ or time period, to certain orders (e.g., those orders whose parameters fall within the ROOEE). Upon identification of an ineligible trade, investor 510 may be notified that the order is canceled or offered execution of the order without a guarantee or with a modified guarantee. In addition, while order analyzers 2960 and 3060 are shown as stand-alone entities in FIGS. 29 and 30, respectively, it will be understood that they may be a part of, for example, broker-dealer 1130 (or smart router 1132), or OFP 520, respectively.

Figure 31:
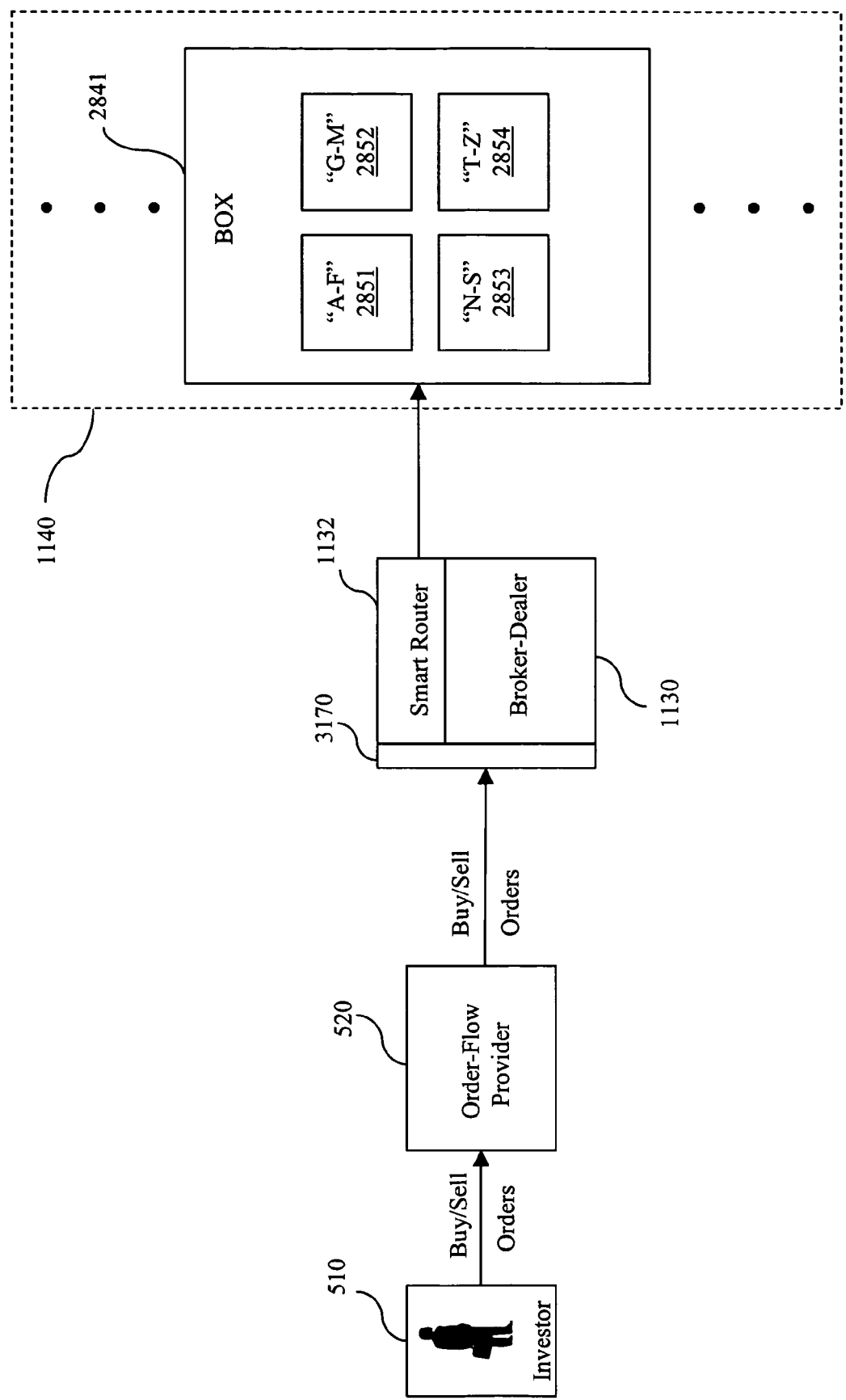
FIG. 31 shows an illustrative pseudo-internalization order flow in the options market, similar to the order flow of FIG. 28, in which a system for determining whether an order conforms to a rule-set is used according to the principles of the present invention.
Figure 32:
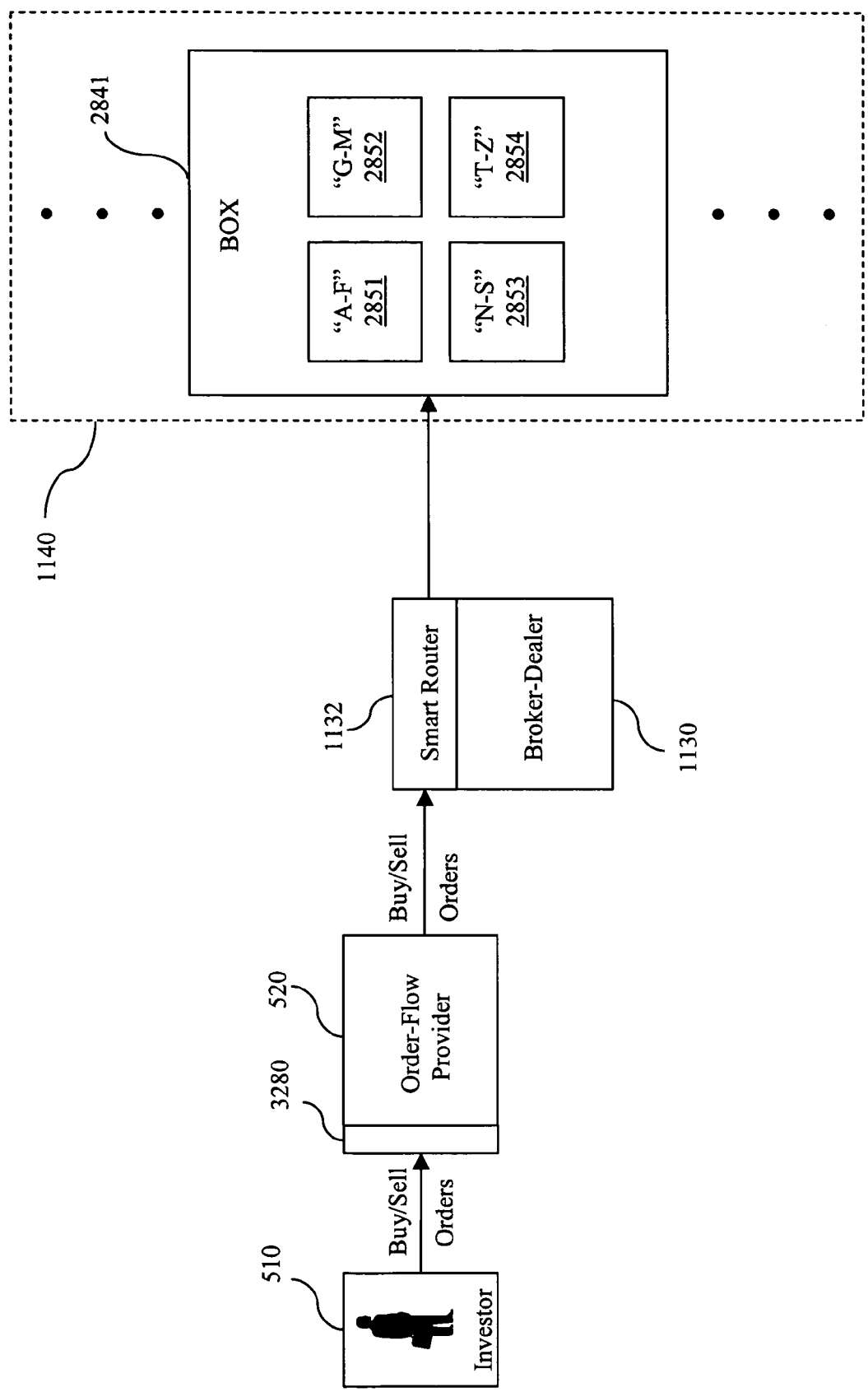
FIG. 32 shows another illustrative pseudo-internalization order flow in the options market, similar to the order flow of FIG. 28, in which a system for determining whether an order conforms to a rule-set is used according to the principles of the present invention.

The order flow shown in FIG. 28 can also be modified to include one or more systems for determining conformance with a rule-set. For example, as shown in FIG. 31, consolidating broker-dealer 1130 may use a system 3170 for determining whether an order placed by investor 510 conforms to a rule-set. Moreover, according to another embodiment of the invention, a system 3280 as shown in FIG. 32 may be used in place of system 3170. Similar to system 3170, system 3280 shown in FIG. 32 may be used to determine for all and/or certain selected orders arriving from investor 510 whether the order should be executed within the guaranteed, specified, predetermined time and/or price, and/or somehow modified. Systems 3170 and 3280 shown in FIGS. 31 and 32, respectively, may be, for example, standard computer implemented systems that analyze various characteristics of orders originating from investor 510 to determine whether each order conforms to the rule-set. Moreover, as shown in FIGS. 31 and 32, systems 3170 and 3280 respectively may be a part of, or associated with, consolidating broker-dealer 1130 (or smart router 1132) or OFP 520. The invention is not limited in this manner.

It will be understood that, generally speaking, the ability to offer rapid order execution for an investor's order will be subject to different rules and/or policies set forth by the various options exchanges. Therefore, the methods and systems used to provide an order execution guarantee according to the invention will generally be configured to account for such rules and/or policies. For example, as mentioned to above, the BOX has implemented a mechanism referred to as the Price Improvement Period that has the potential to delay the execution of an order for at least the length of the PIP. For this reason, when an order is received that is to be sent to the BOX according to the invention, it may be necessary to factor in the time delay associated with the PIP when offering to provide rapid order execution. If the consolidating broker-deal that receives the order has control over whether the order will be subject to the PIP, or if the incoming order is not eligible for the PIP, a rapid order execution guarantee may be provided without factoring in delays associated with the PIP. This additional logic to determine whether and how the possibility of a PIP, for example, might place constraints on the offering of rapid order execution guarantees can be incorporated into the order flow in any suitable manner (e.g., into a smart-router, order analyzer, rule-set system, or at any other suitable location).

Figure 33:
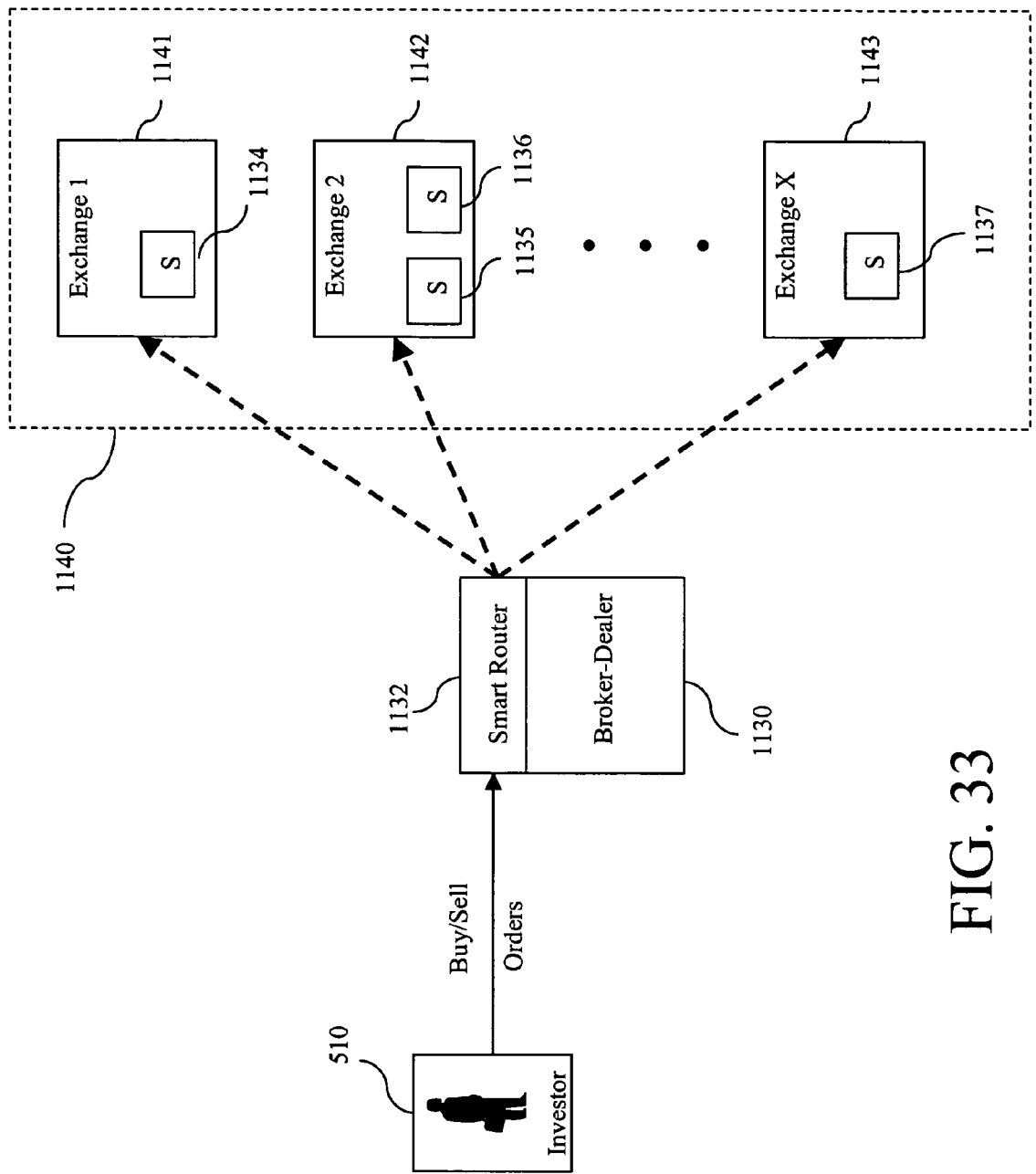
FIG. 33 shows another illustrative pseudo-internalization order flow in the options market, in which a single smart router that is associated with a broker-dealer is used according to the principles of the present invention.
Figure 34:
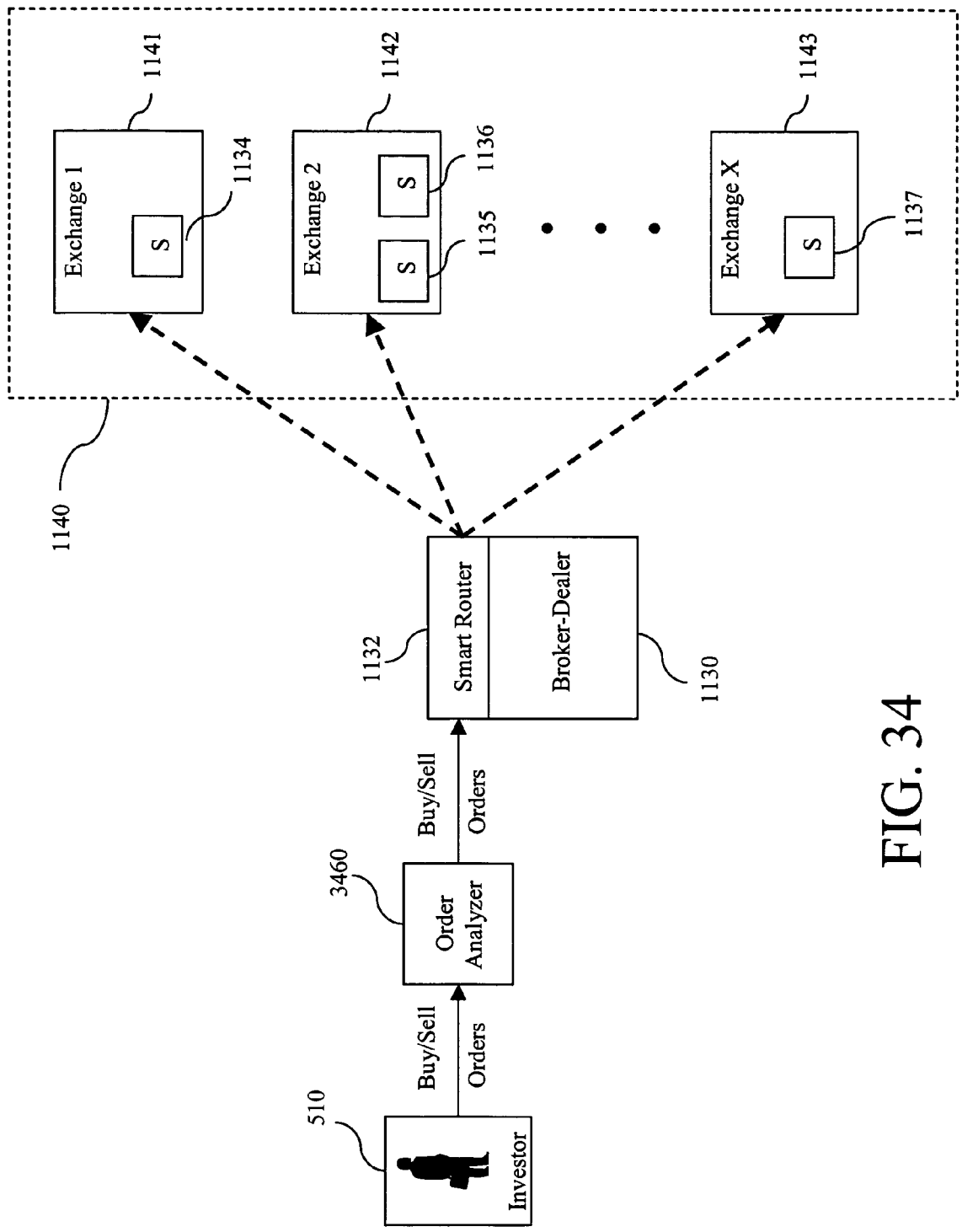
FIG. 34 shows an illustrative pseudo-internalization order flow in the options market, similar to the order flow of FIG. 33, in which an order analyzer is used according to the principles of the present invention.
Figure 35:
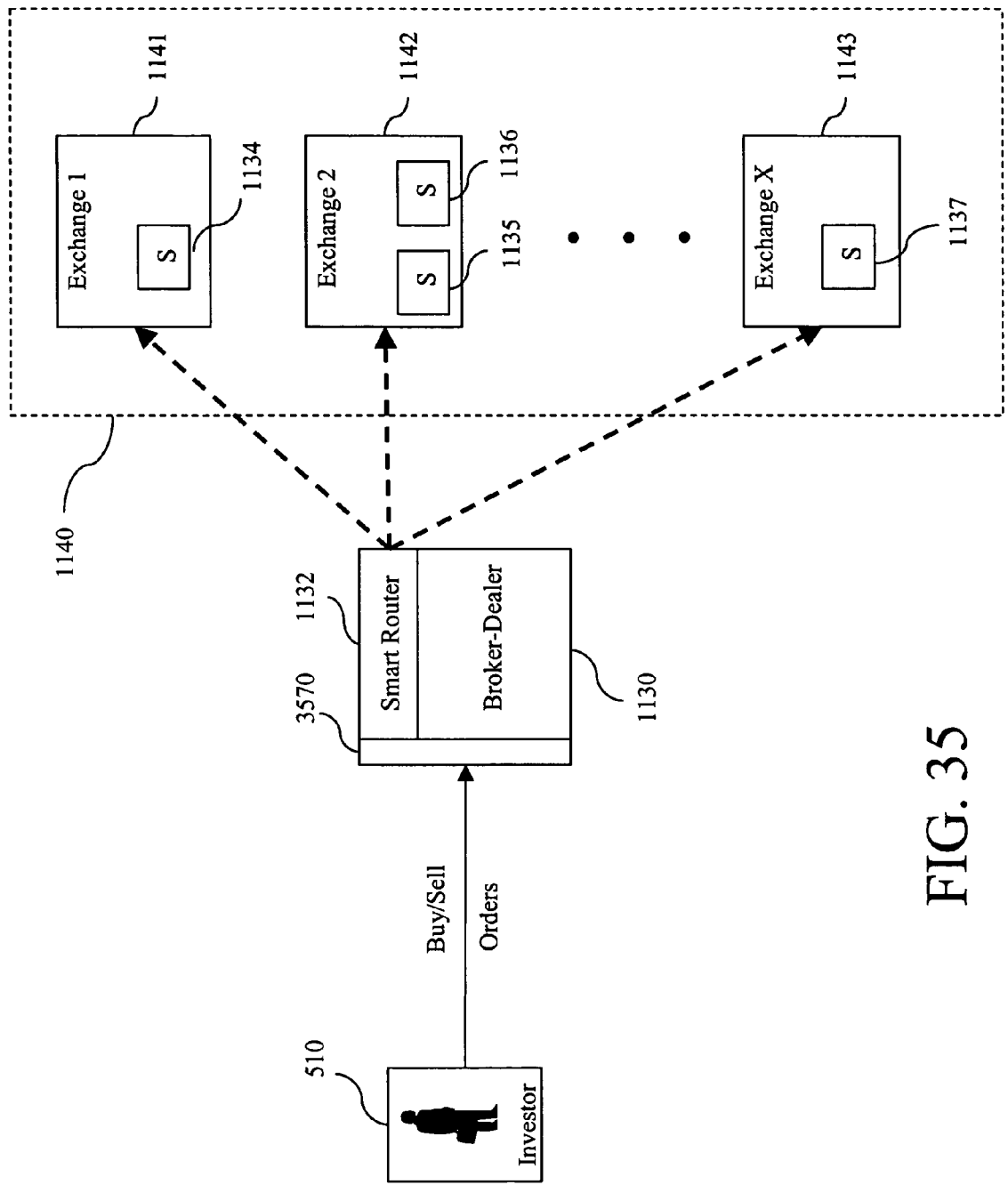
FIG. 35 shows an illustrative pseudo-internalization order flow in the options market, similar to the order flow of FIG. 33, in which a system for determining whether an order conforms to a rule-set is used according to the principles of the present invention.

As mentioned above, it is possible for orders from investor 510 to be sent directly to consolidating broker-dealer 1130 (e.g., when consolidating broker-dealer 1130 is a full-service broker-dealer). This scenario is shown in the order flow of FIG. 33, which does not include an OFP. Moreover, even when an OFP is not included in the order flow, one or more order analyzers and/or one or more systems for determining conformance with a rule-set may be used. For example, as shown in FIG. 34, an order analyzer 3460 may be used. Additionally, as shown in FIG. 35, for example, a system 3570 for determining conformance with a rule-set may be used. It will be understood that order analyzer 3460 and system 3570 shown in FIGS. 34 and 35, respectively, may be substantially similar to the order analyzers and systems described above in connection with other embodiments of the invention. Moreover, it will be understood that order analyzer 3460 and system 3570 may be either a part of, or associated with consolidating broker-dealer 1130 shown in FIGS. 34 and 35. Additionally, although not shown in FIGS. 34 and 35, smart router 1132 may also optionally be a stand-alone smart router. The invention is not limited in this manner.

According to various other embodiments of the present invention, an options exchange may also extend price and/or speed guarantees (e.g., to a consolidating broker-dealer). This ability would be viewed as a value-added service for consolidating broker-dealers that route orders to the guarantor exchange. For example, where an electronic exchange, such as the ISE, wishes to provide an execution speed guarantee, it may define its own REC so as to provide full coverage of the available options classes. In this case, for example, the members of the REC would include one or more PMMs and/or one or more CMMs (as long as the latter, for example, have "step-up" capability), which in the aggregate provide full coverage across all options classes and which are bound to execute trades at the NBBO (e.g., within a certain period of time). Once an REC is established at an exchange (e.g., the ISE), the exchange may provide an indication to various consolidating broker-dealers that certain (or all) orders on options contracts placed at the exchange will be executed, for example, within a certain period of time after they are received. Accordingly, based on a prior agreement with a particular exchange, for example, a consolidating broker-dealer is able to offer a rapid order execution guarantee on an incoming order, knowing that the order can be routed to the exchange and will be executed within a certain period of time.

Figure 36:
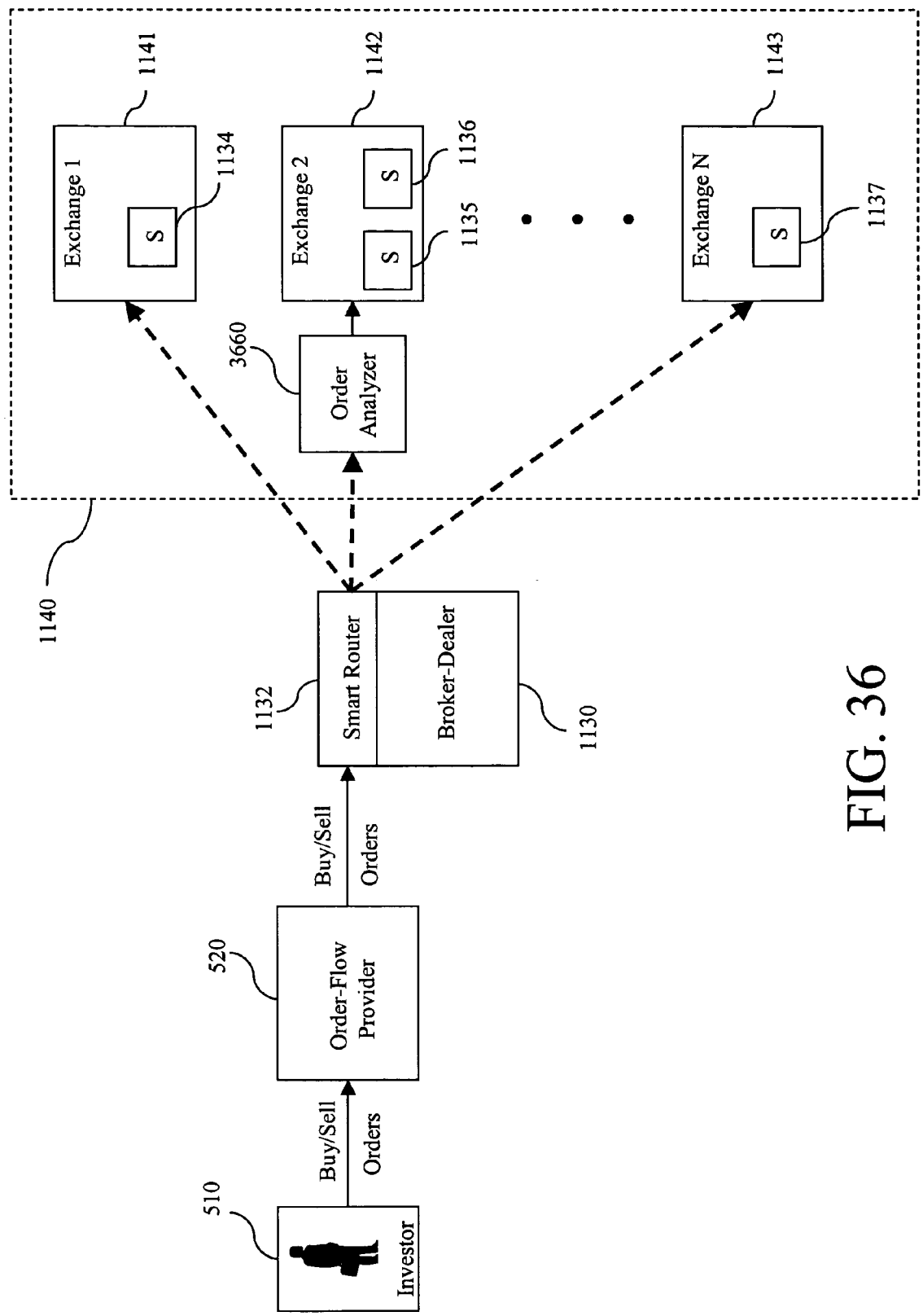
FIG. 36 shows an illustrative pseudo-internalization order flow in the options market, in which an order analyzer that is associated with an options exchange is used according to the principles of the present invention.
Figure 37:
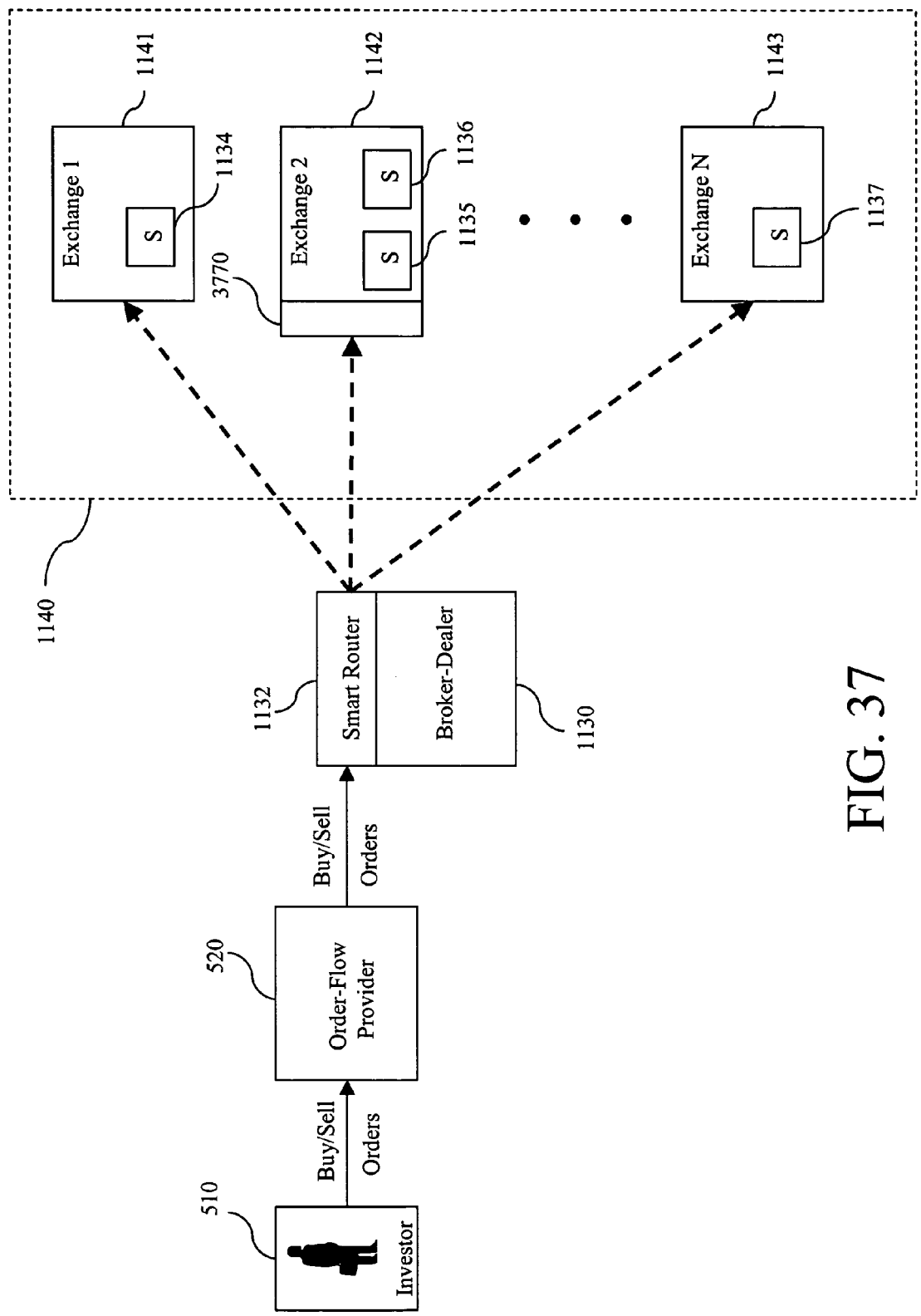
FIG. 37 shows an illustrative pseudo-internalization order flow in the options market, in which a system that is associated with an options exchange is used for determining whether an order conforms to a rule-set according to the principles of the present invention.

It will be understood that, where one or more exchanges offer execution guarantees, it may be desirable for the exchanges to use at least one order analyzer and/or at least one system for determining whether an order conforms to a rule-set, as described above, prior to and/or while guaranteeing rapid order execution. For example, as shown in FIG. 36, exchange 1142 can use order analyzer 3660 to determine whether certain orders are eligible for rapid order execution. When order analyzer 3660 is used, consolidating broker-dealer may first send the order (or just order details) to exchange 1142, at which time order analyzer 3660 will analyze the order and enable exchange 1142 to decide whether to offer an execution guarantee (which would then be conveyed back to consolidating broker-dealer 1130). In other embodiments, as shown in FIG. 37, a system 3770 for determining conformance with a rule-set may be used. It will be understood that order analyzer 3660 and system 3770 shown in FIGS. 36 and 37, respectively, may be substantially similar to the order analyzers and systems described above in connection with other embodiments of the invention. Moreover, it will be understood that order analyzer 3660 and system 3770 may be either a part of, or associated with exchange 1142 as shown in FIGS. 36 and 37. It will also be understood that the order flows shown in FIGS. 36 and 37 are for illustrative purposes only, and that other exchanges (whether floor-based, all electronic, etc.) may also use an order analyzer or system for determining conformance with a rule-set according to the invention. Additional logic may also be included in the order analyzer, the system, and/or at the exchange level for dealing with potential constraints on the ability to offer price and/or time guarantees. For example, when the exchange using an order analyzer or system as described above is the BOX, one or more of the order analyzer, the system and the BOX may include additional logic to determine whether an order is (or may be) subject to the PIP, in which case any execution guarantee that is provided would need to take delays associated with the PIP into account. The invention is not limited in these manners.

The provision of rapid order execution as described above, whether involving traditional floor-based exchanges and/or all electronic exchanges, has various benefits to many different constituencies in the options trading world. For example, by offering guaranteed rapid execution of option trades, investors benefit as a result of the higher quality and/or more efficient trade execution which they receive. This, in turn, increases investor confidence and is likely to yield greater participation in the options market, thereby increasing trading volume, liquidity, and transparency in market pricing. Thus, the ability to offer higher quality execution may help the options markets approach the efficiency level which the equities market has achieved. In addition, broker-dealers that are able to offer guaranteed rapid execution of option trades will be able to significantly differentiate themselves from other broker-dealers that do not offer such a guarantee. This added differentiation can be used to induce partnering with order flow providers and/or to attract additional order flow from outside a consolidating broker-dealer's current network of OFPs.

Moreover, the rapid (e.g., one second) execution guarantee invention described herein is advantageously applicable under current SEC and options exchange rules, but may also be used in the event selected SEC or exchange rules are altered in the future. For example, in alternative embodiments, the invention could provide the rapid execution guarantee through new market structures and trading technologies (e.g., new order crossing mechanisms) as they are developed and approved by the regulators.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, it will be understood that, in alternative embodiments, the present invention will provide a modified guarantee for durations shorter and/or longer than one second (such as two seconds).

Moreover, the present invention may examine selected parameters of incoming orders, and execute some or all of the orders with a rapid order execution guarantee only to the extent deemed acceptable based on their individual (or combined) parameters.

It will be understood that, according to the invention, order information and other information may be transmitted among OFPs, consolidating broker-dealers, smart routers, order analyzers and/or systems for determining conformance with a rule-set using any of a number of known electronic data exchange mechanisms. For example, order information and other information may be transmitted using any or all of local area network, wide area networks, optical cable connections, dial-up telephone connections, the Internet, etc., and the transmission may be wire- or wireless-based. Moreover, it should also be noted that, according to various embodiments of the present invention, some or all of the OFPs, consolidating broker-dealers, smart routers, order analyzers and/or systems for determining conformance with a rule-set, for example, will be capable of communicating using a standard protocol or protocols by which orders in the options order flow are transmitted. For example, these components and systems may be constructed such that details of orders (e.g., order parameters) being transmitted between various parties in the options order flow chain are directly ascertainable. Accordingly, the OFPs, consolidating broker-dealers, smart routers, order analyzers and/or systems for determining conformance with a rule-set described above may be capable of communicating with some or all of the commonly used protocols that include, for example, Financial Information Exchange (FIX), Common Message Switch (CMS), as well as other proprietary protocols. According to various other embodiments of the invention, for example, additional components and/or systems (that are compatible with the protocol or protocols by which orders are being transmitted) may be used for communicating various order details to the smart routers, order analyzers and/or systems for determining conformance with a rule-set when they are not capable of directly ascertaining order details. The invention is not limited in this manner.

It will be also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description provided above.

The system according to the invention may include a general purpose computer, or a specially programmed special purpose computer. The user may interact with the system via e.g., a personal computer or over PDA, e.g., the Internet an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the foregoing description or illustrated in the drawings. For example, one or more order analyzers may be used in conjunction with one or more systems for determining conformance with a rule-set. Accordingly, it will be understood that the invention is capable of other embodiments and of being practiced and carried out in various ways. Also, it is to be understood that the phraseology and terminology employed herein are for the purpose of description and should not be regarded as limiting. It should also be noted that, while some embodiments described above may currently not be approved under federal or other relevant regulations, these embodiments are nevertheless considered to be part of the present invention.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The many features and advantages of the embodiments of the present invention are apparent from the detail specification, and thus, it is intended to cover all such features and advantages of the invention that fall within the true spirit and scope of the invention. All suitable modifications and equivalents maybe resorted to, falling within the scope of the invention.

What is claimed is:

1. A method of transmitting an order for execution of a listed options contract at at least one of a guaranteed order execution price and a guaranteed order execution timeframe offered to an investor submitting the order using a computer, the method at least one of implemented and assisted by the computer and comprising at least one of the sequential, sequence independent and non-sequential steps of:

electronically receiving the order, by a first computer order routing system, from a first broker-dealer computer system;

transmitting the order to be processed by the first computer order routing system to determine a presence of a first affiliate market-maker of the first broker-dealer associated with the first broker-dealer computer system with step-up capability for the listed options contract on a first options exchange implemented by a first options exchange computer system;

electronically receiving by the first computer order routing system in a first communication when the first affiliate market-maker is present, and electronically transmitting a second communication instructing the first broker-dealer computer system to transmit the order to the first options exchange computer system for electronic execution in accordance with at least one of the guaranteed order execution price and the guaranteed order execution timeframe offered to the investor submitting the order; and when the first affiliate market-maker is not present, electronically transmitting by the first computer order routing system a third communication instructing a second broker-dealer computer system associated with a second broker-dealer to transmit the order for electronic execution in accordance with the at least one of the guaranteed order execution price and the guaranteed order execution timeframe offered to the investor submitting the order upon receipt of a determination by at least one of the first computer order routing system and a second computer order routing system that there is a second affiliate market-maker of the second broker-dealer with step-up capability for the listed options contract on at least one of the first options exchange implemented by the first options exchange computer system and a second options exchange implemented by a second options exchange computer system.

2. The method of claim 1, wherein the step-up capability of the first affiliate market-maker comprises the first affiliate market-maker electronically executing the order when the order is not automatically executed by the first options exchange computer system.

3. The method of claim 2, further comprising the step of using an electronic system with an automatic step-up feature of the first affiliate market-maker.

4. The method of claim 1, wherein the step-up capability of the second affiliate market-maker comprises the second affiliate market-maker electronically executing the order when the order is not automatically executed by the second options exchange computer system.

5. The method of claim 4, further comprising the step of using an electronic system with an automatic step-up feature of the second affiliate market-maker.

6. The method of claim 1, wherein the first market-maker is obligated to step up and fill the order when the order is not automatically executed by the first options exchange computer system.

7. The method of claim 6, wherein the obligation is a contractual obligation.

8. The method of claim 1, wherein the first market-maker is willing to step up and fill the order when the order is not automatically executed by the first options exchange computer system.

9. The method of claim 1, wherein the market-making firm of the first market-maker is owned by the same legal entity as the first broker-dealer.

10. The method of claim 1, wherein the market-making firm of the first market-maker is at least partially under the control of the same legal entity as the first broker-dealer.

11. The method of claim 1, wherein the second market-maker is obligated to step up and fill the order when the order is not automatically executed by the first or second options exchange computer systems.

12. The method of claim 11, wherein the obligation is a contractual obligation.

13. The method of claim 1, wherein the second market-maker is willing to step up and fill the order when the order is not automatically executed by the first or second options exchange computer systems.

14. The method of claim 1, wherein the market-making firm of the second market-maker is owned by the same legal entity as the second broker-dealer.

15. The method of claim 1, wherein the market-making firm of the second market-maker is at least partially under the control of the same legal entity as the second broker-dealer.

16. The method of claim 1, further comprising sending the order by the second broker-dealer computer system to one of the first and second options exchange computer systems when the order is sent to the second broker-dealer for execution.

17. The method of claim 1, wherein the first affiliate market-maker is a specialist of the listed options contract on the first options exchange.

18. The method of claim 1, wherein the second affiliate market maker is a specialist of the listed options contract on at least one of the first and second options exchanges.

19. The method of claim 1, further comprising the steps of electronically receiving the order from an order flow provider computer system.

20. The method of claim 1, further comprising the step of placing the order by an investor.

21. The method of claim 1, further comprising the step of electronically placing the order by an order flow provider computer system.

22. The method of claim 1, further comprising the step of rejecting the order if the order is determined to be ineligible for execution in accordance with at least one of the guaranteed order execution price and the guaranteed order execution timeframe.

23. The method of claim 1, further comprising the step of electronically executing a modified version of the order in accordance with one of the guaranteed, specified and/or pre-determined execution prices and timeframes.

24. The method of claim 1, wherein at least one of the first and second computer order routing systems are respectively owned by the same entity as the first broker-dealer and the second broker-dealer.

25. The method of claim 1, wherein at least one of the first and second computer order routing systems are respectively under the control of the same entity as the first broker-dealer and the second broker-dealer.

26. The method of claim 1, further comprising the step of electronically executing the order using at least one of an automatic execution system of the exchange to which the order is sent and an electronic system with an automatic step-up feature that is associated with the first or second affiliate market-maker.

27. The method of claim 1, further comprising the step of electronically executing the order within a guaranteed timeframe of at least one of one second and two seconds.

28. The method of claim 1, wherein the first broker-dealer, the second broker-dealer, and at least one of the first and second affiliate market-makers are part of a rapid execution consortium (REC).

29. The method of claim 28, wherein the REC comprises one or more additional broker-dealers.

30. The method of claim 1, further comprising the step of analyzing the order to determine its eligibility for execution in accordance with the guaranteed order execution price and/or timeframe.

31. The method of claim 30, wherein the step of analyzing comprises determining whether the parameters of the order fall within a rapid option order execution envelope (ROOEE).

32. The method of claim 30, wherein the step of analyzing comprises the step of reviewing one or more parameters of the order relating to at least one of the theoretical value of the options contract, the frequency of order submission, the NBBO market source, the NBBO size, the liquidity of the options contract in the market, the liquidity of the underlying equity or equities, the implied spread (NBBO), one or more of the price sensitivity measures associated with the options contract, the implied option contract price volatility, the size of the order, the identity of the options contract, and the class of the options contract.

33. The method of claim 30, wherein the order is subject to execution according to the guaranteed order execution price and/or timeframe only after it is determined to be eligible.

34. The method of claim 30, wherein the order is executed without being subject to the guaranteed order execution price and/or timeframe based on the eligibility determination.

35. The method of claim 30, further comprising the step of rejecting the order based on the eligibility determination.

36. The method of claim 30, further comprising the step of electronically executing a modified version of the order in accordance with the guaranteed order execution price and/or timeframe based on the eligibility determination.

37. The method of claim 36, wherein the modified version of the order comprises a modified order size.

38. The method of claim 1, further comprising the step of determining conformance of the order with a rule-set, wherein the rule-set is based at least in part on order parameters, market condition parameters, and execution parameters.

39. The method of claim 38, wherein the order is subject to execution according to the guaranteed order execution price and/or timeframe only after it is determined to be in conformance with the rule-set.

40. The method of claim 38, wherein the order is executed without being subject to the guaranteed order execution price and/or timeframe based on the conformance determination.

41. The method of claim 38, further comprising the step of rejecting the order based on the conformance determination.

42. The method of claim 38, further comprising the step of executing a modified version of the order in accordance with the guaranteed order execution price and/or timeframe based on the conformance determination.

43. The method of claim 42, wherein the modified version of the order comprises at least one of a modified order size.

44. A method of transmitting an order for execution of a listed options contract at at least one of a guaranteed, specified and predetermined execution price and within at least one of a guaranteed, specified and predetermined timeframe offered to an investor submitting the order using a computer, the method at least one of implemented and assisted by the computer and comprising at least one of the sequential, sequence independent and non-sequential steps of:
processing the order by a computer routing system to determine which of a plurality of market-makers has step-up capability for the listed options contract on at least one options exchange; and
electronically sending the order to an options exchange computer system on which a market-maker with step-up capability for the listed options contract operates for execution in accordance with a guaranteed, specified and/or predetermined execution price and timeframe offered to the investor submitting the order.

45. The method of claim 44, wherein at least two of the plurality of market-makers operate on the same options exchange.

46. A method of transmitting an order for execution of a listed options contract at at least one of a guaranteed, specified and predetermined execution price and within at least one of a guaranteed, specified and predetermined timeframe offered to the investor submitting the order using a computer, the method at least one of implemented and assisted by the computer and comprising at least one of the sequential, sequence independent and non-sequential steps of:
forming a rapid execution consortium (REC) that comprises a plurality of options market-makers, wherein the members of the REC collectively have step-up capability for a substantial portion of all listed options classes; and
electronically sending the order to an options exchange computer system for execution in accordance with the guaranteed, specified and/or predetermined execution price and timeframe offered to the investor submitting the order based at least in part on the presence of a market-maker with step-up capability for the listed options contract on the exchange.

47. The method of claim 46, wherein the members of the REC collectively have step-up capability for at least one of 30%, 50% and 75% of all listed options classes.

48. The method of claim 46, wherein the REC further comprises one or more broker-dealers.

49. The method of claim 46, wherein at least one of the plurality of market-makers is an affiliate of at least one of the broker-dealers.

50. The method of claim 46, wherein the market-makers each operate on the same options exchange.

51. A method of transmitting an order for execution of a listed options contract at at least one of a guaranteed, specified and predetermined execution price and within at least one of a guaranteed, specified and predetermined timeframe offered to the investor submitting the order using a computer, the method at least one of implemented and assisted by the computer and comprising at least one of the sequential, sequence independent and non-sequential steps of:

electronically processing the order by a first computer order routing system to determine which of a plurality of option broker-dealers of a rapid execution consortium (REC) has an affiliate market-maker with step-up capability for the listed options contract on at least one options exchange;

electronically providing the order to one of the option broker-dealers of the REC that is determined to have an affiliate that is a market-maker with step-up capability for the listed options contract on at least one options exchange; and electronically sending the order to an exchange computer system on which at least one affiliate market-maker with step-up capability for the listed options contract operates for execution in accordance with a guaranteed, specified and/or predetermined execution price and timeframe offered to the investor submitting the order.

52. A method of transmitting an order for execution of a listed options contract at at least one of a guaranteed, specified and predetermined execution price and/or within at least one of a guaranteed, specified and predetermined timeframe offered to the investor submitting the order using a computer, the method at least one of implemented and assisted by the computer and comprising at least one of the sequential, sequence independent and non-sequential steps of:

electronically receiving the order, by a first computer order routing system, from a first broker-dealer computer system;

transmitting the order to be processed by the first computer order routing system to determine a presence of a first affiliate market-maker of the first broker-dealer associated with the first broker-dealer computer system with step-up capability for the listed options contract on a first options exchange implemented by a first options exchange computer system;

electronically receiving by the first computer order routing system a first communication when the first affiliate market-maker is present, and electronically transmitting a second communication instructing the first broker-dealer computer system to transmit the order to the first options exchange computer system for electronic execution in accordance with at least one of the guaranteed, specified and predetermined execution price and/or within at least one of a the guaranteed, specified and predetermined timeframe offered to the investor submitting the order; and when the first affiliate market-maker is not present, electronically transmitting by the first computer order routing system a third communication instructing a second broker-dealer computer system associated with a second broker-dealer to transmit the order for electronic execution in accordance with the at least one of the guaranteed, specified and predetermined execution price and/or within at least one of the guaranteed, specified and predetermined timeframe offered to the investor submitting the order upon receipt of a determination by at least one of the first computer order routing system and a second computer order routing system that there is a second affiliate market-maker of the second broker-dealer with step-up capability for the listed options contract on at least one of the first options exchange implemented by the first options exchange computer system and a second options exchange implemented by a second options exchange computer system.

53. A computer system executing an order for a listed options contract, comprising:

means for receiving the order by a first broker-dealer;

means for processing the order by a first routing system to determine a presence of a first affiliate market-maker of the first broker-dealer with step-up capability for the listed options contract on a first options exchange;

means for sending the order by the first broker-dealer, if it is determined that the first affiliate market-maker is present, to the first options exchange for execution in accordance with at least one of a guaranteed, specified and predetermined execution price and/or within at least one of a guaranteed, specified and predetermined timeframe offered to the investor submitting the order; and means for sending the order to a second broker-dealer, if it is determined that the first affiliate market-maker is not present, for execution in accordance with at least one of the guaranteed, specified and predetermined execution price and/or within at least one of the guaranteed, specified and predetermined timeframe offered to the investor submitting the order upon a determination by at least one of the first routing system and a second routing system that there is a second affiliate market-maker of the second broker-dealer with step-up capability for the listed options contract on at least one of the first options exchange and a second options exchange.

54. A computer system executing an order for a listed options contract, comprising:

an input device receiving the order by a first broker-dealer;

a first processor determining a presence of a first affiliate market-maker of the first broker-dealer with step-up capability for the listed options contract on a first options exchange; and an order transmitter for sending the order by the first broker-dealer, if it is determined that the first affiliate market-maker is present, to the first options exchange for execution in accordance with at least one of a guaranteed, specified and predetermined execution price and/or within at least one of a guaranteed, specified and predetermined timeframe offered to the investor submitting the order;

wherein, if it is determined that the first affiliate market-maker is not present, the order transmitter sends the order to a second broker-dealer for execution in accordance with at least one of the guaranteed, specified and predetermined execution price and/or within at least one of the guaranteed, specified and predetermined timeframe offered to the investor submitting the order upon a determination by at least one of the first processor and a second processor that there is a second affiliate market-maker of the second broker-dealer with step-up capability for the listed options contract on at least one of the first options exchange and a second options exchange.

* * * * *

UNITED STATES PATENT AND TRADEMARK OFFICE
CERTIFICATE OF CORRECTION

| | | |
|---|---|---|
| PATENT NO. | : 7,603,309 B2 | Page 1 of 1 |
| APPLICATION NO. | : 11/236106 | |
| DATED | : October 13, 2009 | |
| INVENTOR(S) | : Griffin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 991 days.

Signed and Sealed this

Fifth Day of October, 2010

David J. Kappos
*Director of the United States Patent and Trademark Office*